(12) United States Patent
Karafin et al.

(10) Patent No.: US 11,885,988 B2
(45) Date of Patent: Jan. 30, 2024

(54) SYSTEMS AND METHODS FOR FORMING ENERGY RELAYS WITH TRANSVERSE ENERGY LOCALIZATION

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US); Ed Ibe, San Jose, CA (US); Jared Perez, San Jose, CA (US); Xudong Chen, San Jose, CA (US); Joseph W. Rickwalder, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 17/552,712

(22) Filed: Dec. 16, 2021

(65) Prior Publication Data

US 2022/0179133 A1    Jun. 9, 2022

Related U.S. Application Data

(63) Continuation of application No. 16/634,088, filed as application No. PCT/US2019/013399 on Jan. 12, 2019, now Pat. No. 11,237,307.

(Continued)

(51) Int. Cl.
*G02B 5/02* (2006.01)
*G02B 30/00* (2020.01)
(Continued)

(52) U.S. Cl.
CPC ............ *G02B 5/0242* (2013.01); *F24V 30/00* (2018.05); *G02B 3/0037* (2013.01); *G02B 3/0056* (2013.01); *G02B 3/08* (2013.01); *G02B 5/0278* (2013.01); *G02B 5/32* (2013.01); *G02B 6/04* (2013.01); *G02B 6/06* (2013.01); *G02B 6/10* (2013.01); *G02B 27/0103* (2013.01); *G02B 27/09* (2013.01); *G02B 27/0994* (2013.01);
(Continued)

(58) Field of Classification Search
CPC .... G02B 5/0242; G02B 30/00; G02B 5/0278; G02B 6/04; F24V 30/00
See application file for complete search history.

(56) References Cited

U.S. PATENT DOCUMENTS 947,702 A    1/1910    Rowley
3,505,046 A    4/1970    Phaneuf
(Continued)

FOREIGN PATENT DOCUMENTS

CA    979696 A    12/1975
CN    1046998 A    11/1990
(Continued)

OTHER PUBLICATIONS

JP2019-501554 Final Notice of Reasons for Rejection of the Japan Patent Office dated Dec. 6, 2022.
(Continued)

*Primary Examiner* — Mathieu D Vargot

(57) ABSTRACT

Disclosed are systems and methods for manufacturing energy relays for energy directing systems. Methods and devices are disclosed for forming random and non-random patterns of energy relay materials with energy localization properties. Methods and devices are disclosed for forming energy relays of different shapes.

13 Claims, 50 Drawing Sheets

Related U.S. Application Data

(60) Provisional application No. 62/617,288, filed on Jan. 14, 2018, provisional application No. 62/617,293, filed on Jan. 14, 2018.

(51) Int. Cl.

| | | |
|---|---|---|
| *F24V 30/00* | (2018.01) | |
| *G02B 6/04* | (2006.01) | |
| *G02B 6/10* | (2006.01) | |
| *G02B 27/09* | (2006.01) | |
| *G03H 1/02* | (2006.01) | |
| *G02B 6/06* | (2006.01) | |
| *G02B 27/01* | (2006.01) | |
| *G02B 30/56* | (2020.01) | |
| *G02B 3/00* | (2006.01) | |
| *G02B 3/08* | (2006.01) | |
| *G02B 5/32* | (2006.01) | |
| *F24S 30/00* | (2018.01) | |

(52) U.S. Cl.
CPC .......... *G02B 30/00* (2020.01); *G02B 30/56* (2020.01); *G03H 1/02* (2013.01); *F24S 30/00* (2018.05)

(56) References Cited

U.S. PATENT DOCUMENTS

| | | |
|---|---|---|
| 3,567,549 A | 3/1971 | Hoffmeister et al. |
| 3,626,040 A | 12/1971 | Nagao et al. |
| 3,859,071 A | 1/1975 | Beasley et al. |
| 3,870,399 A | 3/1975 | Randall et al. |
| 3,961,931 A | 6/1976 | Nakagawa et al. |
| 4,087,159 A | 5/1978 | Ulrich |
| 4,099,833 A | 7/1978 | Tosswill |
| 4,134,642 A | 1/1979 | Kapron et al. |
| 4,143,234 A | 3/1979 | Johnson et al. |
| 4,149,772 A | 4/1979 | Iyengar et al. |
| 4,265,515 A | 5/1981 | Kao |
| 4,372,769 A | 2/1983 | Hicks, Jr. |
| 5,187,260 A | 2/1993 | Karali et al. |
| 5,187,360 A | 2/1993 | Pasco |
| 5,371,826 A | 12/1994 | Friedman |
| 5,374,976 A | 12/1994 | Spannenburg |
| 5,396,350 A | 3/1995 | Beeson et al. |
| 5,465,308 A | 11/1995 | Hutcheson et al. |
| 5,479,550 A | 12/1995 | Nishioka et al. |
| 5,481,385 A | 1/1996 | Zimmerman et al. |
| 5,519,801 A | 5/1996 | Noane et al. |
| 5,553,184 A | 9/1996 | Eikelmann et al. |
| 5,822,125 A | 10/1998 | Meyers |
| 5,949,581 A | 9/1999 | Kurtenbach et al. |
| 5,974,215 A | 10/1999 | Bilbro et al. |
| 6,013,072 A | 1/2000 | Winston et al. |
| 6,041,154 A | 3/2000 | Ono et al. |
| 6,169,594 B1 | 1/2001 | Aye et al. |
| 6,384,400 B1 | 5/2002 | Albagli et al. |
| 6,487,351 B1 | 11/2002 | Cryan et al. |
| 6,611,648 B2 | 8/2003 | Kumar et al. |
| 6,614,972 B1 | 9/2003 | Lundin |
| 6,680,761 B1 | 1/2004 | Greene et al. |
| 7,016,516 B2 | 3/2006 | Rhoads |
| 7,050,020 B2 | 5/2006 | Uehara et al. |
| 7,054,850 B2 | 5/2006 | Matsugu |
| 7,235,047 B2 | 6/2007 | MacAulay et al. |
| RE39,864 E | 10/2007 | Athale et al. |
| 7,329,982 B2 | 2/2008 | Conner et al. |
| 7,773,849 B2 | 8/2010 | Shani |
| 7,986,374 B2 | 7/2011 | Ijzerman et al. |
| 8,149,265 B2 | 4/2012 | Smalley et al. |
| 8,369,546 B2 | 2/2013 | Pompei |
| 8,406,595 B2 | 3/2013 | Hayashi |
| 8,477,906 B2 | 7/2013 | Morse et al. |
| 8,619,177 B2 | 12/2013 | Perwass et al. |
| 8,736,675 B1 | 5/2014 | Holzbach et al. |
| 8,743,466 B2 | 6/2014 | Yamamoto |
| 8,879,766 B1 | 11/2014 | Zhang |
| 8,953,012 B2 | 2/2015 | Williams et al. |
| 9,063,289 B1 | 6/2015 | Farmer et al. |
| 9,158,080 B2 | 10/2015 | Logunov et al. |
| 9,256,060 B2 | 2/2016 | Kobori et al. |
| 9,411,511 B1 | 8/2016 | Sivertsen |
| 9,494,738 B1 | 11/2016 | Farmer et al. |
| 9,612,395 B2 | 4/2017 | Karbasivalashani et al. |
| 9,835,812 B2 | 12/2017 | Yadlowsky |
| 9,874,761 B2 | 1/2018 | Putten et al. |
| 9,904,065 B2 | 2/2018 | Jin et al. |
| 9,945,985 B2 | 4/2018 | Morasse |
| 9,945,988 B2 | 4/2018 | Powell |
| 9,958,829 B2 | 5/2018 | Aravkin et al. |
| 10,009,597 B2 | 6/2018 | Karafin et al. |
| 10,052,831 B2 | 8/2018 | Welker et al. |
| 10,094,974 B2 | 10/2018 | Chen et al. |
| 10,132,993 B2 | 11/2018 | Buczynski et al. |
| 10,432,919 B2 | 10/2019 | Lapstun |
| 10,488,584 B2 | 11/2019 | Karafin et al. |
| 10,551,628 B2 | 2/2020 | Karafin et al. |
| 10,560,689 B2 | 2/2020 | Lapstun |
| 10,860,142 B1 | 12/2020 | Northcott et al. |
| 10,877,210 B2 | 12/2020 | Karafin et al. |
| 10,884,142 B2 | 1/2021 | Welker |
| 10,884,251 B2 | 1/2021 | Karafin et al. |
| 10,989,869 B2 | 4/2021 | Karafin et al. |
| 10,996,393 B2 | 5/2021 | Karafin et al. |
| 11,221,670 B2 | 1/2022 | Karafin et al. |
| 11,556,015 B2 | 1/2023 | Karafin et al. |
| 2001/0028356 A1 | 10/2001 | Balogh |
| 2002/0009261 A1 | 1/2002 | Bhagavatula et al. |
| 2002/0021501 A1 | 2/2002 | Kawashima et al. |
| 2002/0048427 A1 | 4/2002 | Chiarulli et al. |
| 2002/0172478 A1 | 11/2002 | Sahlin |
| 2003/0026567 A1 | 2/2003 | Cryan et al. |
| 2003/0030912 A1 | 2/2003 | Gleckman et al. |
| 2003/0137730 A1 | 7/2003 | Fridman et al. |
| 2004/0001679 A1 | 1/2004 | Sisodia et al. |
| 2004/0108806 A1 | 6/2004 | Cok et al. |
| 2004/0240777 A1 | 12/2004 | Woodgate et al. |
| 2005/0041944 A1 | 2/2005 | Cryan et al. |
| 2005/0119575 A1 | 6/2005 | Ladabaum et al. |
| 2005/0243275 A1 | 11/2005 | Curatu |
| 2006/0028400 A1 | 2/2006 | Lapstun et al. |
| 2006/0077319 A1 | 4/2006 | Kitamura |
| 2006/0102604 A1 | 5/2006 | Dane et al. |
| 2006/0146428 A1 | 7/2006 | Lim et al. |
| 2006/0165358 A1 | 7/2006 | Trebst et al. |
| 2006/0191566 A1 | 8/2006 | Schaafsma |
| 2006/0241572 A1 | 10/2006 | Zhou |
| 2006/0256415 A1 | 11/2006 | Holmes et al. |
| 2007/0091638 A1 | 4/2007 | Ijzerman et al. |
| 2007/0097108 A1 | 5/2007 | Brewer |
| 2007/0238296 A1 | 10/2007 | Shimizu |
| 2007/0291504 A1 | 12/2007 | Lu |
| 2008/0023137 A1 | 1/2008 | Jiang et al. |
| 2008/0035834 A1 | 2/2008 | Gleckler |
| 2008/0087047 A1 | 4/2008 | Bayindir et al. |
| 2008/0144174 A1 | 6/2008 | Lucente et al. |
| 2008/0170293 A1 | 7/2008 | Lucente et al. |
| 2008/0285125 A1 | 11/2008 | Lee et al. |
| 2009/0040294 A1 | 2/2009 | Smalley et al. |
| 2009/0085831 A1 | 4/2009 | Odoi et al. |
| 2009/0148098 A1 | 6/2009 | Lewis et al. |
| 2009/0164397 A1 | 6/2009 | Kwok |
| 2009/0220201 A1 | 9/2009 | Reichel et al. |
| 2009/0235750 A1 | 9/2009 | Chang et al. |
| 2009/0247305 A1 | 10/2009 | Kanekal |
| 2009/0266992 A1 | 10/2009 | Beekman |
| 2009/0273538 A1 | 11/2009 | Smith et al. |
| 2009/0273575 A1 | 11/2009 | Pryor |
| 2009/0314929 A1 | 12/2009 | Lee et al. |
| 2010/0119200 A1 | 5/2010 | Tabor |
| 2010/0245824 A1 | 9/2010 | Schwarz et al. |
| 2010/0265457 A1 | 10/2010 | Chomyn et al. |
| 2010/0272234 A1 | 10/2010 | Morse et al. |
| 2010/0278480 A1 | 11/2010 | Vasylyev |

(56) References Cited

U.S. PATENT DOCUMENTS

| | | |
|---|---|---|
| 2011/0012895 A1 | 1/2011 | Lucente et al. |
| 2011/0094269 A1 | 4/2011 | Mukasa |
| 2011/0114831 A1 | 5/2011 | Grier |
| 2011/0134040 A1 | 6/2011 | Duparre et al. |
| 2011/0169832 A1 | 7/2011 | Brown et al. |
| 2011/0242461 A1 | 10/2011 | Escuti et al. |
| 2011/0254916 A1 | 10/2011 | Fan et al. |
| 2012/0050562 A1 | 3/2012 | Perwass et al. |
| 2012/0050833 A1 | 3/2012 | Bove, Jr. et al. |
| 2012/0206390 A1 | 8/2012 | Ueno et al. |
| 2012/0224062 A1 | 9/2012 | Lacoste et al. |
| 2012/0268950 A1 | 10/2012 | Parkyn et al. |
| 2013/0069933 A1 | 3/2013 | Smithwick et al. |
| 2013/0082905 A1 | 4/2013 | Ranieri et al. |
| 2013/0088785 A1 | 4/2013 | Yamamoto |
| 2013/0127832 A1 | 5/2013 | Lee et al. |
| 2013/0140916 A1 | 6/2013 | Dunlap et al. |
| 2013/0163089 A1 | 6/2013 | Bohn |
| 2013/0195410 A1 | 8/2013 | Karbasivalashani et al. |
| 2013/0208082 A1 | 8/2013 | Williams et al. |
| 2013/0265485 A1 | 10/2013 | Kang |
| 2014/0035959 A1 | 2/2014 | Lapstun |
| 2014/0043370 A1 | 2/2014 | Payne et al. |
| 2014/0072141 A1 | 3/2014 | Cohen et al. |
| 2014/0126322 A1 | 5/2014 | Cipolla et al. |
| 2014/0132694 A1 | 5/2014 | Shacham et al. |
| 2014/0192087 A1 | 7/2014 | Frost |
| 2014/0253613 A1 | 9/2014 | Gilbert |
| 2014/0293385 A1 | 10/2014 | Smithwick |
| 2014/0300694 A1 | 10/2014 | Smalley et al. |
| 2014/0300695 A1 | 10/2014 | Smalley et al. |
| 2014/0300709 A1 | 10/2014 | Futterer et al. |
| 2014/0307179 A1 | 10/2014 | Zhao et al. |
| 2014/0320530 A1 | 10/2014 | Gruber et al. |
| 2014/0358002 A1 | 12/2014 | Daoura |
| 2014/0371353 A1 | 12/2014 | Mitchell et al. |
| 2015/0007025 A1 | 1/2015 | Sassi et al. |
| 2015/0016777 A1 | 1/2015 | Abovitz et al. |
| 2015/0022754 A1 | 1/2015 | Jepsen et al. |
| 2015/0085464 A1 | 3/2015 | Suzuki |
| 2015/0146132 A1 | 5/2015 | Katsuta et al. |
| 2015/0185841 A1 | 7/2015 | Levesque et al. |
| 2015/0192995 A1 | 7/2015 | Subramanian et al. |
| 2015/0201186 A1 | 7/2015 | Smithwick |
| 2015/0212274 A1 | 7/2015 | Kopp et al. |
| 2015/0219940 A1 | 8/2015 | Kim et al. |
| 2015/0241608 A1 | 8/2015 | Shian et al. |
| 2015/0247976 A1 | 9/2015 | Abovitz et al. |
| 2015/0277378 A1 | 10/2015 | Smithwick et al. |
| 2016/0004055 A1 | 1/2016 | Delsaut et al. |
| 2016/0014529 A1 | 1/2016 | Hecht et al. |
| 2016/0026253 A1 | 1/2016 | Bradski et al. |
| 2016/0070059 A1 | 3/2016 | Chen et al. |
| 2016/0091786 A1 | 3/2016 | Kazmierski et al. |
| 2016/0139402 A1 | 5/2016 | Lapstun |
| 2016/0170372 A1 | 6/2016 | Smithwick |
| 2016/0175701 A1 | 6/2016 | Froy et al. |
| 2016/0179261 A1 | 6/2016 | Drumm |
| 2016/0209657 A1 | 7/2016 | Popovich et al. |
| 2016/0223988 A1 | 8/2016 | Bove et al. |
| 2016/0274539 A1 | 9/2016 | Smithwick |
| 2016/0277843 A1 | 9/2016 | Babayoff et al. |
| 2016/0282614 A1 | 9/2016 | Zagolla et al. |
| 2016/0282808 A1 | 9/2016 | Smalley |
| 2017/0016996 A1 | 1/2017 | Welker et al. |
| 2017/0209121 A1 | 7/2017 | Davis et al. |
| 2017/0214907 A1 | 7/2017 | Lapstun |
| 2017/0289530 A1 | 10/2017 | Smithwick et al. |
| 2017/0363805 A1 | 12/2017 | Iwakawa |
| 2018/0063519 A1 | 3/2018 | Smithwick et al. |
| 2018/0084245 A1 | 3/2018 | Lapstun |
| 2018/0128973 A1 | 5/2018 | Powell et al. |
| 2018/0356591 A1 | 12/2018 | Karafin et al. |
| 2018/0372926 A1 | 12/2018 | Karafin et al. |
| 2018/0372958 A1 | 12/2018 | Karafin et al. |
| 2019/0004228 A1 | 1/2019 | Bevensee et al. |
| 2019/0004319 A1 | 1/2019 | Karafin et al. |
| 2019/0004326 A1 | 1/2019 | Karafin et al. |
| 2019/0011621 A1 | 1/2019 | Karafin et al. |
| 2019/0227226 A1 | 7/2019 | Abaie et al. |
| 2019/0259320 A1 | 8/2019 | Lapstun |
| 2020/0124746 A1 | 4/2020 | Welker |
| 2020/0394791 A1 | 12/2020 | Pang et al. |
| 2021/0063766 A1 | 3/2021 | Karafin et al. |
| 2021/0253468 A1 | 8/2021 | Wood et al. |

FOREIGN PATENT DOCUMENTS

| | | |
|---|---|---|
| CN | 1973226 A | 5/2007 |
| CN | 101052910 A | 10/2007 |
| CN | 101095244 A | 12/2007 |
| CN | 102231044 A | 11/2011 |
| CN | 102591124 A | 7/2012 |
| CN | 103616770 A | 3/2014 |
| CN | 103777455 A | 5/2014 |
| CN | 105334690 A | 2/2016 |
| CN | 105378377 A | 3/2016 |
| CN | 105637415 A | 6/2016 |
| CN | 106233227 A | 12/2016 |
| EP | 0973152 A2 | 1/2000 |
| EP | 1076246 A1 | 2/2001 |
| GB | 474564 A | 11/1937 |
| GB | 1399597 A | 7/1975 |
| GB | 2253070 A | 8/1992 |
| JP | S60030407 U | 3/1985 |
| JP | H0561417 A | 3/1993 |
| JP | H06258532 A | 9/1994 |
| JP | H08179131 A | 7/1996 |
| JP | H10186275 A | 7/1998 |
| JP | 2000066132 A | 3/2000 |
| JP | 2000347046 A | 12/2000 |
| JP | 2001313959 A | 11/2001 |
| JP | 2003524205 A | 8/2003 |
| JP | 2003330109 A | 11/2003 |
| JP | 2004078123 A | 3/2004 |
| JP | 2005181460 A | 7/2005 |
| JP | 2007025601 A | 2/2007 |
| JP | 2007098930 A | 4/2007 |
| JP | 2007512954 A | 5/2007 |
| JP | 2008052010 A | 3/2008 |
| JP | 2008055583 A | 3/2008 |
| JP | 2008518473 A | 5/2008 |
| JP | 2009053263 A | 3/2009 |
| JP | 2009169142 A | 7/2009 |
| JP | 2009169143 A | 7/2009 |
| JP | 2009530661 A | 8/2009 |
| JP | 2010536069 A | 11/2010 |
| JP | 2011090272 A | 5/2011 |
| JP | 2014142368 A | 8/2014 |
| JP | 2015143858 A | 8/2015 |
| JP | 2016518629 A | 6/2016 |
| JP | 7063520 B2 | 5/2022 |
| KR | 101298848 B1 | 8/2013 |
| TW | 200402012 A | 2/2004 |
| TW | 200633258 A | 9/2006 |
| TW | 200700695 A | 1/2007 |
| WO | 0106287 A1 | 1/2001 |
| WO | 0154106 A2 | 7/2001 |
| WO | 2005057670 A2 | 6/2005 |
| WO | 2008048360 A2 | 4/2008 |
| WO | 2008093721 A1 | 8/2008 |
| WO | 2011158752 A1 | 12/2011 |
| WO | 2012029081 A1 | 3/2012 |
| WO | 2013172233 A1 | 11/2013 |
| WO | 2014002526 A1 | 1/2014 |
| WO | 2016007920 A1 | 1/2016 |
| WO | 2017007526 A2 | 1/2017 |
| WO | 2017127897 A1 | 8/2017 |
| WO | 2019140348 A2 | 7/2019 |

OTHER PUBLICATIONS

JP2020-538912 Non-Final Notice of Reasons for Rejection from the Japan Patent Office dated Dec. 6, 2022.

(56) References Cited

OTHER PUBLICATIONS

JP2020-538941 Non-Final Notice of Reasons for Rejection from the Japan Patent Office dated Dec. 6, 2022.
AU-2017296074 Notice of Acceptance dated Mar. 12, 2020.
AU-2017297629 Notice of Acceptance dated Jul. 26, 2018.
AU-2018256628 Examination Report No. 1 dated Jul. 1, 2019.
CN201780043946.8 First Office Action of the Chinese Patent Office dated Dec. 22, 2020.
CN201780043946.8 Second Office Action of the Chinese Patent Office dated Sep. 15, 2021.
EA-201892634 Office Action of the Eurasian Patent Office dated Mar. 25, 2020.
EA-201892637 Office Action of the Eurasian Patent Office dated Mar. 6, 2020.
EP-17828597.9 European Extended Search Report of European Patent Office dated Jul. 20, 2020.
EP-17828632.4 European Partial Search Report of European Patent Office dated Feb. 10, 2020.
Hoshi, et al., "Noncontact tactile display based on radiation pressure of airborne ultrasound." IEEE Transactions on Haptics, vol. 3, No. 3 (2010): pp. 155-165.
IN201917001780 First Examination Report from the Indian Patent Office dated Aug. 13, 2021.
International Search Report and Written Opinion of PCT/US2017/042276 dated Nov. 24, 2017.
International Search Report and Written Opinion of PCT/US2016/023753 dated Jul. 15, 2016.
International Search Report and Written Opinion of PCT/US2017/042470 dated Dec. 28, 2017.
JP2019-501554 Non-Final Notice of Reasons for Rejection of the Japan Patent Office dated Mar. 29, 2022.
JP2019-501706 Non-Final Notice of Reasons for Rejection from the Japan Patent Office dated Aug. 10, 2021.
NZ-743813 First Examination Report dated Sep. 14, 2018.
Plesniak, Coincident Display Using Haptics and Holographic Video, Spatial Imaging Group, pp. 18-23 (Year: 1998).
TW-106123879 Office Action of the Taiwan Patent Office dated Oct. 29, 2020.
Watanabe, et al., "A Method for controlling tactile sensation of surfaces roughness using ultrasonic vibration." Robotics and Automation, 1995 Proceedings., 1995 IEEE International Conference on vol. 1. IEEE, 1995.
"Plastics-Vocabulary", International Organization for Standardization, Switzerland 1999, ISO 472 2013.
AU-2017296073 Examination Report No. 1 dated Aug. 15, 2018.
AU-2017296234 Examination Report No. 1 dated Jul. 19, 2018.
AU-2017296234 Examination Report No. 2 dated Sep. 24, 2018.
AU-2017297625 Examination Report No. 1 dated Jul. 20, 2018.
AU-2017297625 Examination Report No. 2 dated Sep. 24, 2018.
AU-2019200583 Examination Report No. 1 dated Oct. 17, 2019.
Choi et al., "Multiple-viewing-zone integral imaging using a dynamic barrier array for three-dimensional displays", Optics Express, vol. 11, No. 8, Apr. 21, 2003 (Apr. 21, 2003), p. 927.
CN201780044006.0 First Office Action of the Chinese Patent Office dated Dec. 16, 2020.
CN201780044008.X First Office Action of the Chinese Patent Office dated Sep. 29, 2020.
Davis et al., "Simulation of Anderson localization in a random fiber using a fast Fresnel diffraction algorithm", Optical Engineering, Soc. of Photo-Optical Instrumentation Engineers, Bellingham, vol. 55, No. 6, Jun. 1, 2016 (Jun. 1, 2016), p. 66122.
EA-201892633 Office Action of the Eurasian Patent Office dated Aug. 10, 2020.
EP-17828596.1 European Extended Search Report of European Patent Office dated Mar. 23, 2020.
EP-17828613.4 European Exam Report of European Patent Office dated Aug. 16, 2021.
EP-17828613.4 European Extended Search Report of European Patent Office dated Mar. 6, 2020.
EP-17828622.5 European Exam Report of European Patent Office dated Aug. 16, 2021.
EP-17828622.5 European Extended Search Report of European Patent Office dated Mar. 6, 2020.
EP-17828628.2 European Extended Search Report of European Patent Office dated Mar. 6, 2020.
EP-19738109.8 European Extended Search Report of European Patent Office dated Oct. 18, 2021.
EP-19738344.1 European Extended Search Report of European Patent Office dated Oct. 7, 2021.
EP-19738383.9 European Extended Search Report of European Patent Office dated Oct. 15, 2021.
Gerald L., "Size of Letters Required for Visibility as a Function of Viewing Distance and Observer Visual Acuity," U.S. Department of Commerce/National Bureau of Statistics, Jul. 1983.
International Preliminary Report on Patentability of PCT/US2017/042418 dated Mar. 25, 2019.
International Search Report and Written Opinion of PCT/US2017/042275 dated Dec. 4, 2017.
International Search Report and Written Opinion of PCT/US2017/042418 dated Dec. 20, 2017.
International Search Report and Written Opinion of PCT/US2017/042452 dated Nov. 17, 2017.
International Search Report and Written Opinion of PCT/US2017/042466 dated Nov. 28, 2017.
International Search Report and Written Opinion of PCT/US2019/013310 dated May 13, 2019.
International Search Report and Written Opinion of PCT/US2019/013399 dated Jun. 10, 2019.
International Search Report and Written Opinion of PCT/US2019/013552 dated May 2, 2019.
JP2019-501428 Non-Final Notice of Reasons for Rejection from the Japan Patent Office dated Aug. 3, 2021.
JP2019-501531 Non-Final Notice of Reasons for Rejection of the Japan Patent Office dated Sep. 24, 2021.
JP2019-501554 Non-Final Notice of Reasons for Rejection of the Japan Patent Office dated Jun. 8, 2021.
Karbasi et al., "Image transport using Anderson localized modes in disordered optical fibers", Proeedings of SPIE, IEEE, US, vol. 8992, Mar. 8, 2014 (Mar. 8, 2014), pp. 89920J-89920J.
Lewter, "Adjustable Slab Slump Molds—Electric Cone 6 & Other Ways w/ Clay", Oct. 2, 2017 (Oct. 2, 2017) pp. 1-3.
Mafi et al., "Anderson localisation in fibres", 2014 The European Conference On Optical Communication (ECOC), Systematic Paris Region Systems and ICT Cluster, Sep. 21, 2014 (Sep. 21, 2014), pp. 1-3.
Mafi, "Transverse Anderson localization of light: a tutorial", Advances in Optics and Photonics, vol. 7, No. 3, Sep. 30, 2015 (Sep. 30, 2015), p. 459.
NZ-743822 Further Examination Report dated Jun. 11, 2019.
Smith, T.E., "Notebook for Spatial Data Analysis, Part I, Spatial Point Pattern Analysis", (2016) ESE 502, (http://www.seas.upenn.edu/~ese502/#notebook).
TW106123878 Office Action of the Taiwan Patent Office dated Nov. 15, 2021.
Wetzstein et al., "On Plenoptic Multiplexing and Reconstruction", International Journal on Computer Vision (IJCV, vol. 101, No. 2, (20130000), pp. 384-400, URL: https://hal.inria.fr/hal-00876493, (Sep. 26, 2017).
1 KR-10-2019-7004588 Notice of Preliminary Rejection dated Apr. 25, 2022.
CN201980018280.X First Office Action dated Jun. 8, 2022.
International Search Report and Written Opinion of PCT/US2021/010055 dated May 23, 2022.
RU-2020124316 Office Action of the Russian Patent Office dated Aug. 10, 2022.
JP2022-067992 Non-Final Notice of Reasons for Rejection from the Japan Patent Office dated Mar. 14, 2023.
CA-3030873 Office action dated Aug. 10, 2023.
EP-19738344.1 European Exam Report of European Patent Office dated Aug. 9, 2023.

(56) References Cited

OTHER PUBLICATIONS

Fifty years of Anderson localization, Ad Lagendijk, Bart van Tiggelen, and Diederik S. Wiersma, Phsyics Today 62(8), 24 (2009). (Year: 2009).
CN201980018334.2 Second Office Action of the Chinese Patent Office dated May 10, 2023.
JP2020-538912 Final Notice of Reasons for Rejection of the Japan Patent Office dated May 30, 2023.
JP2020-538941 Final Notice of Reasons for Rejection of the Japan Patent Office dated May 30, 2023.

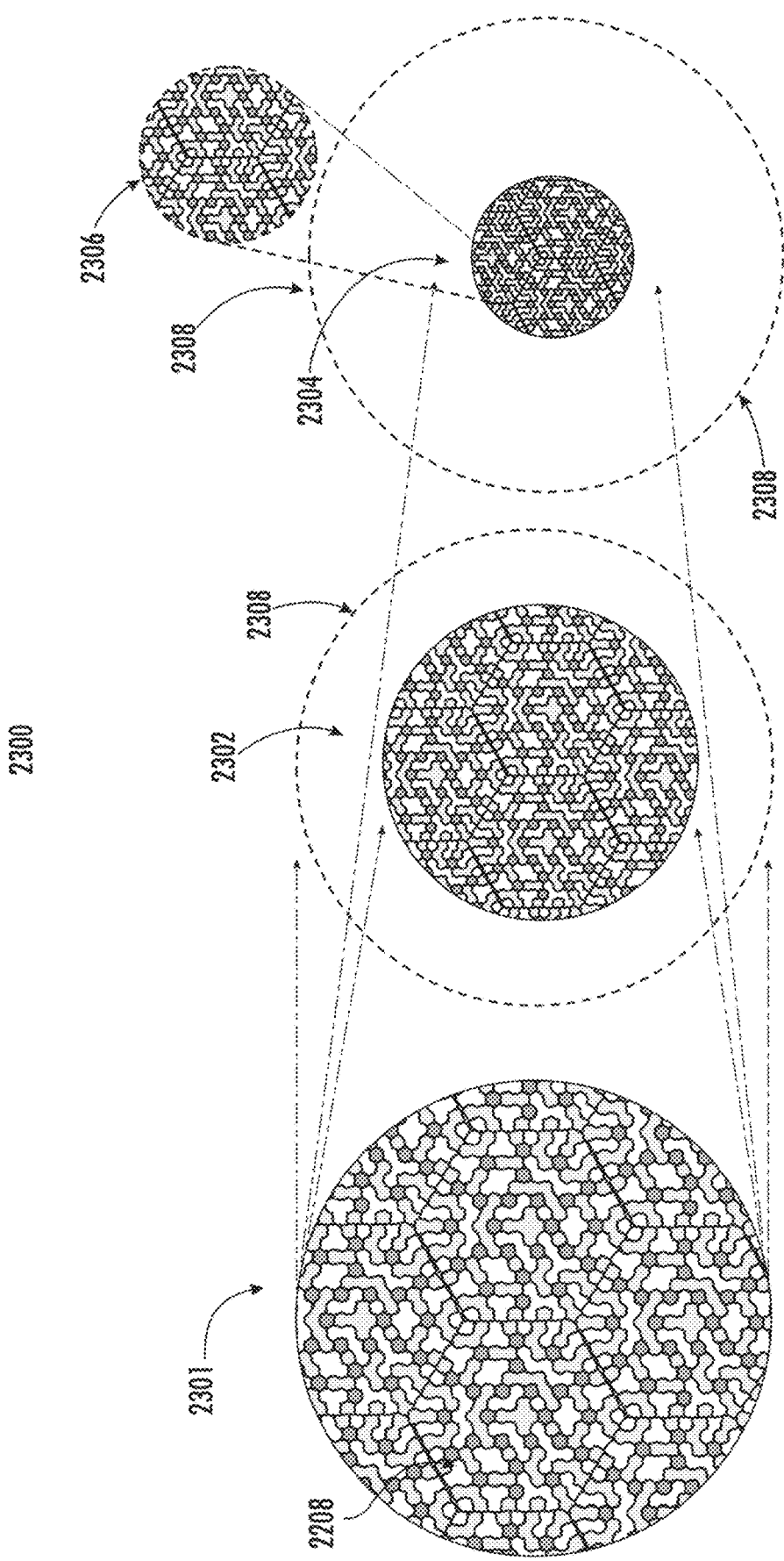

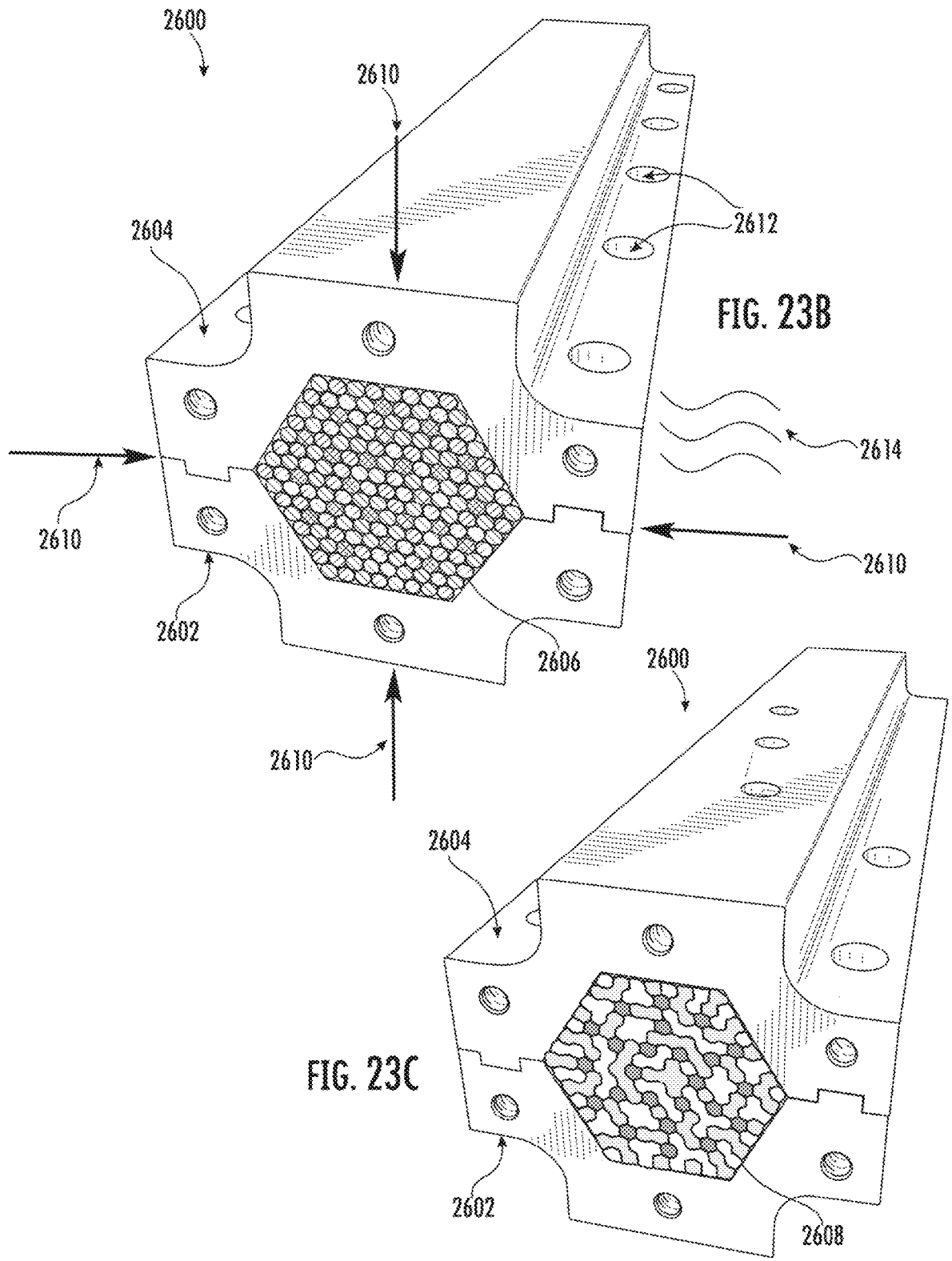

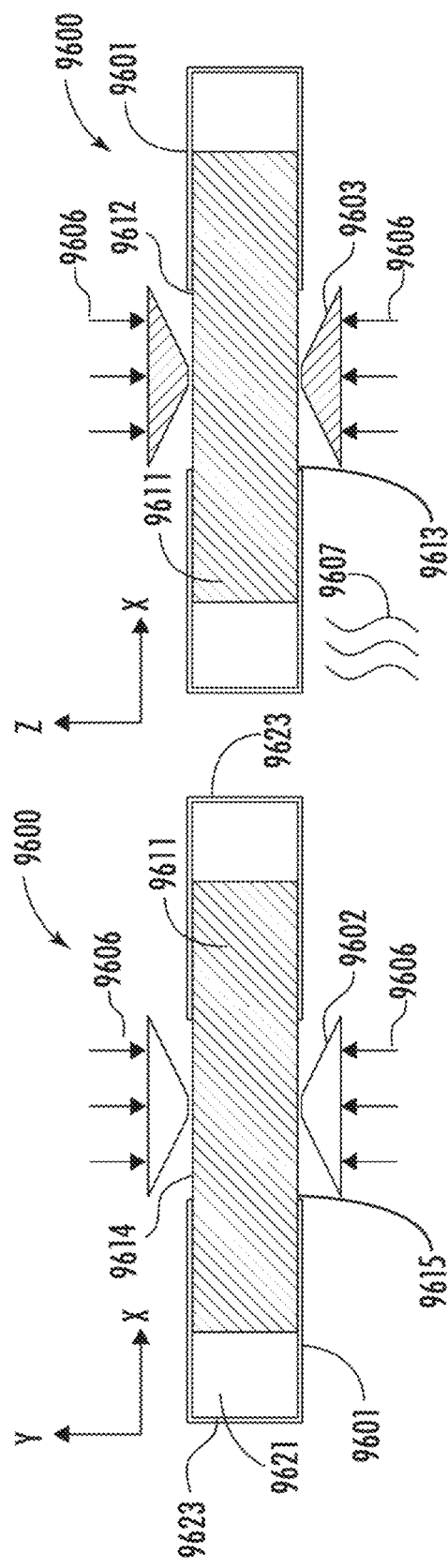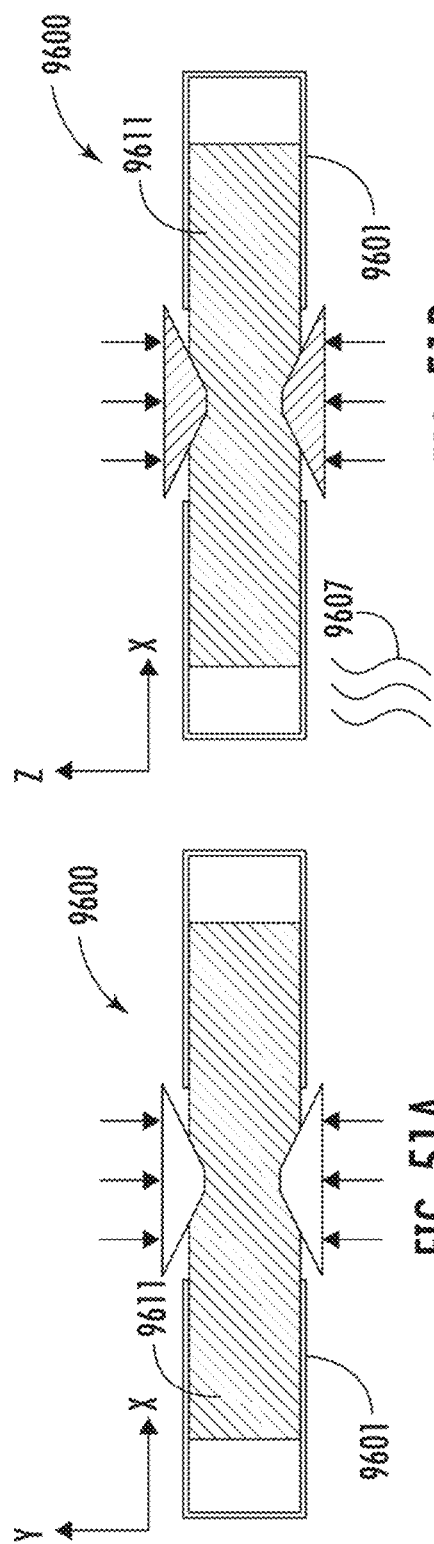

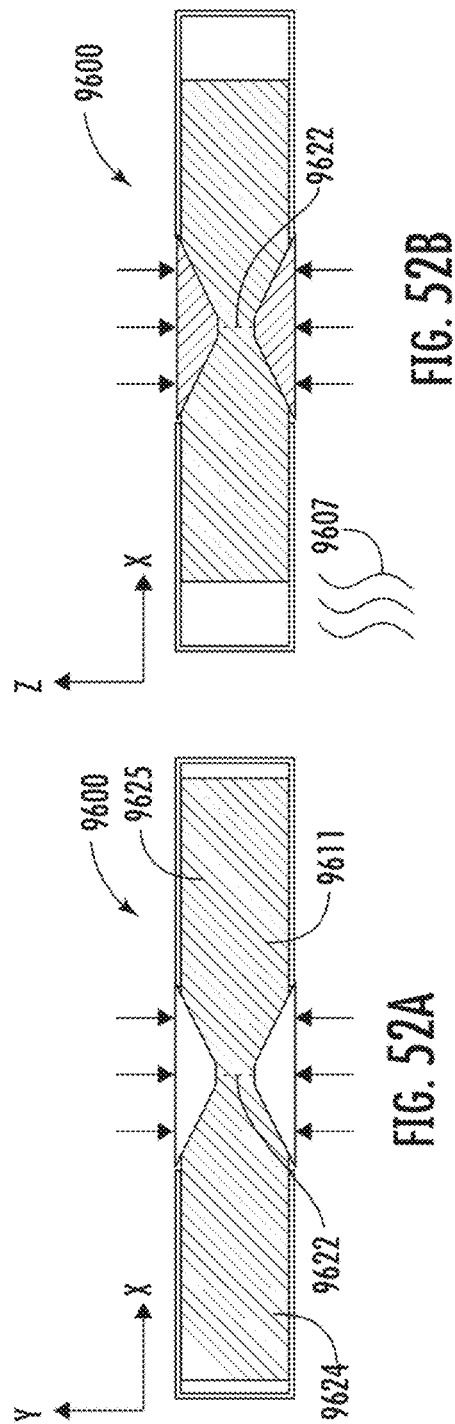
FIG. 52A
FIG. 52B
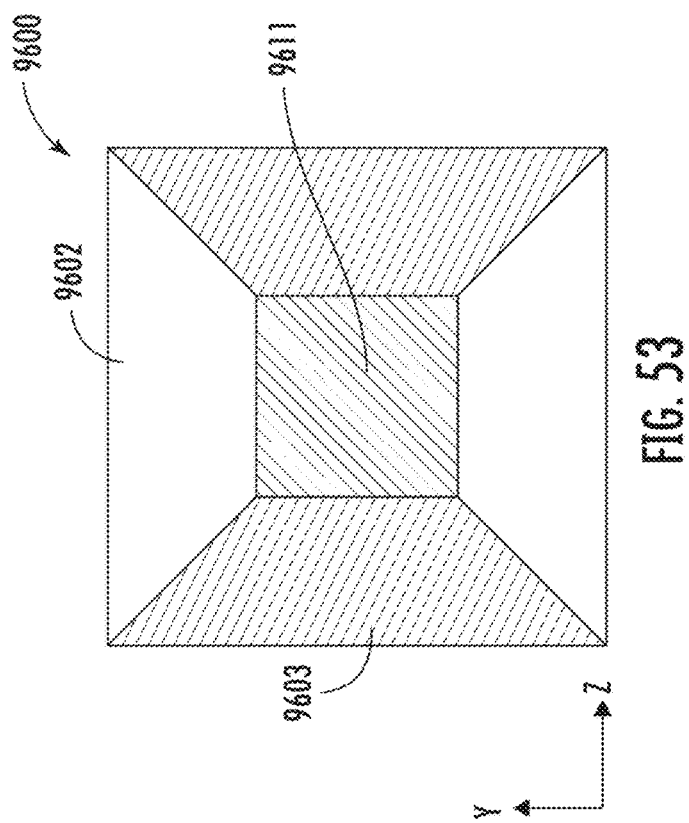
FIG. 53

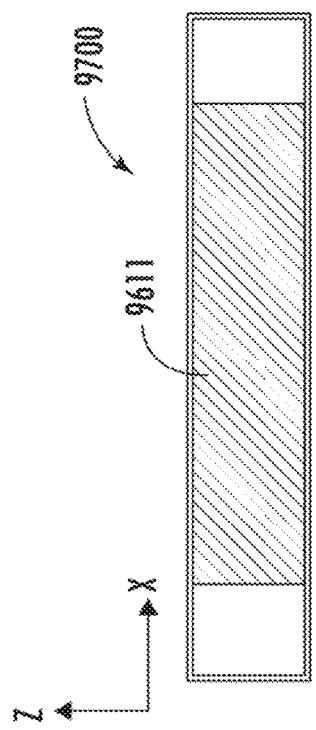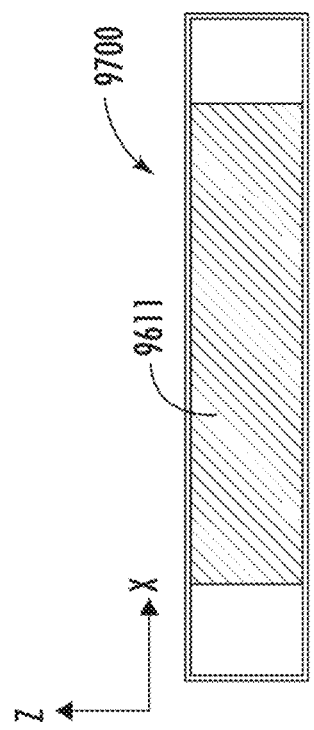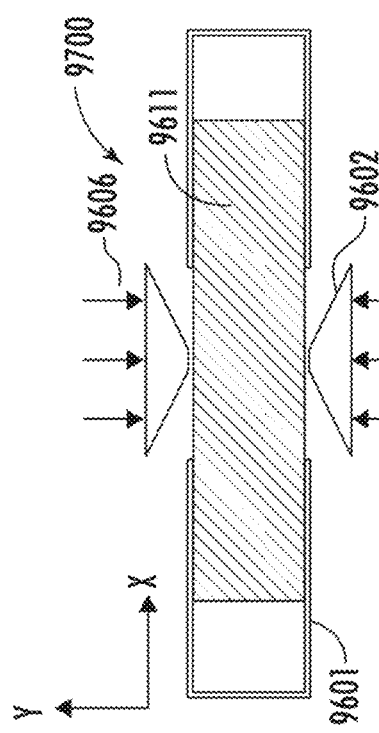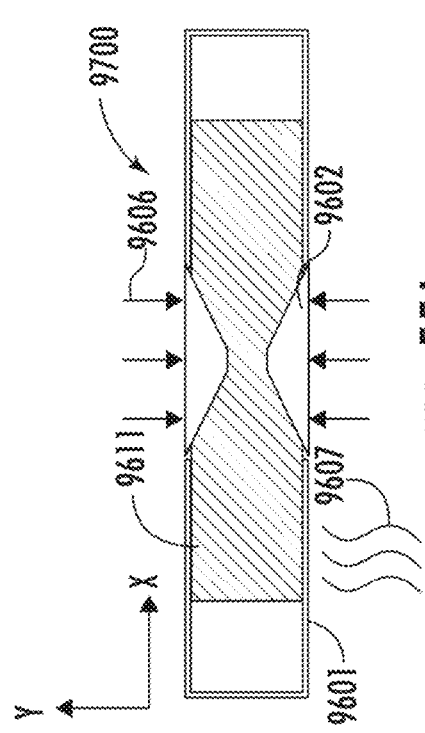

SYSTEMS AND METHODS FOR FORMING ENERGY RELAYS WITH TRANSVERSE ENERGY LOCALIZATION

CROSS-REFERENCE TO RELATED APPLICATIONS

This application is a continuation of application Ser. No. 16/634,088, filed on Jan. 24, 2020, now U.S. Pat. No. 11,237,307, which was filed as application No. PCT/US19/13399 on Jan. 12, 2019.

This application claims the benefit of priority to U.S. Provisional Patent Application No. 62/617,288, entitled "System and Methods for Transverse Energy Localization in Energy Relays Using Ordered Structures," filed Jan. 14, 2018, and to U.S. Provisional Patent Application No. 62/617,293, entitled "Novel Application of Holographic and Light Field Technology," filed Jan. 14, 2018, which are both herein incorporated by reference in their entirety.

TECHNICAL FIELD

This disclosure generally relates to forming energy relays, and more specifically to methods and devices for forming energy relays with transverse energy localization.

BACKGROUND

The dream of an interactive virtual world within a "holodeck" chamber as popularized by Gene Roddenberry's Star Trek and originally envisioned by author Alexander Moszkowski in the early 1900s has been the inspiration for science fiction and technological innovation for nearly a century. However, no compelling implementation of this experience exists outside of literature, media, and the collective imagination of children and adults alike.

SUMMARY

Disclosed are systems and methods for manufacturing energy relays for energy directing systems inducing ordered energy localization effects. Ordered energy relay material distribution criteria are disclosed. Transverse planar as well as multi-dimensional ordered material configurations are discussed. Methods and systems are disclosed for forming ordered energy relay materials with energy localization properties.

In an embodiment, a method for forming an energy relay comprises: providing first and second energy relay materials; forming an arrangement of the first and second energy relay materials in a transverse plane of the energy relay, the arrangement allowing for energy to be transported along a longitudinal plane of the energy relay material such that the energy relay has a substantially higher energy transport efficiency in the longitudinal plane than in the transverse plane; accommodating the arrangement of first and second energy relay materials in a constrained space; processing the arrangement while accommodated in the constrained space to form a fused structure; the fused structure having a transverse dimension defined by the constrained space; and removing the fused structure of energy relay material from the constrained space after the processing step.

In an embodiment, a method comprises: heating at least a first portion of the fused structure, the first portion having a first transverse dimension prior to being heated; and applying a tensile force longitudinally along at least the first portion of the heated fused structure, thereby altering the first portion to have a second transverse dimension, narrower than the first transverse dimension, while substantially maintaining the arrangement of first and second energy relay materials.

In an embodiment, a method for altering a dimension of an energy relay material comprises: providing an energy relay material configured to transport energy along a longitudinal plane of the energy relay material with a substantially higher energy transport efficiency in the longitudinal plane than in a transverse plane, perpendicular to the longitudinal plane; accommodating the energy relay material in a constrained space; conforming the energy relay material to at least a portion of the constrained space; and removing the conformed energy relay material from the constrained space; and wherein the constrained space comprises a shape that allows at least a portion of the conformed energy relay material to have a reduced transverse dimension along the longitudinal plane of the energy relay material.

In an embodiment, a method comprises providing a fixture defining the constrained space, the fixture having a first end and a second end, and a middle portion extending therebetween along a longitudinal direction, wherein the middle portion of the fixture comprises at least one aperture defined therethrough; and wherein conforming comprises imposing a wedge at least partially through the at least one aperture, whereby the wedge cooperates with the fixture to conform a portion of the energy relay material to a reduced transverse dimension.

In an embodiment, a method comprises providing a plurality of adjustable walls extending along a longitudinal direction and defining a perimeter of the constrained space operable to accommodate the energy relay material, and configured to vary a transverse dimension of at least a portion of the constrained space along the longitudinal direction by adjusting positions of the adjustable walls relative to one another in a transverse direction, perpendicular to the longitudinal direction.

In an embodiment, a method comprises providing a mold comprising a molding portion, wherein the mold defines the constrained space, and the shape that allows at least the portion of the conformed energy relay material to have the reduced transverse dimension is provided at least in part by a shape of the molding portion of the mold, the shape of the molding portion comprising a reduced transverse dimension end; accommodating an end portion of the energy relay material in the reduced transverse dimension end of the molding portion, wherein a dimension of the end portion of the energy relay material is substantially equivalent to a dimension of the reduced transverse dimension end of the molding portion; heating the energy relay material to a temperature such that the energy relay material has a formability in both the longitudinal and transverse planes to allow reforming of at least the transverse dimension of the energy relay material; substantially conforming the energy relay material to the shape of the molding portion; cooling the conformed energy relay material and the mold; and separating the conformed energy relay material from the mold.

In an embodiment, a method comprises: providing a mold that defines the shape of the constrained space, wherein the shape of the constrained space comprises at least a portion of an inverse shape of a formed tapered energy relay array; providing an energy relay material; wherein conforming comprises: heating the energy relay material and the mold to a temperature such that the energy relay material has a formability in both the longitudinal and transverse planes to allow reforming of at least the transverse plane of the energy relay material; and applying a force to at least one of the energy relay material and the mold to substantially conform at least a portion of the energy relay material to the shape of the formed tapered energy relay array; wherein the method further comprises cooling the conformed energy relay material and the mold.

In an embodiment, a fixture for defining a constrained space configured to accommodate energy relay materials therein comprises: a first end and a second end, and a middle portion extending therebetween along a longitudinal direction, wherein the middle portion of the fixture comprises at least one aperture defined therethrough; and a wedge configured to be imposable at least partially through the at least one aperture, whereby the wedge cooperates to define a transverse dimension of the constrained space.

In an embodiment, a fixture for defining a constrained space configured to accommodate energy relay material therein, the fixture comprising: a mold that comprises an inverse of a formed energy relay array shape; wherein the inverse of the formed relay array shape comprises at least one inverse relay element compartment, the at least one compartment comprising: a narrow end having a first cross sectional area, a wide end having a second cross sectional area greater than the first cross sectional area, and sloped walls connecting edges of the wide and narrow ends.

In an embodiment, a fixture for defining a constrained space comprises: first and second components configured to join together to form the constrained space therebetween; wherein the constrained space is configured to accommodate one or more energy relay materials in an arrangement in a transverse plane of the one or more energy relay materials allowing for energy to be transported along a longitudinal plane of the one or more energy relay materials such that the one or more energy relay materials have a substantially higher energy transport efficiency in the longitudinal plane than in the transverse plane.

In an embodiment, a mold for defining a constrained space configured to accommodate an energy relay material therein comprises: a molding portion comprising an inverse shape of a tapered energy relay shape, the molding portion configured to allow at least a portion of the energy relay material to be conformed to the tapered energy relay shape; the mold further configured to accommodate a first end portion of the energy relay material to a reduced transverse dimension end of the molding portion, wherein a dimension of the first end portion in a transverse plane of the energy relay material is substantially equivalent to a dimension of the reduced transverse dimension end of the molding portion.

In an embodiment, a fixture for defining a constrained space configured to accommodate one or more energy relay materials therein comprises: a plurality of adjustable walls extending along a longitudinal direction and defining the constrained space therebetween, and configured to vary a transverse dimension of at least a portion of the constrained space along the longitudinal direction by adjusting positions of the adjustable walls relative to one another in a transverse direction, perpendicular to the longitudinal direction.

BRIEF DESCRIPTION OF THE DRAWINGS

FIG. 20 illustrates an embodiment for forming energy relays with a reduced transverse dimension;

FIG. 23B illustrates a perspective view of an assembled fixture containing energy relay materials as part of a process of relaxing and fusing the energy relay materials;

FIG. 23C illustrates a perspective view of an assembled fixture containing energy relay materials after the materials have fused together, to form the fused energy relay material.

FIG. 50A-FIG. 52B illustrate a multistep process where forces applied to wedges that contain a desired taper sloped profile may be used to compress relay material in two dimensions simultaneously with the application of heat in order to generate two taper relays;

FIG. 53 illustrates an end-view of the tapered relay shown in FIG. 52A and FIG. 52B, after all processing steps have been completed;

FIG. 54A-FIG. 58B illustrate a process similar to that shown in FIGS. 50A to 52B, except that the compression occurs in two steps, separately for each orthogonal dimension (Y, Z), rather than occurring simultaneously;

DETAILED DESCRIPTION

Figure 1:
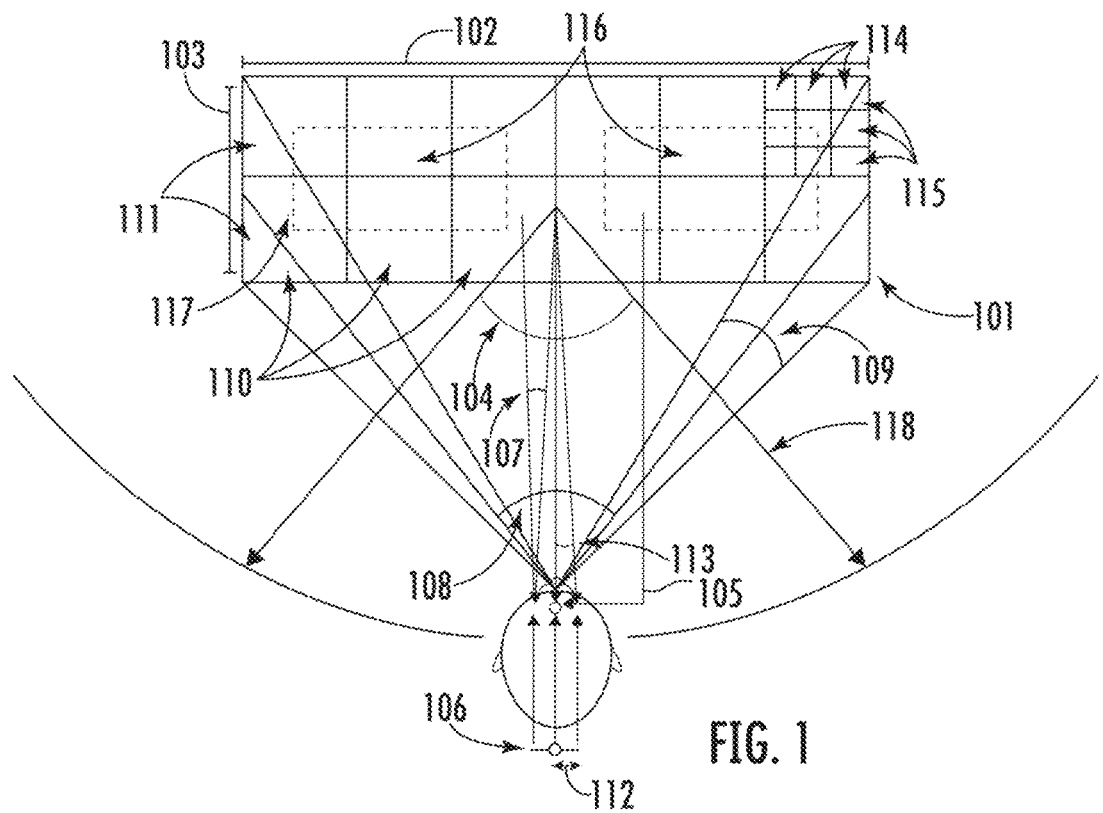
FIG. 1 is a schematic diagram illustrating design parameters for an energy directing system.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of electromagnetic and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory systems at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have 1 to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bi-directional energy surface architecture, all components may be configured to form the appropriate structures for any energy domain to enable holographic propagation.

However, the main challenge to enable the Holodeck today involves available visual technologies and electromagnetic device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations

Overview of Light Field Energy Propagation Resolution

Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there. In some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 101, surface width 102, surface height 103, a determined target seating distance 118, the target seating field of view field of view from the center of the display 104, the number of intermediate samples demonstrated here as samples between the eyes 105, the average adult inter-ocular separation 106, the average resolution of the human eye in arcmin 107, the horizontal field of view formed between the target viewer location and the surface width 108, the vertical field of view formed between the target viewer location and the surface height 109, the resultant horizontal waveguide element resolution, or total number of elements, across the surface 110, the resultant vertical waveguide element resolution, or total number of elements, across the surface 111, the sample distance based upon the inter-ocular spacing between the eyes and the number of intermediate samples for angular projection between the eyes 112, the angular sampling may be based upon the sample distance and the target seating distance 113, the total resolution Horizontal per waveguide element derived from the angular sampling desired 114, the total resolution Vertical per waveguide element derived from the angular sampling desired 115, device Horizontal is the count of the determined number of discreet energy sources desired 116, and device Vertical is the count of the determined number of discreet energy sources desired 117.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or +/−60 degrees about the center of the display), desired intermediate samples at a distance (e.g., one additional propagation path between the eyes), the average inter-ocular separation of an adult (approximately 65 mm), and the average resolution of the human eye (approximately 1 arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

$$\bullet \text{ Surface Aspect Ratio} = \frac{\text{Width }(W)}{\text{Height }(H)}$$

$$\bullet \text{ Surface Horizontal Size} = \text{Surface Diagonal} * \left(\frac{1}{\sqrt{1+\left(\frac{H}{W}\right)^2}}\right)$$

$$\bullet \text{ Surface Vertical Size} = \text{Surface Diagonal} * \left(\frac{1}{\sqrt{1+\left(\frac{W}{H}\right)^2}}\right)$$

$$\bullet \text{ Horizontal Field of View} = 2*atan\left(\frac{\text{Surface Horizontal Size}}{2*\text{Seating Distance}}\right)$$

$$\bullet \text{ Vertical Field of View} = 2*atan\left(\frac{\text{Surface Verticle Size}}{2*\text{Seating Distance}}\right)$$

$$\bullet \text{ Horizontal Element Resolution} = \text{Horizontal } FoV * \frac{60}{\text{Eye Resolution}}$$

$$\bullet \text{ Vertical Element Resolution} = \text{Vertical } FoV * \frac{60}{\text{Eye Resolution}}$$

The above calculations result in approximately a 32×18° field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

$$\bullet \text{ Sample Distance} = \frac{\text{Inter} - \text{Ocular Distance}}{(\text{Number of Desired Intermediate Samples} + 1)}$$

$$\bullet \text{ Angular Sampling} = atan\left(\frac{\text{Sample Distance}}{\text{Seating Distance}}\right)$$

In this case, the inter-ocular distance is leveraged to calculate the sample distance although any metric may be leveraged to account for appropriate number of samples as a given distance. With the above variables considered, approximately one ray per 0.57° may be desired and the total system resolution per independent sensory system may be determined, given:

- Locations Per Element $(N) = \frac{\text{Seating } FoV}{\text{Angular Sampling}}$
- Total Resolution $H = N * \text{Horizontal Element Resolution}$
- Total Resolution $V = N * \text{Vertical Element Resolution}$ With the above scenario given the size of energy surface and the angular resolution addressed for the visual acuity system, the resultant energy surface may desirably include approximately 400 k×225 k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Current Technology Limitations

Active Area, Device Electronics, Packaging, and the Mechanical Envelope

Figure 2:
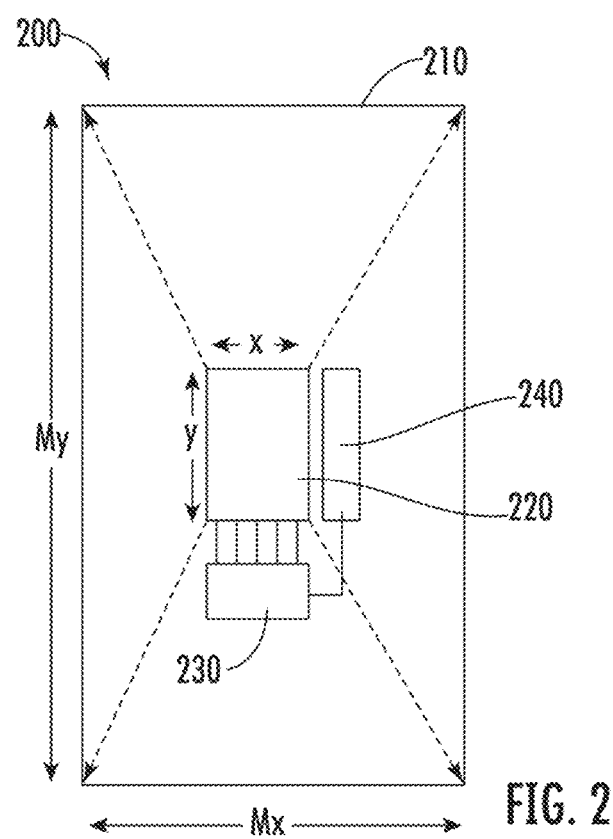
FIG. 2 is a schematic diagram illustrating an energy system having an active device area with a mechanical envelope.

FIG. 2 illustrates a device 200 having an active area 220 with a certain mechanical form factor. The device 200 may include drivers 230 and electronics 240 for powering and interface to the active area 220, the active area having a dimension as shown by the x and y arrows. This device 200 does not take into account the cabling and mechanical structures to drive, power and cool components, and the mechanical footprint may be further minimized by introducing a flex cable into the device 200. The minimum footprint for such a device 200 may also be referred to as a mechanical envelope 210 having a dimension as shown by the M:x and M:y arrows. This device 200 is for illustration purposes only and custom electronics designs may further decrease the mechanical envelope overhead, but in almost all cases may not be the exact size of the active area of the device. In an embodiment, this device 200 illustrates the dependency of electronics as it relates to active image area 220 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 200 may result in a design that is much larger with less reliability.

For exemplary purposes only, assuming energy devices with an energy location density of 3840×2160 sites, one may determine the number of individual energy devices (e.g., device 100) desired for an energy surface, given:

- Devices $H = \frac{\text{Total Resolution } H}{\text{Device Resolution } H}$
- Devices $V = \frac{\text{Total Resolution } V}{\text{Device Resolution } V}$ Given the above resolution considerations, approximately 105×105 devices similar to those shown in FIG. 2 may be desired. It should be noted that many devices may include various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces

Configurations and Designs for Arrays of Energy Relays

In some embodiments, approaches are disclosed to address the challenge of generating high energy location density from an array of individual devices without seams due to the limitation of mechanical structure for the devices. In an embodiment, an energy propagating relay system may allow for an increase in the effective size of the active device area to meet or exceed the mechanical dimensions to configure an array of relays and form a singular seamless energy surface.

Figure 3:
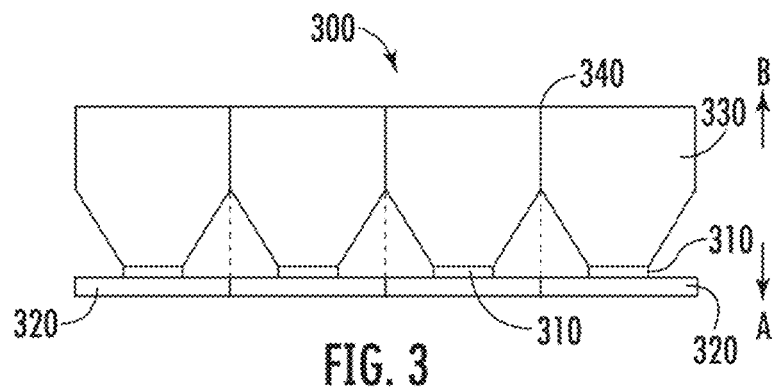
FIG. 3 is a schematic diagram illustrating an energy relay system.

FIG. 3 illustrates an embodiment of such an energy relay system 300. As shown, the relay system 300 may include a device 310 mounted to a mechanical envelope 320, with an energy relay element 330 propagating energy from the device 310. The relay element 330 may be configured to provide the ability to mitigate any gaps 340 that may be produced when multiple mechanical envelopes 320 of the device are placed into an array of multiple devices 310.

For example, if a device's active area 310 is 20 mm×10 mm and the mechanical envelope 320 is 40 mm×20 mm, an energy relay element 330 may be designed with a magnification of 2:1 to produce a tapered form that is approximately 20 mm×10 mm on a minified end (arrow A) and 40 mm×20 mm on a magnified end (arrow B), providing the ability to align an array of these elements 330 together seamlessly without altering or colliding with the mechanical envelope 320 of each device 310. Mechanically, the relay elements 330 may be bonded or fused together to align and polish ensuring minimal seam gap 340 between devices 310. In one such embodiment, it is possible to achieve a seam gap 340 smaller than the visual acuity limit of the eye.

Figures 4, 5A, 5B:
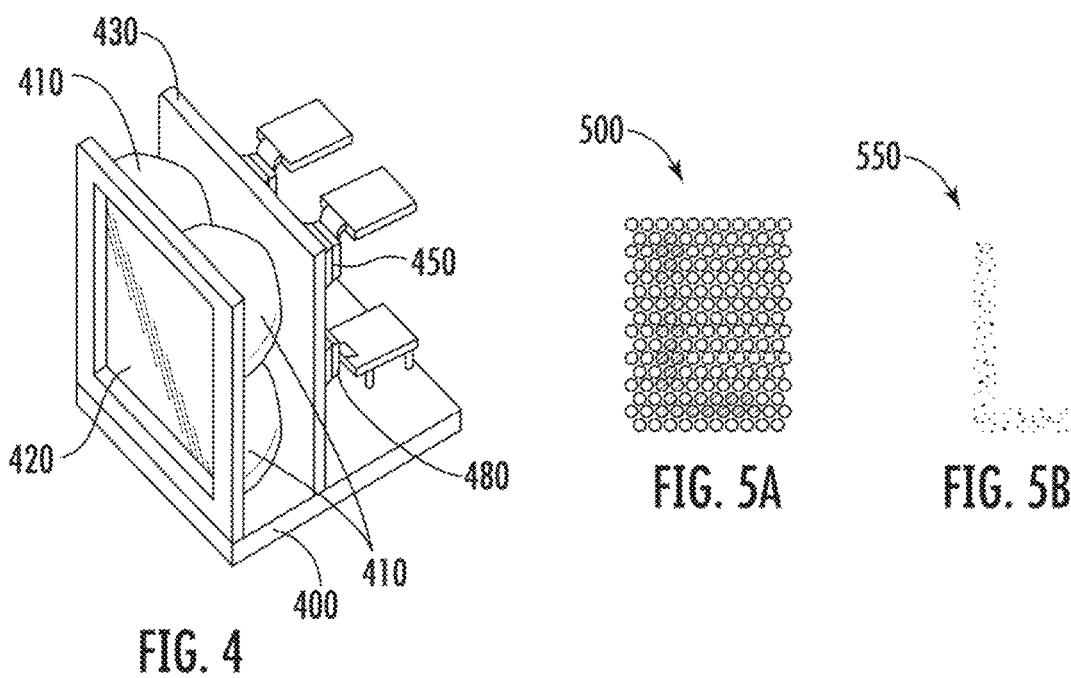
FIG. 4 is a schematic diagram illustrating an embodiment of energy relay elements adhered together and fastened to a base structure.
FIG. 5A is a schematic diagram illustrating an example of a relayed image through multi-core optical fibers.
FIG. 5B is a schematic diagram illustrating an example of a relayed image through an optical relay that exhibits the properties of the Transverse Anderson Localization principle.

FIG. 4 illustrates an example of a base structure 400 having energy relay elements 410 formed together and securely fastened to an additional mechanical structure 430. The mechanical structure of the seamless energy surface 420 provides the ability to couple multiple energy relay elements 410, 450 in series to the same base structure through bonding or other mechanical processes to mount relay elements 410, 450. In some embodiments, each relay element 410 may be fused, bonded, adhered, pressure fit, aligned or otherwise attached together to form the resultant seamless energy surface 420. In some embodiments, a device 480 may be mounted to the rear of the relay element 410 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless display surface directing energy along propagation paths extending between one or more energy locations and the seamless display surface, and where the separation between the edges of any two adjacent second sides of the terminal energy relay elements is less than the minimum perceptible contour as defined by the visual acuity of a human eye having better than 20/40 vision at a distance greater than the width of the singular seamless display surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/−10-degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bi-directional energy propagation throughout the system.

In an embodiment, the energy relays are provided as loose coherent elements.

Introduction to Component Engineered Structures

Disclosed Advances in Transverse Anderson Localization Energy Relays

The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of 70:30 will transmit at best 70% of received energy transmission) and additionally forms a strong pixelated patterning in the propagated energy.

FIG. 5A illustrates an end view of an example of one such non-Anderson Localization energy relay 500, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 5A.

FIG. 5B, illustrates an example of the same relayed image 550 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein energy waves propagating through the energy relay have higher transport efficiency in the longitudinal orientation versus the transverse orientation and are spatially localized in the transverse orientation.

In an embodiment, a randomized distribution of material wave propagation properties in a transverse plane within the dimensional lattice may lead to undesirable configurations due to the randomized nature of the distribution. A randomized distribution of material wave propagation properties may induce Anderson Localization of energy on average across the entire transverse plane, however limited areas of similar materials having similar wave propagation properties may form inadvertently as a result of the uncontrolled random distribution. For example, if the size of these local areas of similar wave propagation properties become too large relative to their intended energy transport domain, there may be a potential reduction in the efficiency of energy transport through the material.

In an embodiment, a relay may be formed from a randomized distribution of component engineered structures to transport visible light of a certain wavelength range by inducing Transverse Anderson Localization of the light. However, due to their random distribution, the structures may inadvertently arrange such that a continuous area of a single component engineered structure forms across the transverse plane which is multiple times larger than the wavelength of visible light. As a result, visible light propagating along the longitudinal axis of the large, continuous, single-material region may experience a lessened Transverse Anderson Localization effect and may suffer degradation of transport efficiency through the relay.

In an embodiment, it may be desirable to design a non-random pattern of material wave propagation properties in the transverse plane of an energy relay material. Such a non-random pattern would ideally induce an energy localization effect through methods similar to Transverse Anderson Localization, while minimizing potential reductions in transport efficiency due to abnormally distributed material properties inherently resulting from a random property distribution. Using a non-random pattern of material wave propagation properties to induce a transverse energy localization effect similar to that of Transverse Anderson Localization in an energy relay element will hereafter be referred to as Ordered Energy Localization.

In an embodiment, multiple energy domains may be configured within a single, or between multiple Ordered Energy Localization energy relays to direct one or more sensory holographic energy propagation paths including visual, acoustic, tactile or other energy domains.

In an embodiment, a seamless energy surface is configured with Ordered Energy Localization energy relays that comprise two or more first sides for each second side to both receive and emit one or more energy domains simultaneously to provide bi-directional energy propagation throughout the system.

In an embodiment, the Ordered Energy Localization energy relays are configured as loose coherent or flexible energy relay elements.

Considerations for 4D Plenoptic Functions

Selective Propagation of Energy Through Holographic Waveguide Arrays

As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plenoptic function with a structure configured to alter an angular direction of the energy waves passing through representing the angular component of the 4D plenoptic function, wherein the energy waves propagated may converge in space in accordance with a plurality of propagation paths directed by the 4D plenoptic function.

Figure 6:
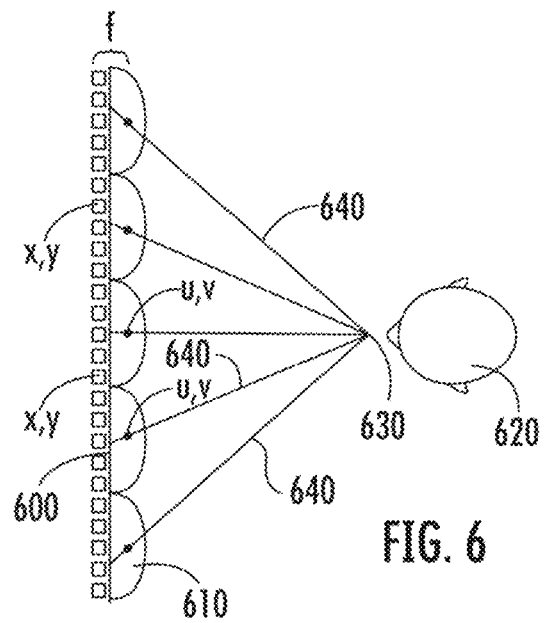
FIG. 6 is a schematic diagram showing rays propagated from an energy surface to a viewer.

Reference is now made to FIG. 6 illustrating an example of light field energy surface in 4D image space in accordance with a 4D plenoptic function. The figure shows ray traces of an energy surface 600 to a viewer 620 in describing how the rays of energy converge in space 630 from various positions within the viewing volume. As shown, each waveguide element 610 defines four dimensions of information describing energy propagation 640 through the energy surface 600. Two spatial dimensions (herein referred to as x and y) are the physical plurality of energy locations that can be viewed in image space, and the angular components theta and phi (herein referred to as u and v), which is viewed in virtual space when projected through the energy waveguide array. In general, and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due to designs that have not accurately accounted for any of diffraction, scatter, diffusion, angular direction, calibration, focus, collimation, curvature, uniformity, element crosstalk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bi-directional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multi-layered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck

Aggregation of Bi-directional Seamless Energy Surface Systems to Stimulate Human Sensory Receptors within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bi-directional holographic energy propagation, emission, reflection, or sensing.

In an embodiment, an environment of tiled seamless energy systems are aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregated tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bi-directionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bi-directional energy propagation and aggregated surfaces are possible.

In an embodiment, the system comprises an energy waveguide capable of bi-directional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bi-directional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bi-directional captured data and projection information.

In some embodiments, a plurality of combinations of three energy devices comprising an ultrasonic sensor, a visible electromagnetic display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and electromagnetic energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration files.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy system may also be configured as a wearable bi-directional device, such as virtual reality (VR) or augmented reality (AR). In other embodiments, the energy system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

Tapered Energy Relays

In order to further solve the challenge of generating high resolution from an array of individual energy wave sources containing extended mechanical envelopes, the use of tapered energy relays can be employed to increase the effective size of each energy source. An array of tapered energy relays can be stitched together to form a singular contiguous energy surface, circumventing the limitation of mechanical requirements for those energy sources.

In an embodiment, the one or more energy relay elements may be configured to direct energy along propagation paths which extend between the one or more energy locations and the singular seamless energy surface.

For example, if an energy wave source's active area is 20 mm×10 mm and the mechanical envelope is 40 mm×20 mm, a tapered energy relay may be designed with a magnification of 2:1 to produce a taper that is 20 mm×10 mm (when cut) on the minified end and 40 mm×20 mm (when cut) on the magnified end, providing the ability to align an array of these tapers together seamlessly without altering or violating the mechanical envelope of each energy wave source.

Figure 26:
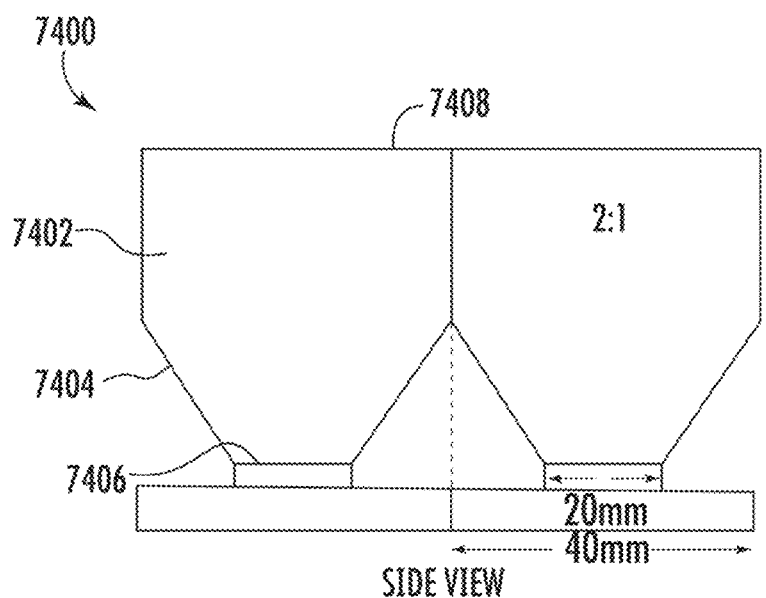
FIG. 26 illustrates a tapered energy relay mosaic arrangement.

FIG. 26 illustrates one such tapered energy relay mosaic arrangement 7400, in accordance with one embodiment of the present disclosure. In FIG. 26, the relay device 7400 may include two or more relay elements 7402, each relay element 7402 formed of one or more structures, each relay element 7402 having a first surface 7406, a second surface 7408, a transverse orientation (generally parallel to the surfaces 7406, 7408) and a longitudinal orientation (generally perpendicular to the surfaces 7406, 7408). The surface area of the first surface 7406 may be different than the surface area of the second surface 7408. For relay element 7402, the surface area of the first surface 7406 is less than the surface area of the second surface 7408. In another embodiment, the surface area of the first surface 7406 may be the same or greater than the surface area of the second surface 7408. Energy waves can pass from the first surface 7406 to the second surface 7408, or vice versa.

In FIG. 26, the relay element 7402 of the relay element device 7400 includes a sloped profile portion 7404 between the first surface 7406 and the second surface 7408. In operation, energy waves propagating between the first surface 7406 and the second surface 7408 may have a higher transport efficiency in the longitudinal orientation than in the transverse orientation, and energy waves passing through the relay element 7402 may result in spatial magnification or spatial de-magnification. In other words, energy waves passing through the relay element 7402 of the relay element device 7400 may experience increased magnification or decreased magnification. In an embodiment, energy may be directed through the one or more energy relay elements with zero magnification. In some embodiments, the one or more structures for forming relay element devices may include glass, carbon, optical fiber, optical film, plastic, polymer, or mixtures thereof.

In one embodiment, the energy waves passing through the first surface have a first resolution, while the energy waves passing through the second surface have a second resolution, and the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of +/−10 degrees relative to the normal to the second surface, irrespective of location on the second relay surface.

In some embodiments, the first surface may be configured to receive energy from an energy wave source, the energy wave source including a mechanical envelope having a width different than the width of at least one of the first surface and the second surface.

In an embodiment, energy may be transported between first and second surfaces which defines the longitudinal orientation, the first and second surfaces of each of the relays extends generally along a transverse orientation defined by the first and second directions, where the longitudinal orientation is substantially normal to the transverse orientation. In an embodiment, energy waves propagating through the plurality of relays have higher transport efficiency in the longitudinal orientation than in the transverse orientation and are spatially localized in the transverse plane due to randomized refractive index variability in the transverse orientation coupled with minimal refractive index variation in the longitudinal orientation via the principle of Transverse Anderson Localization. In some embodiments where each relay is constructed of multicore fiber, the energy waves propagating within each relay element may travel in the longitudinal orientation determined by the alignment of fibers in this orientation.

Mechanically, these tapered energy relays are cut and polished to a high degree of accuracy before being bonded or fused together in order to align them and ensure that the smallest possible seam gap between the relays. The seamless surface formed by the second surfaces of energy relays is polished after the relays are bonded. In one such embodiment, using an epoxy that is thermally matched to the taper material, it is possible to achieve a maximum seam gap of 50 um. In another embodiment, a manufacturing process that places the taper array under compression and/or heat provides the ability to fuse the elements together. In another embodiment, the use of plastic tapers can be more easily chemically fused or heat-treated to create the bond without additional bonding. For the avoidance of doubt, any methodology may be used to bond the array together, to explicitly include no bond other than gravity and/or force.

In an embodiment, a separation between the edges of any two adjacent second surfaces of the terminal energy relay elements may be less than a minimum perceptible contour as defined by the visual acuity of a human eye having 20/40 vision at a distance from the seamless energy surface that is the lesser of a height of the singular seamless energy surface or a width of the singular seamless energy surface.

A mechanical structure may be preferable in order to hold the multiple components in a fashion that meets a certain tolerance specification. In some embodiments, the first and second surfaces of tapered relay elements can have any polygonal shapes including without limitation circular, elliptical, oval, triangular, square, rectangle, parallelogram, trapezoidal, diamond, pentagon, hexagon, and so forth. In some examples, for non-square tapers, such as rectangular tapers for example, the relay elements may be rotated to have the minimum taper dimension parallel to the largest dimensions of the overall energy source. This approach allows for the optimization of the energy source to exhibit the lowest rejection of rays of light due to the acceptance cone of the magnified relay element as when viewed from center point of the energy source. For example, if the desired energy source size is 100 mm by 60 mm and each tapered energy relay is 20 mm by 10 mm, the relay elements may be aligned and rotated such that an array of 3 by 10 taper energy relay elements may be combined to produce the desired energy source size. Nothing here should suggest that an array with an alternative configuration of an array of 6 by 5 matrix, among other combinations, could not be utilized. The array comprising of a 3×10 layout generally will perform better than the alternative 6×5 layout.

Energy Relay Element Stacks

While the most simplistic formation of an energy source system comprises of an energy source bonded to a single tapered energy relay element, multiple relay elements may be coupled to form a single energy source module with increased quality or flexibility. One such embodiment includes a first tapered energy relay with the minified end attached to the energy source, and a second tapered energy relay connected to the first relay element, with the minified end of the second optical taper in contact with the magnified end of the first relay element, generating a total magnification equal to the product of the two individual taper magnifications. This is an example of an energy relay element stack comprising of a sequence of two or more energy relay elements, with each energy relay element comprising a first side and a second side, the stack relaying energy from the first surface of the first element to the second surface of the last element in the sequence, also named the terminal surface. Each energy relay element may be configured to direct energy therethrough.

In an embodiment, an energy directing device comprises one or more energy locations and one or more energy relay element stacks. Each energy relay element stack comprises one or more energy relay elements, with each energy relay element comprising a first surface and a second surface. Each energy relay element may be configured to direct energy therethrough. In an embodiment, the second surfaces of terminal energy relay elements of each energy relay element stack may be arranged to form a singular seamless display surface. In an embodiment, the one or more energy relay element stacks may be configured to direct energy along energy propagation paths which extend between the one or more energy locations and the singular seamless display surfaces.

Figure 27:
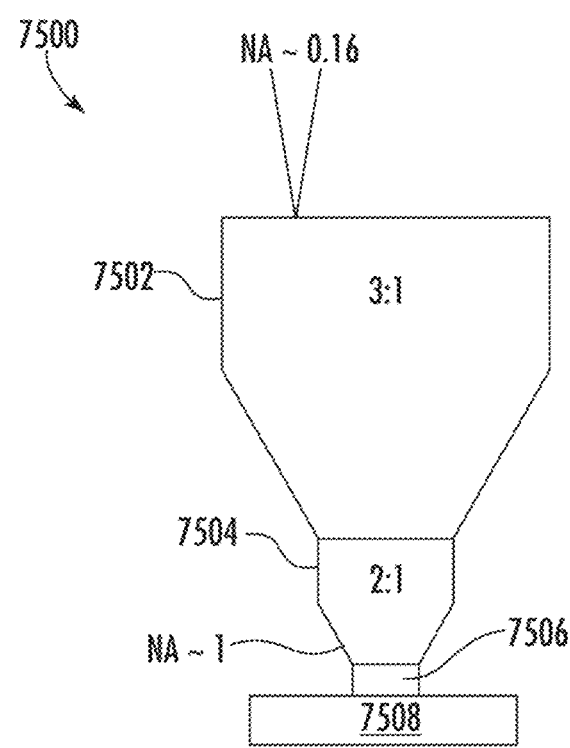
FIG. 27 illustrates a side view of an energy relay element stack comprising of two compound optical relay tapers in series.

FIG. 27 illustrates a side view of an energy relay element stack 7500 including two compound optical relay tapers 7502, 7504 in series, both tapers with minified ends facing an energy source surface 7506, in accordance with an embodiment of the present disclosure. In FIG. 27, the input numerical aperture (NA) is 1.0 for the input of taper 7504, but only about 0.16 for the output of taper 7502. Notice that the output numerical aperture gets divided by the total magnification of 6, which is the product of 2 for taper 7504, and 3 for taper 7502. One advantage of this approach is the ability to customize the first energy wave relay element to account for various dimensions of energy source without alteration of the second energy wave relay element. It additionally provides the flexibility to alter the size of the output energy surface without changing the design of the energy source or the first relay element. Also shown in FIG. 27 is the energy source 7506 and the mechanical envelope 7508 containing the energy source drive electronics.

In an embodiment, the first surface may be configured to receive energy waves from an energy source unit (e.g., 7506), the energy source unit including a mechanical envelope having a width different than the width of at least one of the first surface and the second surface. In one embodiment, the energy waves passing through the first surface may have a first resolution, while the energy waves passing through the second surface may have a second resolution, such that the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of +/−10 degrees relative to the normal to the second surface, irrespective of location on the second relay surface.

In one embodiment, the plurality of energy relay elements in the stacked configuration may include a plurality of faceplates (relays with unity magnification). In some embodiments, the plurality of faceplates may have different lengths or are loose coherent optical relays. In other embodiments, the plurality of elements may have sloped profile portions similar to that of FIG. 27, where the sloped profile portions may be angled, linear, curved, tapered, faceted or aligned at a non-perpendicular angle relative to a normal axis of the relay element. In yet another embodiment, energy waves propagating through the plurality of relay elements have higher transport efficiency in the longitudinal orientation than in the transverse orientation and are spatially localized in the transverse orientation due to randomized refractive index variability in the transverse orientation coupled with minimal refractive index variation in the longitudinal orientation. In embodiments where each energy relay is constructed of multicore fiber, the energy waves propagating within each relay element may travel in the longitudinal orientation determined by the alignment of fibers in this orientation.

Optical Image Relay and Taper Elements

Extremely dense fiber bundles can be manufactured with a plethora of materials to enable light to be relayed with pixel coherency and high transmission. Optical fibers provide the guidance of light along transparent fibers of glass, plastic, or a similar medium. This phenomenon is controlled by a concept called total internal reflection. A ray of light will be totally internally reflected between two transparent optical materials with a different index of refraction when the ray is contained within the critical angle of the material and the ray is incident from the direction of the more dense material.

Figure 28:
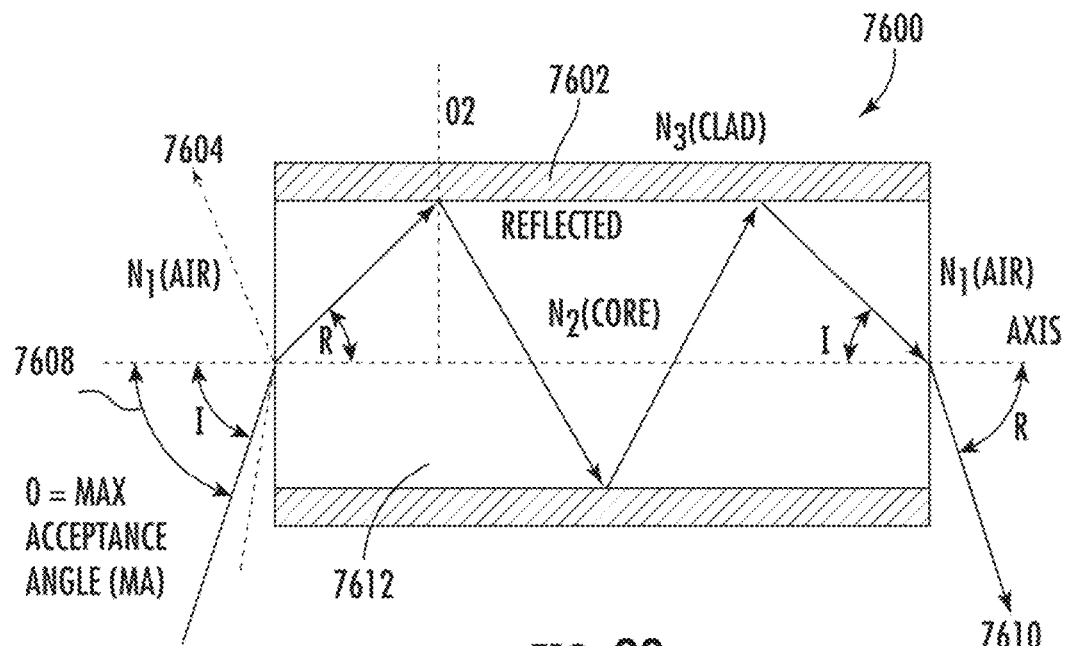
FIG. 28 is a schematic diagram demonstrating the fundamental principles of internal reflection.

FIG. 28 demonstrates the fundamental principles of internal reflection through a core-clad relay 7600 having a maximum acceptance angle Ø 7608 (or NA of the material), core 7612 and clad 7602 materials with differing refractive indices, and reflected 7604 and refracted 7610 rays. In general, the transmission of light decreases by less than 0.001 percent per reflection and a fiber that is about 50 microns in diameter may have 3,000 reflections per foot, which is helpful to understand how efficient that light transmission may be as compared to other compound optical methodologies.

One can calculate the relationship between the angle of incidence (I) and the angle of refraction (R) with Snell's law:

$$\frac{\sin\theta_I}{\sin\theta_R} = \frac{n_2}{n_1},$$

where $n_1$ is the index of refraction of air and $n_2$ as the index of refraction of the core material 7612.

One skilled at the art of fiber optics will understand the additional optical principles associated with light gathering power, maximum angle of acceptance, and other required calculations to understand how light travels through the optical fiber materials. It is important to understand this concept, as the optical fiber materials should be considered a relay of light rather than a methodology to focus light as will be described within the following embodiments.

Understanding the angular distribution of light that exits the optical fiber is important to this disclosure, and may not be the same as would be expected based upon the incident angle. Because the exit azimuthal angle of the ray 7610 tends to vary rapidly with the maximum acceptance angle 7608, the length and diameter of the fiber, as well as the other parameters of the materials, the emerging rays tend to exit the fiber as a conical shape as defined by the incident and refracted angles.

Figure 29:
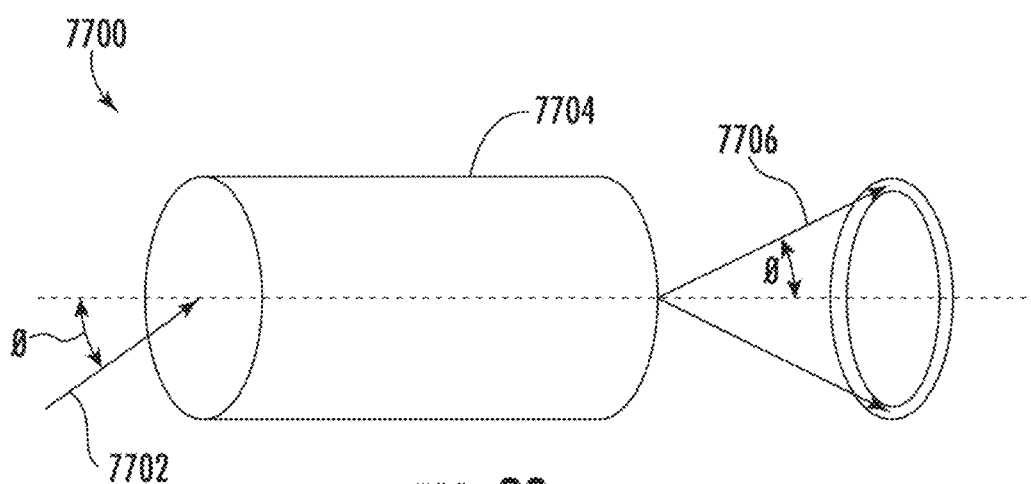
FIG. 29 is a schematic diagram demonstrating a light ray entering an optical fiber, and the resulting conical light distribution at the exit of the relay.

FIG. 29 demonstrates an optical fiber relay system 7704 and how a ray of light 7702 entering an optical fiber 7704 may exit in a conical shape distribution of light 7706 with a specific azimuthal angle Ø. This effect may be observed by shining a laser pointer through a fiber and view the output ray at various distances and angles on a surface. The conical shape of exit with a distribution of light across the entire conical region (e.g., not only the radius of the conical shape) which will be an important concept moving forward with the designs proposed.

The main source for transmission loss in fiber materials are cladding, length of material, and loss of light for rays outside of the acceptance angle. The cladding is the material that surrounds each individual fiber within the larger bundle to insulate the core and help mitigate rays of light from traveling between individual fibers. In addition to this, additional opaque materials may be used to absorb light outside of acceptance angle called extra mural absorption (EMA). Both materials can help improve viewed image quality in terms of contrast, scatter and a number of other factors, but may reduce the overall light transmission from entry to exit. For simplicity, the percent of core to clad can be used to understand the approximate transmission potential of the fiber, as this may be one of the reasons for the loss of light. In most materials, the core to clad ratio may be in the range of approximately about 50% to about 80%, although other types of materials may be available and will be explored in the below discussion.

Each fiber may be capable of resolving approximately 0.5 photographic line pairs per fiber diameter, thus when relaying pixels, it may be important to have more than a single fiber per pixel. In some embodiments, a dozen or so per pixel may be utilized, or three or more fibers may be acceptable, as the average resolution between each of the fibers helps mitigate the associate MTF loss when leveraging these materials.

In one embodiment, optical fiber may be implemented in the form of a fiber optic faceplate. A faceplate is a collection of single or multi, or multi-multi fibers, fused together to form a vacuum-tight glass plate. This plate can be considered a theoretically zero-thickness window as the image presented to one side of the faceplate may be transported to the external surface with high efficiency. Traditionally, these faceplates may be constructed with individual fibers with a pitch of about 6 microns or larger, although higher density may be achieved albeit at the effectiveness of the cladding material which may ultimately reduce contrast and image quality.

In some embodiments, an optical fiber bundle may be tapered resulting in a coherent mapping of pixels with different sizes and commensurate magnification of each surface. For example, the magnified end may refer to the side of the optical fiber element with the larger fiber pitch and higher magnification, and the minified end may refer to the side of the optical fiber element with the smaller fiber pitch and lower magnification. The process of producing various shapes may involve heating and fabrication of the desired magnification, which may physically alter the original pitch of the optical fibers from their original size to a smaller pitch thus changing the angles of acceptance, depending on location on the taper and NA. Another factor is that the fabrication process can skew the perpendicularity of fibers to the flat surfaces. One of the challenges with a taper design, among others, is that the effective NA of each end may change approximately proportional to the percentage of magnification. For example, a taper with a 2:1 ratio may have a minified end with a diameter of 10 mm and a magnified end with a diameter of 20 mm. If the original material had an NA of 0.5 with a pitch of 10 microns, the minified end will have an approximately effective NA of 1.0 and pitch of 5 microns. The resulting acceptance and exit angles may change proportionally as well. There is far more complex analysis that can be performed to understand the exacting results from this process and anyone skilled in the art will be able to perform these calculations. For the purposes of this discussion, these generalizations are sufficient to understand the imaging implications as well as overall systems and methods.

Use of Flexible Energy Sources and Curved Energy Relay Surfaces

It may be possible to manufacture certain energy source technologies or energy projection technologies with curved surfaces. For example, in one embodiment, for a source of energy, a curved OLED display panel may be used. In another embodiment, for a source of energy, a focus-free laser projection system may be utilized. In yet another embodiment, a projection system with a sufficiently wide depth of field to maintain focus across the projected surface may be employed. For the avoidance of doubt, these examples are provided for exemplary purposes and in no way limit the scope of technological implementations for this description of technologies.

Given the ability for optical technologies to produce a steered cone of light based upon the chief ray angle (CRA) of the optical configuration, by leveraging a curved energy surface, or a curved surface that may retain a fully focused projected image with known input angles of light and respective output modified angles may provide a more idealized viewed angle of light.

In one such embodiment, the energy surface side of the optical relay element may be curved in a cylindrical, spherical, planar, or non-planar polished configuration (herein referred to as "geometry" or "geometric") on a per module basis, where the energy source originates from one more source modules. Each effective light-emitting energy source has its own respective viewing angle that is altered through the process of deformation. Leveraging this curved energy source or similar panel technology allows for panel technology that may be less susceptible to deformation and a reconfiguration of the CRA or optimal viewing angle of each effective pixel.

Figure 30:
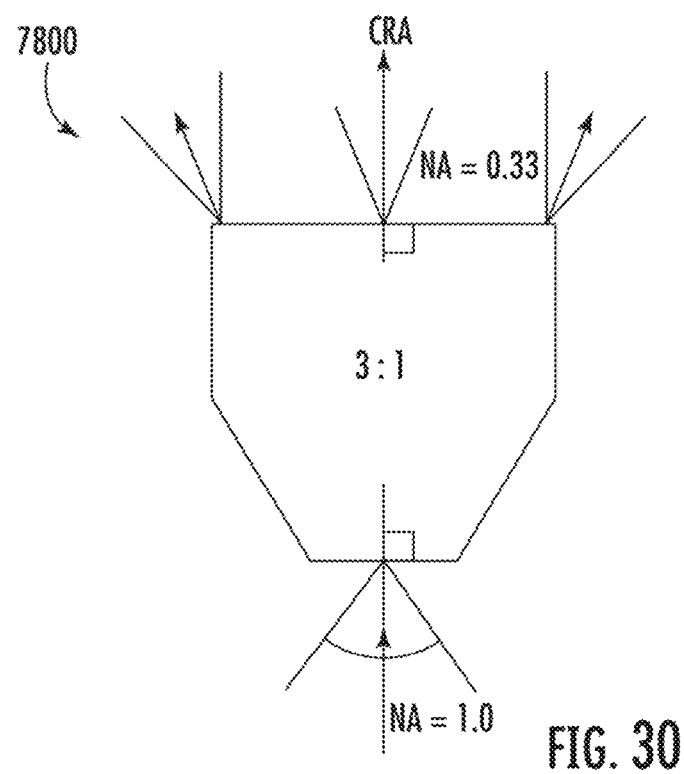
FIG. 30 illustrates an optical taper relay configuration with a 3:1 magnification factor and the resulting viewed angle of light of an attached energy source, in accordance with one embodiment of the present disclosure.

FIG. 30 illustrates an optical relay taper configuration 7800 with a 3:1 magnification factor and the resulting viewed angle of light of an attached energy source, in accordance with one embodiment of the present disclosure. The optical relay taper has an input NA of 1.0 with a 3:1 magnification factor resulting in an effective NA for output rays of approximately 0.33 (there are many other factors involved here, this is for simplified reference only), with planar and perpendicular surfaces on either end of the tapered energy relay, and an energy source attached to the minified end. Leveraging this approach alone, the angle of view of the energy surface may be approximately ⅓ of that of the input angle. For the avoidance of doubt, a similar configuration with an effective magnification of 1:1 (leveraging an optical faceplate or otherwise) may additionally be leveraged, or any other optical relay type or configuration.

Figure 31:
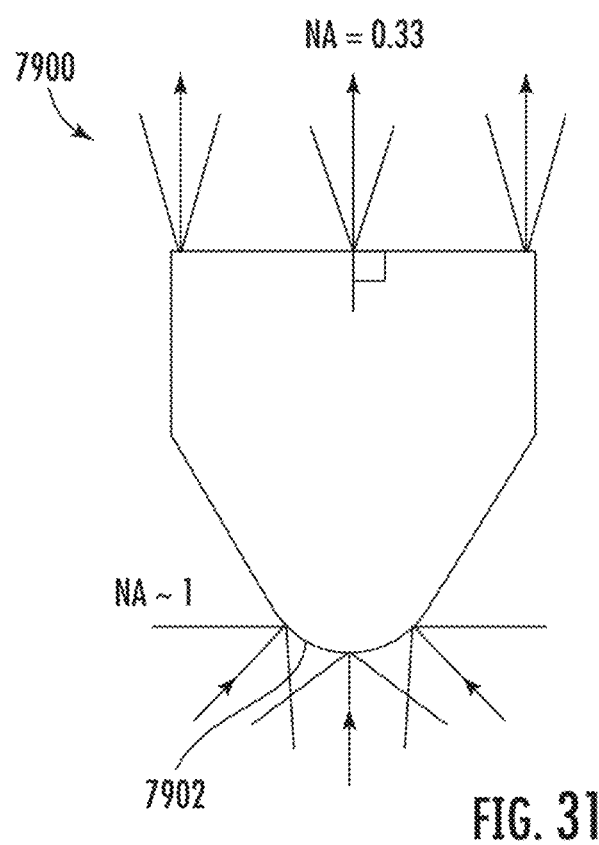
FIG. 31 illustrates an optical taper relay of FIG. 30, but with a curved surface on the energy source side of the optical taper relay resulting in the increased overall viewing angle of the energy source, in accordance with one embodiment of the present disclosure.

FIG. 31 illustrates the same tapered energy relay module 7900 as that of FIG. 30 but now with a surface on an energy source side having a curved geometric configuration 7902 while a surface opposite an energy source side 7903 having a planar surface and perpendicular to an optical axis of the module 7900. With this approach, the input angles (e.g., see arrows near 7902) may be biased based upon this geometry, and the output angles (e.g., see arrows near 7903) may be tuned to be more independent of location on the surface, different than that of FIG. 30, given the curved surface 7902 as exemplified in FIG. 31, although the viewable exit cone of each effective light emission source on surface 7903 may be less than the viewable exit cone of the energy source input on surface 7902. This may be advantageous when considering a specific energy surface that optimizes the viewed angles of light for wider or more compressed density of available rays of light.

In another embodiment, variation in output angle may be achieved by making the input energy surface 7902 convex in shape. If such a change were made, the output cones of light near the edge of the energy surface 7903 would turn in toward the center.

In some embodiments, the relay element device may include a curved energy surface. In one example, both the surfaces of the relay element device may be planar. Alternatively, in other examples, one surface may be planar and the other surface may be non-planar, or vice versa. Finally, in another example, both the surfaces of the relay element device may be non-planar. In other embodiments, a non-planar surface may be a concave surface or a convex surface, among other non-planar configurations. For example, both surfaces of the relay element may be concave. In the alternative, both surfaces may be convex. In another example, one surface may be concave and the other may be convex. It will be understood by one skilled in the art that multiple configurations of planar, non-planar, convex and concave surfaces are contemplated and disclosed herein.

Figure 32:
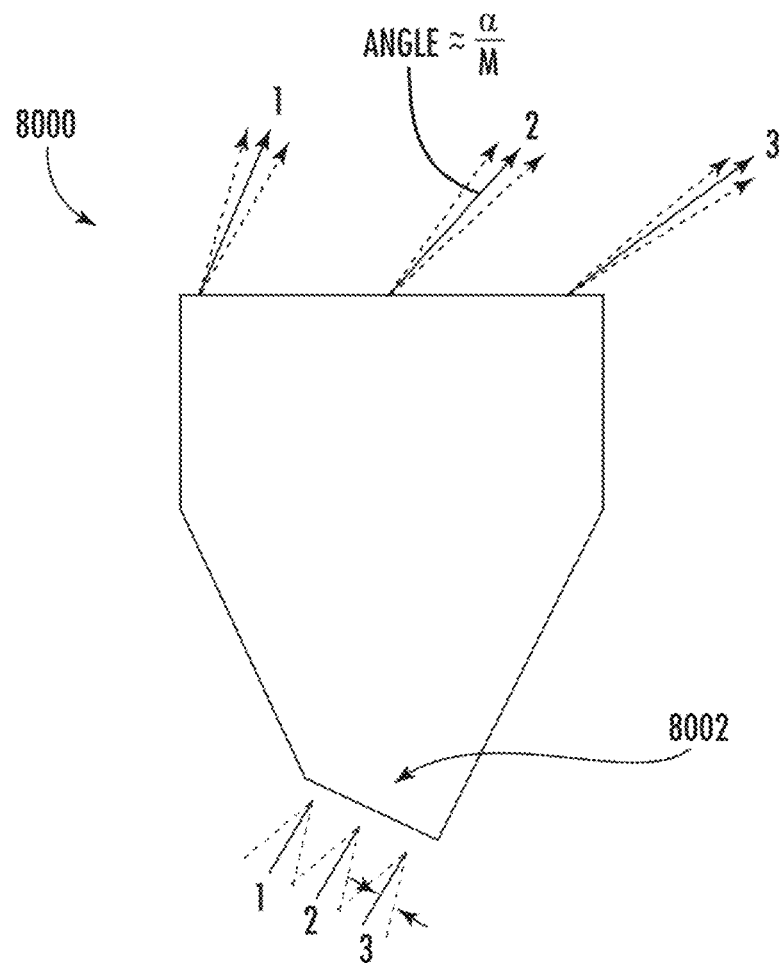
FIG. 32 illustrates an optical taper relay of FIG. 30, but with a non-perpendicular but planar surface on the energy source side, in accordance with one embodiment of the present disclosure.

FIG. 32 illustrates an optical relay taper 8000 with a non-perpendicular but planar surface 8002 on the energy source side, in accordance with another embodiment of the present disclosure. To articulate the significant customizable variation in the energy source side geometries, FIG. 32 illustrates the result of simply creating a non-perpendicular but planar geometry for the energy source side for comparison to FIG. 31 and to further demonstrate the ability to directly control the input acceptance cone angle and the output viewable emission cone angles of light 1, 2, 3 that are possible with any variation in surface characteristics.

Depending on the application, it may also be possible to design an energy relay configuration with the energy source side of the relay remaining perpendicular to the optical axis that defines the direction of light propagation within the relay, and the output surface of the relay being non-perpendicular to the optical axis. Other configurations may have both the input energy source side and the energy output side exhibiting various non-perpendicular geometric configurations. With this methodology, it may be possible to further increase control over the input and output energy source viewed angles of light.

In some embodiments, tapers may also be non-perpendicular to the optical axis of the relay to optimize a particular view angle. In one such embodiment, a single taper such as the one shown in FIG. 30 may be cut into quadrants by cuts parallel with the optical axis, with the large end and small end of the tapers cut into four equal portions. These four quadrants and then re-assembled with each taper quadrant rotated about the individual optical center axis by 180 degrees to have the minified end of the taper facing away from the center of the re-assembled quadrants thus optimizing the field of view. In other embodiments, non-perpendicular tapers may also be manufactured directly as well to provide increased clearance between energy sources on the minified end without increasing the size or scale of the physical magnified end. These and other tapered configurations are disclosed herein.

Figure 33:
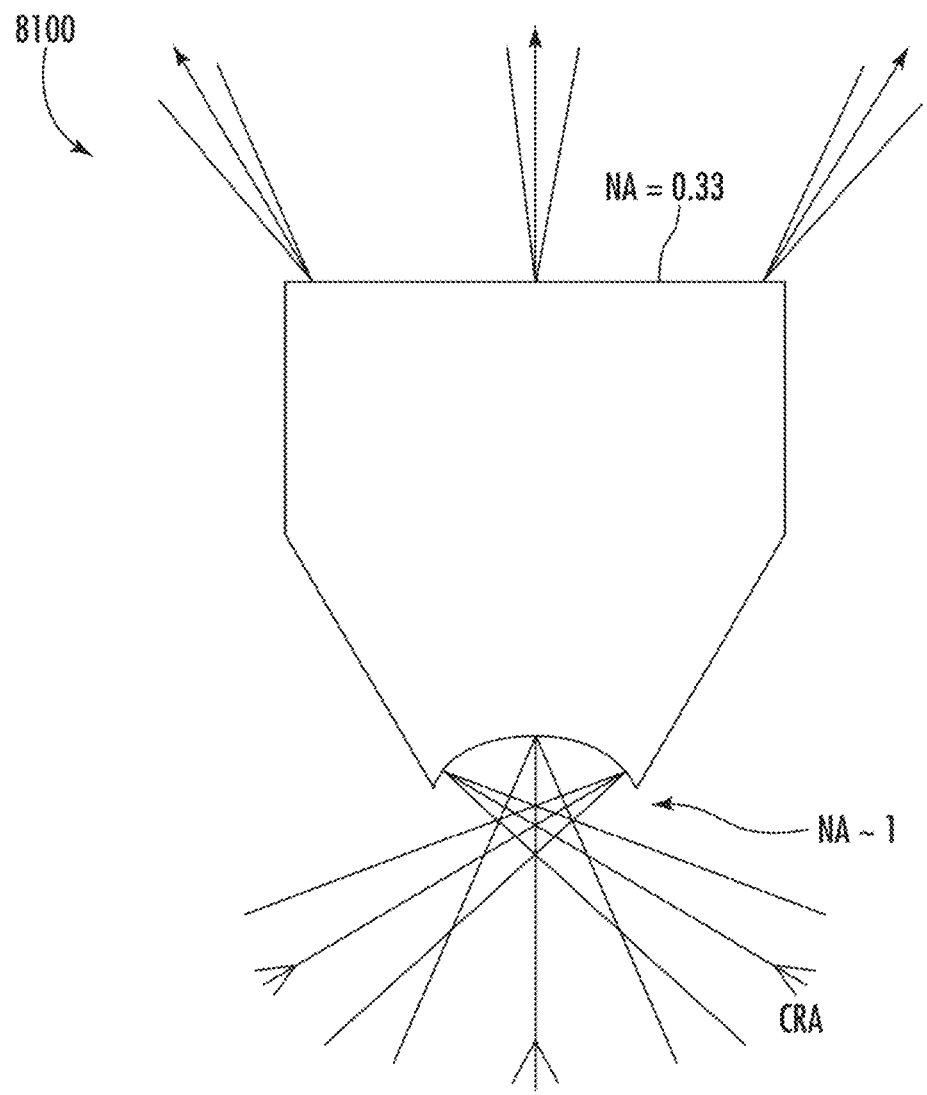
FIG. 33 illustrates an optical relay and illumination cones of FIG. 30 with a concave surface on the side of the energy source.

FIG. 33 illustrates the optical relay and light illumination cones of FIG. 30 with a concave surface on the side of the energy source. In this case, the cones of output light are significantly more diverged near the edges of the output energy surface plane than if the energy source side were flat, in comparison with FIG. 30.

Figure 34:
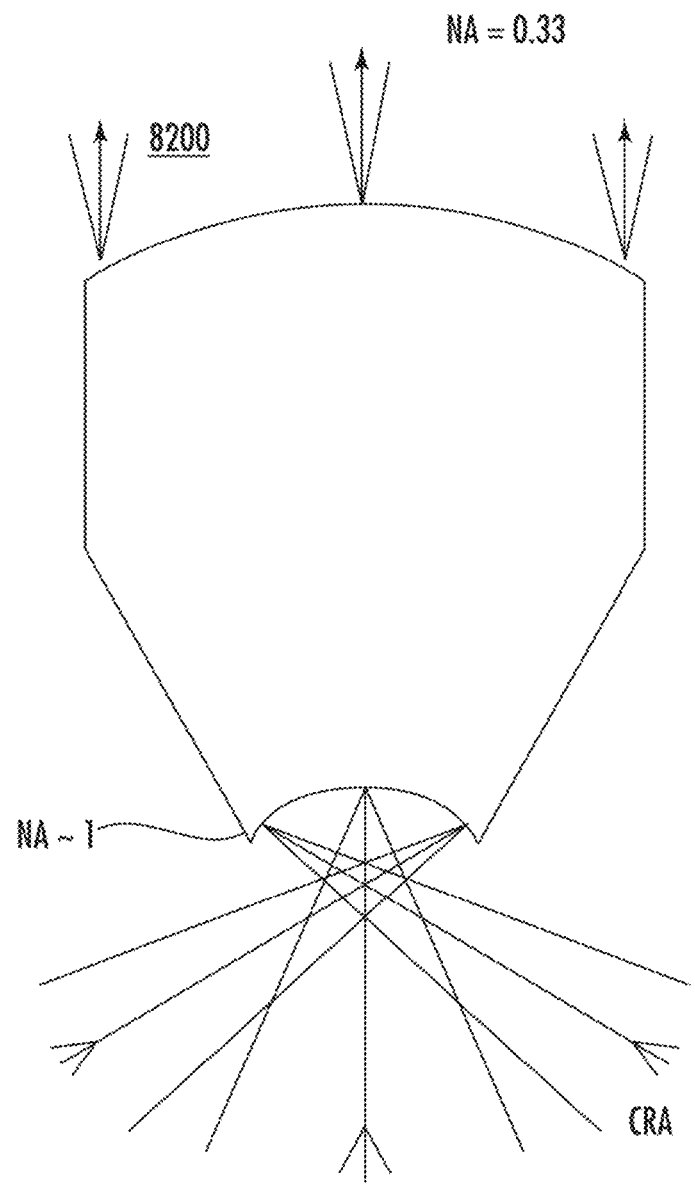
FIG. 34 illustrates an optical taper relay and light illumination cones of FIG. 33 with the same convex surface on the side of the energy source, but with a concave output energy surface geometry, in accordance with one embodiment of the present disclosure.

FIG. 34 illustrates the optical taper relay 8200 and light illumination cones of FIG. 33 with the same concave surface on the side of the energy source. In this example, the output energy surface has a convex geometry. Compared to FIG. 33, the cones of output light on the concave output surface 8202 are more collimated across the energy source surface due to the input acceptances cones and the exit cone of light produced from this geometric configuration. For the avoidance of doubt, the provided examples are illustrative only and not intended to dictate explicit surface characteristics, since any geometric configuration for the input energy source side and the output energy surface may be employed depending on the desired angle of view and density of light for the output energy surface, and the angle of light produced from the energy source itself.

In some embodiments, multiple relay elements may be configured in series. In one embodiment, any two relay elements in series may additionally be coupled together with intentionally distorted parameters such that the inverse distortions from one element in relation to another help optically mitigate any such artifacts. In another embodiment, a first optical taper exhibits optical barrel distortions, and a second optical taper may be manufactured to exhibit the inverse of this artifact, to produce optical pin cushion distortions, such than when aggregated together, the resultant information either partially or completely cancels any such optical distortions introduced by any one of the two elements. This may additionally be applicable to any two or more elements such that compound corrections may be applied in series.

In some embodiments, it may be possible to manufacturer a single energy source board, electronics, and/or the like to produce an array of energy sources and the like in a small and/or lightweight form factor. With this arrangement, it may be feasible to further incorporate an optical relay mosaic such that the ends of the optical relays align to the energy source active areas with an extremely small form factor by comparison to individual components and electronics. Using this technique, it may be feasible to accommodate small form factor devices like monitors, smart phones and the like.

Figure 35:
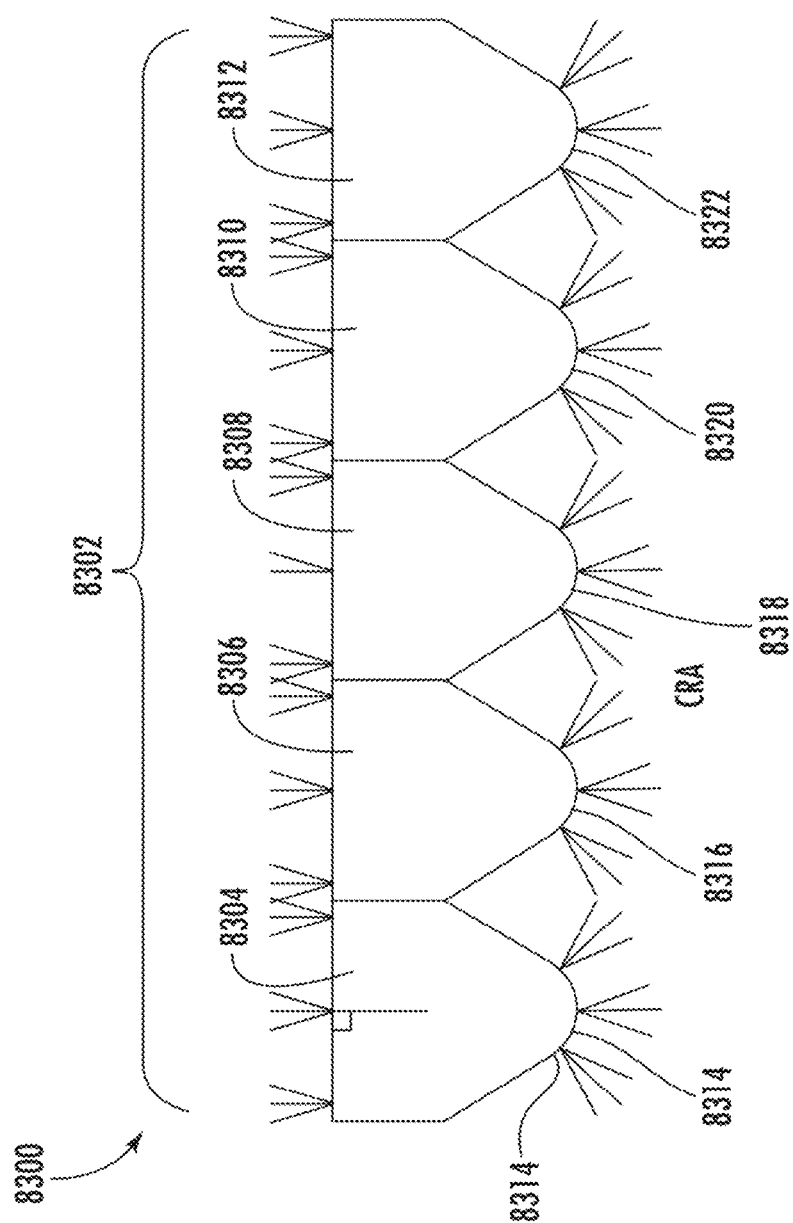
FIG. 35 illustrates multiple optical taper modules coupled together with curved energy source side surfaces to form an energy source viewable image from a perpendicular energy source surface, in accordance with one embodiment of the present disclosure.

FIG. 35 illustrates an assembly 8300 of multiple optical taper relay modules 8304, 8306, 8308, 8310, 8312 coupled together with curved energy source side surfaces 8314, 8316, 8318, 8320, 8322, respectively, to form an optimal viewable image 8302 from a plurality of perpendicular output energy surfaces of each taper, in accordance with one embodiment of the present disclosure. In this instance, the taper relay modules 8304, 8306, 8308, 8310, 8312 are formed in parallel. Although only a single row of taper relay modules is shown, in some embodiments, tapers with a stacked configuration may also be coupled together in parallel and in a row to form a contiguous, seamless viewable image 8302.

In FIG. 35, each taper relay module may operate independently or be designed based upon an array of optical relays. As shown in this figure, five modules with optical taper relays 8304, 8306, 8308, 8310, 8312 are aligned together producing a larger optical taper output energy surface 8302. In this configuration, the output energy surface 8302 may be perpendicular to the optical axis of each relay, and each of the five energy source sides 8314, 8316, 8318, 8320, 8322 may be deformed in a circular contour about a center axis that may lie in front of the output energy surface 8302, or behind this surface, allowing the entire array to function as a single output energy surface rather than as individual modules. It may additionally be possible to optimize this assembly structure 8300 further by computing the output viewed angle of light and determining the ideal surface characteristics required for the energy source side geometry. FIG. 35 illustrates one such embodiment where multiple modules are coupled together and the energy source side curvature accounts for the larger output energy surface viewed angles of light. Although five relay modules 8304, 8306, 8308, 8310, and 8312 are shown, it will be appreciated by one skilled in the art that more or fewer relay modules may be coupled together depending on the application, and these may be coupled together in two dimensions to form an arbitrarily large output energy surface 8302.

In one embodiment, the system of FIG. 35 includes a plurality of relay elements 8304, 8306, 8308, 8310, 8312 arranged across first and second directions (e.g., across a row or in stacked configuration), where each of the plurality of relay elements extends along a longitudinal orientation between first and second surfaces of the respective relay element. In some embodiments, the first and second surfaces of each of the plurality of relay elements extends generally along a transverse orientation defined by the first and second directions, wherein the longitudinal orientation is substantially normal to the transverse orientation. In other embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

In one embodiment, the plurality of relay elements may be arranged across the first direction or the second direction to form a single tiled surface along the first direction or the second direction, respectively. In some embodiments, the plurality of relay elements are arranged in a matrix having at least a 2×2 configuration, or in other matrices including without limitation a 3×3 configuration, a 4×4 configuration, a 3×10 configuration, and other configurations as can be appreciated by one skilled in the art. In other embodiments, seams between the single tiled surface may be imperceptible at a viewing distance of twice a minimum dimension of the single tiled surface.

In some embodiments, each of the plurality of relay elements (e.g. 8304, 8306, 8308, 8310, 8312) have randomized refractive index variability in the transverse orientation coupled with minimal refractive index variation in the longitudinal orientation, resulting in energy waves having substantially higher transport efficiency along the longitudinal orientation, and spatial localization along the transverse orientation. In some embodiments where the relay is constructed of multicore fiber, the energy waves propagating within each relay element may travel in the longitudinal orientation determined by the alignment of fibers in this orientation.

In other embodiments, each of the plurality of relay elements (e.g. 8304, 8306, 8308, 8310, 8312) is configured to transport energy along the longitudinal orientation, and wherein the energy waves propagating through the plurality of relay elements have higher transport efficiency in the longitudinal orientation than in the transverse orientation due to the randomized refractive index variability such that the energy is localized in the transverse orientation. In some embodiments, the energy waves propagating between the relay elements may travel substantially parallel to the longitudinal orientation due to the substantially higher transport efficiency in the longitudinal orientation than in the transverse orientation. In other embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

Figure 36:
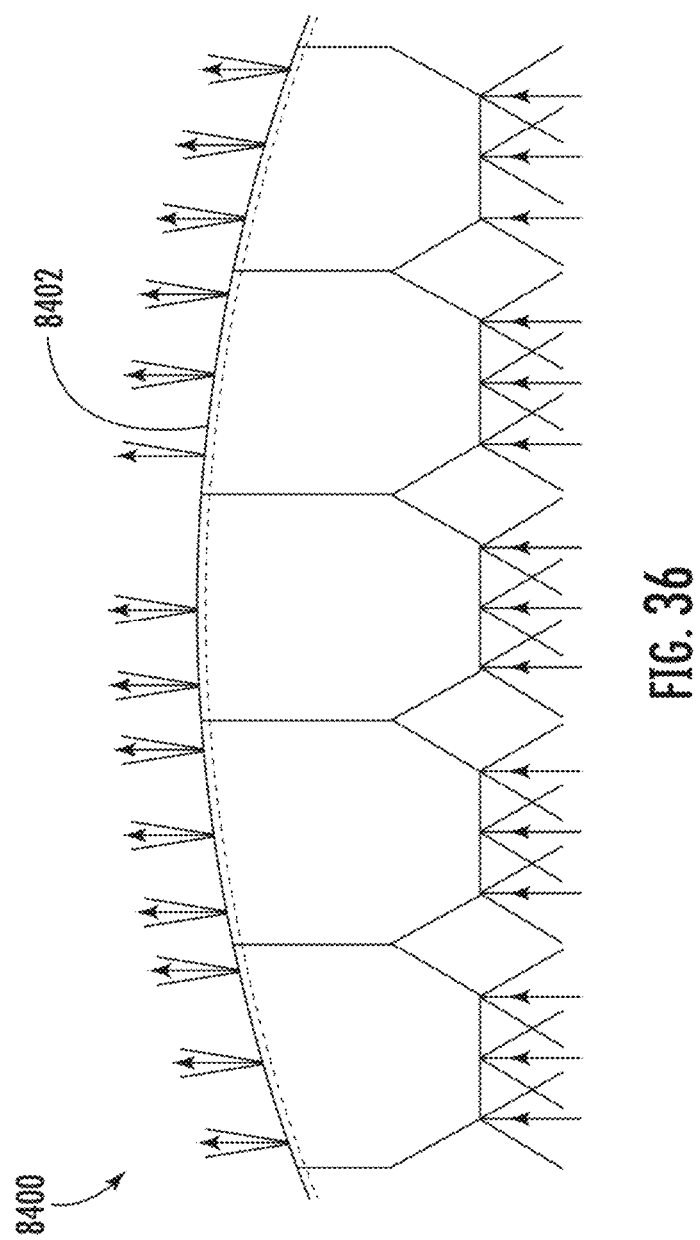
FIG. 36 illustrates multiple optical taper modules coupled together with perpendicular energy source side geometries and a convex energy source surface radial about a center axis, in accordance with one embodiment of the present disclosure.

FIG. 36 illustrates an arrangement 8400 of multiple optical taper relay modules coupled together with perpendicular energy source side geometries 8404, 8406, 8408, 8410, and 8412, and a convex energy source surface 8402 that is radial about a center axis, in accordance with one embodiment of the present disclosure. FIG. 36 illustrates a modification of the configuration shown in FIG. 35, with perpendicular energy source side geometries and a convex output energy surface that is radial about a center axis.

Figure 37:
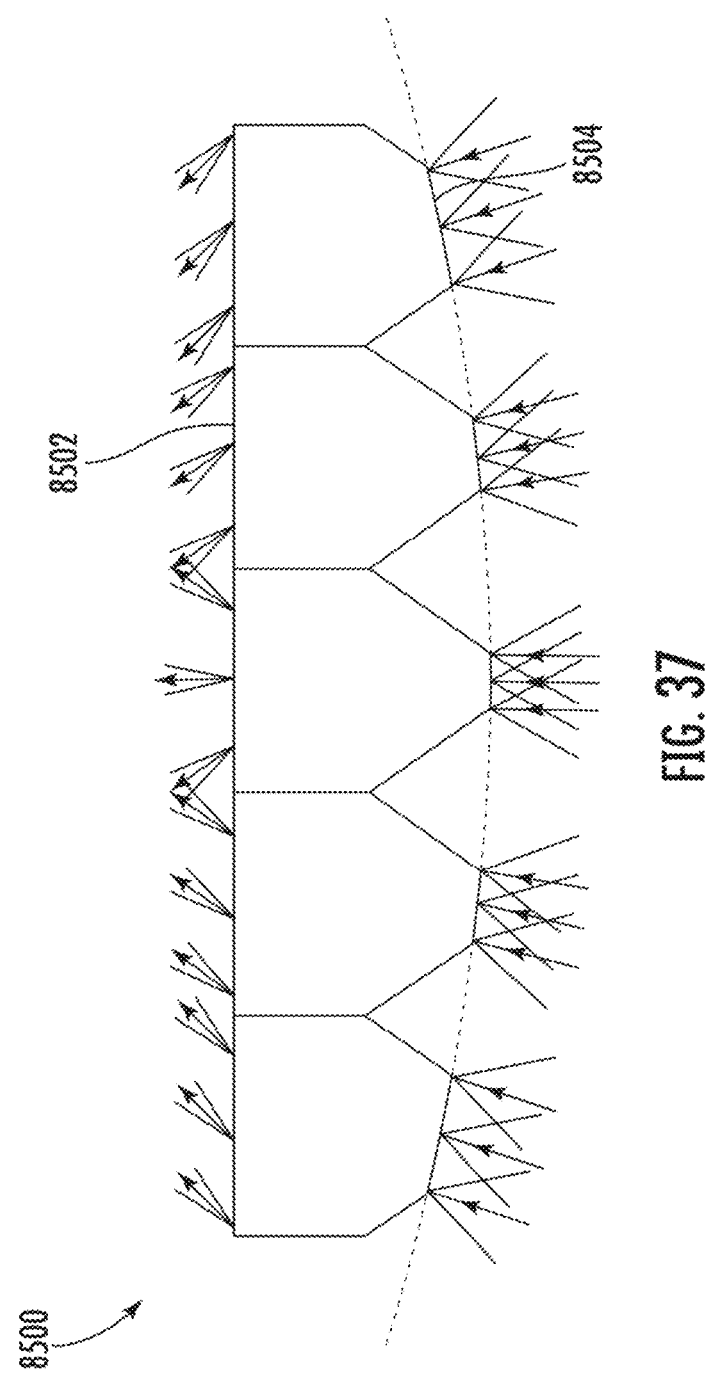
FIG. 37 illustrates multiple optical taper relay modules coupled together with perpendicular energy source side geometries and a convex energy source side surface radial about a center axis, in accordance with one embodiment of the present disclosure.

FIG. 37 illustrates an arrangement 8500 of multiple optical relay modules coupled together with perpendicular output energy surface 8502 and a convex energy source side surface 8504 radial about a center axis, in accordance with another embodiment of the present disclosure.

In some embodiments, by configuring the source side of the array of energy relays in a cylindrically curved shape about a center radius, and having a flat energy output surface, the input energy source acceptance angle and the output energy source emission angles may be decoupled, and it may be possible to better align each energy source module to the energy relay acceptance cone, which may itself be limited due to constraints on parameters such as energy taper relay magnification, NA, and other factors.

Figure 38:
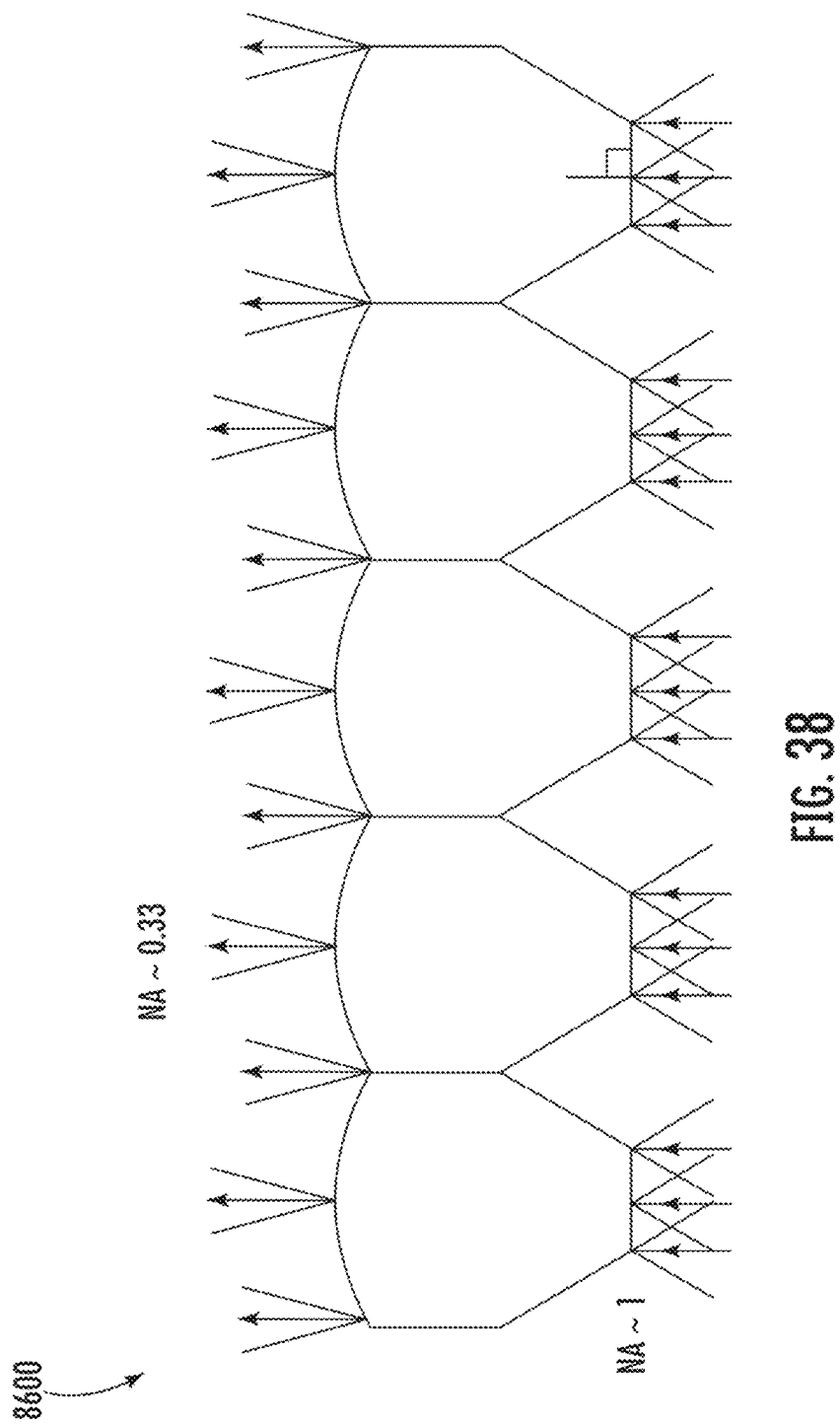
FIG. 38 illustrates multiple optical taper relay modules with each energy source independently configured such that the viewable output rays of light are more uniform as viewed at the energy source, in accordance with one embodiment of the present disclosure.

FIG. 38 illustrates an arrangement 8600 of multiple energy relay modules with each energy output surface independently configured such that the viewable output rays of light, in accordance with one embodiment of the present disclosure. FIG. 38 illustrates the configuration similar to that of FIG. 37, but with each energy relay output surface independently configured such that the viewable output rays of light are emitted from the combined output energy surface with a more uniform angle with respect to the optical axis (or less depending on the exact geometries employed).

Figure 39:
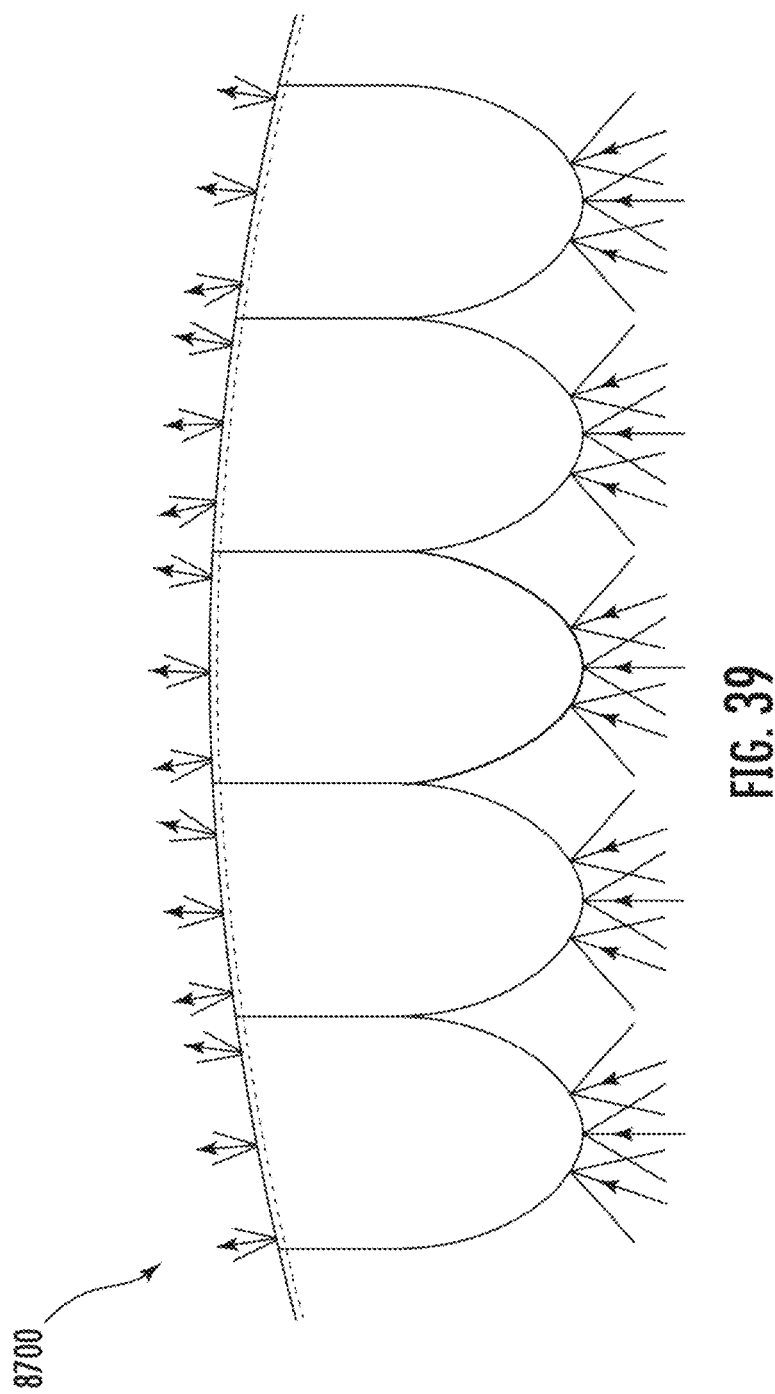
FIG. 39 illustrates multiple optical taper relay modules where both the energy source side and the energy source are configured with various geometries to provide control over the input and output rays of light, in accordance with one embodiment of the present disclosure.

FIG. 39 illustrates an arrangement 8700 of multiple optical relay modules where both the emissive energy source side and the energy relay output surface are configured with various geometries producing explicit control over the input and output rays of light, in accordance with one embodiment of the present disclosure. To this end, FIG. 39 illustrates a configuration with five modules where both the emissive energy source side and the relay output surface are configured with curved geometries allowing greater control over the input and output rays of light.

Figure 40:
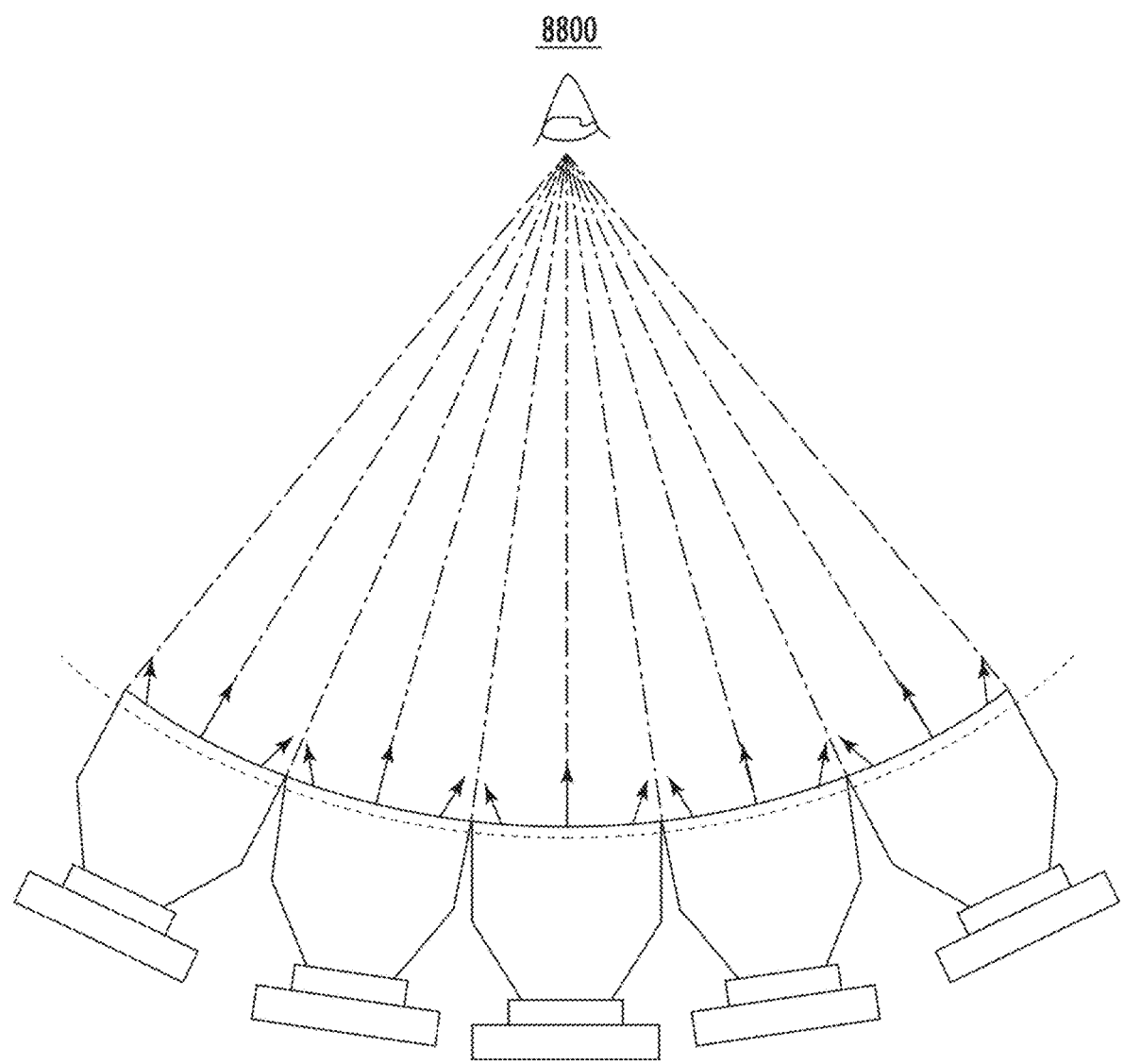
FIG. 40 illustrates arrangement of multiple optical taper relay modules whose individual output energy surfaces have been ground to form a seamless concave cylindrical energy source which surrounds the viewer, with the source ends of the relays flat and each bonded to an energy source.

FIG. 40 illustrates an arrangement 8800 of multiple optical relay modules whose individual output energy surfaces have been ground to form a seamless concave cylindrical energy source surface which surrounds the viewer, with the source ends of the relays flat and each bonded to an energy source.

In the embodiment shown in FIG. 40, and similarly in the embodiments shown in FIGS. 35, 36, 37, 38 and 39, a system may include a plurality of energy relays arranged across first and second directions, where in each of the relays, energy is transported between first and second surfaces which defines the longitudinal orientation, the first and second surfaces of each of the relays extends generally along a transverse orientation defined by the first and second directions, where the longitudinal orientation is substantially normal to the transverse orientation. Also in this embodiment, energy waves propagating through the plurality of relays have higher transport efficiency in the longitudinal orientation than in the transverse orientation due to high refractive index variability in the transverse orientation coupled with minimal refractive index variation in the longitudinal orientation. In some embodiments where each relay is constructed of multicore fiber, the energy waves propagating within each relay element may travel in the longitudinal orientation determined by the alignment of fibers in this orientation.

In one embodiment, similar to that discussed above, the first and second surfaces of each of the plurality of relay elements, in general, can curve along the transverse orientation and the plurality of relay elements can be integrally formed across the first and second directions. The plurality of relays can be assembled across the first and second directions, arranged in a matrix having at least a 2×2 configuration, and include glass, optical fiber, optical film, plastic, polymer, or mixtures thereof. In some embodiments, a system of a plurality of relays may be arranged across the first direction or the second direction to form a single tiled surface along the first direction or the second direction, respectively. Like above, the plurality of relay elements can be arranged in other matrices including without limitation a 3×3 configuration, a 4×4 configuration, a 3×10 configuration, and other configurations as can be appreciated by one skilled in the art. In other embodiments, seams between the single tiled surface may be imperceptible at a viewing distance of twice a minimum dimension of the single tiled surface.

For a mosaic of energy relays, the following embodiments may be included: both the first and second surfaces may be planar, one of the first and second surfaces may be planar and the other non-planar, or both the first and second surfaces may be non-planar. In some embodiments, both the first and second surfaces may be concave, one of the first and second surfaces may be concave and the other convex, or both the first and second surfaces may be convex. In other embodiments, at least one of the first and second surfaces may be planar, non-planar, concave or convex. Surfaces that are planar may be perpendicular to the longitudinal direction of energy transport, or non-perpendicular to this optical axis.

In some embodiments, the plurality of relays can cause spatial magnification or spatial de-magnification of energy sources, including but not limited to electromagnetic waves, light waves, acoustical waves, among other types of energy waves. In other embodiments, the plurality of relays may also include a plurality of energy relays (e.g., such as faceplates for energy source), with the plurality of energy relays having different widths, lengths, among other dimensions. In some embodiments, the plurality of energy relays may also include loose coherent optical relays or fibers.

Limitations of Anderson Localization Materials and Introduction of Ordered Energy Localization While the Anderson localization principle was introduced in the 1950s, it wasn't until recent technological breakthroughs in materials and processes allowed the principle to be explored practically in optical transport. Transverse Anderson localization is the propagation of a wave transported through a transversely disordered but longitudinally invariant material without diffusion of the wave in the transverse plane.

Transverse Anderson localization has been observed through experimentation in which a fiber optic face plate is fabricated through drawing millions of individual strands of fiber with different refractive index (RI) that were mixed randomly and fused together. When an input beam is scanned across one of the surfaces of the face plate, the output beam on the opposite surface follows the transverse position of the input beam. Since Anderson localization exhibits in disordered mediums an absence of diffusion of waves, some of the fundamental physics are different when compared to optical fiber relays. This implies that the Anderson localization phenomena in the random mixture of optical fibers with varying RI arises less by total internal reflection than by the randomization between multiple-scattering paths where wave interference can completely limit the propagation in the transverse orientation while continuing in the longitudinal path. Further to this concept, it is introduced herein that a non-random pattern of material wave propagation properties may be used in place of a randomized distribution in the transverse plane of an energy transport device. Such a non-random distribution may induce what is referred to herein as Ordered Energy Localization in a transverse plane of the device. This Ordered Energy Localization reduces the occurrence of localized grouping of similar material properties, which can arise due to the nature of random distributions, but which act to degrade the overall efficacy of energy transport through the device.

In an embodiment, it may be possible for Ordered Energy Localization materials to transport light with a contrast as high as, or better than, the highest quality commercially available multimode glass image fibers, as measured by an optical modulation transfer function (MTF). With multimode and multicore optical fibers, the relayed images are intrinsically pixelated due to the properties of total internal reflection of the discrete array of cores, where the loss of image transfer in regions between cores will reduce MTF and increase blurring. The resulting imagery produced with multicore optical fiber tends to have a residual fixed noise fiber pattern, as illustrated in FIG. 5A. By contrast, the same relayed image through an example material sample that exhibits Ordered Energy Localization, which is similar to that of the Transverse Anderson Localization principle, where the noise pattern appears much more like a grain structure than a fixed fiber pattern.

Another advantage to optical relays that exhibit the Ordered Energy localization phenomena is that it they can be fabricated from a polymer material, resulting in reduced cost and weight. A similar optical-grade material, generally made of glass or other similar materials, may cost more than a hundred times the cost of the same dimension of material generated with polymers. Further, the weight of the polymer relay optics can be 10-100 times less. For the avoidance of doubt, any material that exhibits the Anderson localization property, or the Ordered Energy Localization property as described herein, may be included in this disclosure, even if it does not meet the above cost and weight suggestions. As one skilled in the art will understand that the above suggestion is a single embodiment that lends itself to significant commercial viabilities that similar glass products exclude. Of additional benefit is that for Ordered Energy Localization to work, optical fiber cladding may not be needed, which for traditional multicore fiber optics is required to prevent the scatter of light between fibers, but simultaneously blocks a portion of the rays of light and thus reduces transmission by at least the core-to-clad ratio (e.g. a core-to-clad ratio of 70:30 will transmit at best 70% of received illumination). In certain embodiments, relaying energy through all or most of the materials of a relay may improve the efficiency of relaying energy through said material, since the need for extra energy controlling materials may be reduced or eliminated.

Another benefit is the ability to produce many smaller parts that can be bonded or fused without seams as the polymer material is composed of repeating units, and the merger of any two pieces is nearly the same as generating the component as a singular piece depending on the process to merge the two or more pieces together. For large scale applications, this is a significant benefit for the ability to manufacture without massive infrastructure or tooling costs, and it provides the ability to generate single pieces of material that would otherwise be impossible with other methods. Traditional plastic optical fibers have some of these benefits, but due to the cladding generally still involve a seam line of some distances.

The present disclosure includes methods of manufacturing materials exhibiting the Ordered Energy Localization phenomena. A process is proposed to construct relays of electromagnetic energy, acoustic energy, or other types of energy using building blocks that may include one or more component engineered structures ("CES"). The term CES refers to a building block component with specific engineered properties ("EP") that may include, but are not limited to, material type, size, shape, refractive index, center-of-mass, charge, weight, absorption, and magnetic moment, among other properties. The size scale of the CES may be on the order of wavelength of the energy wave being relayed, and can vary across the milli-scale, the micro-scale, or the nano-scale. The other EP's are also highly dependent on the wavelength of the energy wave.

Within the scope of the present disclosure, a particular arrangement of multiple CES may form a non-random pattern, which may be repeated in the transverse direction across a relay to effectively induce Ordered Energy Localization. A single instance of such a non-random pattern of CES is referred to herein as a module. A module may comprise two or more CES. A grouping of two or more modules within a relay is referred to herein as a structure.

Ordered Energy Localization is a general wave phenomenon that applies to the transport of electromagnetic waves, acoustic waves, quantum waves, energy waves, among others. The one or more component engineered structures may form an energy wave relay that exhibits Ordered Energy Localization each have a size that is on the order of the corresponding wavelength. Another parameter for the building blocks is the speed of the energy wave in the materials used for those building blocks, which includes refractive index for electromagnetic waves, and acoustic impedance for acoustic waves. For example, the building block sizes and refractive indices can vary to accommodate any frequency in the electromagnetic spectrum, from X-rays to radio waves, or to accommodate audible acoustic waves ranging from about 0 Hz to about 40 kHz.

For this reason, discussions in this disclosure about optical relays can be generalized to not only the full electromagnetic spectrum, but to acoustical energy and other types of energy. For this reason, the use of the terms energy source, energy surface, and energy relay will be used in the present disclosure, even if an embodiment may be discussed with respect to one particular form of energy such as the visible electromagnetic spectrum. One of ordinary skill in the art would understand the principles of the present disclosure as discussed with respect to one form of energy would apply the same for embodiments implemented for other forms of energy.

For the avoidance of doubt, the material quantities, process, types, refractive index, and the like are merely exemplary and any optical material that exhibits the Ordered Energy Localization property is included herein. Further, any use of ordered materials and processes is included herein.

It should be noted that the principles of optical design noted in this disclosure apply generally to all forms of energy relays, and the design implementations chosen for specific products, markets, form factors, mounting, etc. may or may not need to address these geometries but for the purposes of simplicity, any approach disclosed is inclusive of all potential energy relay materials.

In one embodiment, for the relay of visible electromagnetic energy, the transverse size of the CES should be on the order of 1 micron. The materials used for the CES can be any optical material that exhibits the optical qualities desired to include, but not limited to, glass, plastic, resin, air pockets, and the like. The index of refraction of the materials used are higher than 1, and if two CES types are chosen, the difference in refractive index becomes a key design parameter. The aspect ratio of the material may be chosen to be elongated, in order to assist wave propagation in a longitudinal direction.

In embodiments, energy from other energy domains may be relayed using one or more CES. For example, acoustic energy or haptic energy, which may be mechanical vibrational forms of energy, may be relayed. Appropriate CES may be chosen based on transport efficiency in these alternate energy domains. For example, air may be selected as a CES material type in relaying acoustic or haptic energy. In embodiments, empty space or a vacuum may be selected as a CES in order to relay certain forms of electromagnetic energy. Furthermore, two different CES may share a common material type, but may differ in another engineered property, such as shape.

The formation of a CES may be completed as a destructive process that takes formed materials and cuts the pieces into a desired shaped formation or any other method known in the art, or additive, where the CES may be grown, printed, formed, melted, or produced in any other method known in the art. Additive and destructive processes may be combined for further control over fabrication. These CES are constructed to a specified structure size and shape.

In one embodiment, for electromagnetic energy relays, it may be possible to use optical grade bonding agents, epoxies, or other known optical materials that may start as a liquid and form an optical grade solid structure through various means including but not limited to UV, heat, time, among other processing parameters. In another embodiment, the bonding agent is not cured or is made of index matching oils for flexible applications. Bonding agent may be applied to solid structures and non-curing oils or optical liquids. These materials may exhibit certain refractive index (RI) properties. The bonding agent needs to match the RI of either CES material type 1 or CES material type 2. In one embodiment, the RI of this optical bonding agent is 1.59, the same as PS (polystyrene). In a second embodiment, the RI of this optical bonding agent is 1.49, the same as PMMA (poly methyl methcacrylate). In another embodiment, the RI of this optical bonding agent is 1.64, the same as a thermoplastic polyester (TP) material.

In one embodiment, for energy waves, the bonding agent may be mixed into a blend of CES material type 1 and CES material type 2 in order to effectively cancel out the RI of the material that the bonding agent RI matches. The bonding agent may be thoroughly intermixed, with enough time given to achieve escape of air voids, desired distributions of materials, and development of viscous properties. Additional constant agitation may be implemented to ensure the appropriate mixture of the materials to counteract any separation that may occur due to various densities of materials or other material properties.

It may be required to perform this process in a vacuum or in a chamber to evacuate any air bubbles that may form. An additional methodology may be to introduce vibration during the curing process.

An alternate method provides for three or more CES with additional form characteristics and EPs.

In one embodiment, for electromagnetic energy relays, an additional method provides for only a single CES to be used with only the bonding agent, where the RI of the CES and the bonding agent differ.

An additional method provides for any number of CESs and includes the intentional introduction of air bubbles.

In one embodiment, for electromagnetic energy relays, a method provides for multiple bonding agents with independent desired RIs, and a process to intermix the zero, one, or more CES's as they cure either separately or together to allow for the formation of a completely intermixed structure. Two or more separate curing methodologies may be leveraged to allow for the ability to cure and intermix at different intervals with different tooling and procedural methodologies. In one embodiment, a UV cure epoxy with a RI of 1.49 is intermixed with a heat cure second epoxy with a RI of 1.59 where constant agitation of the materials is provisioned with alternating heat and UV treatments with only sufficient duration to begin to see the formation of solid structures from within the larger mixture, but not long enough for any large particles to form, until such time that no agitation can be continued once the curing process has nearly completed, whereupon the curing processes are implemented simultaneously to completely bond the materials together. In a second embodiment, CES with a RI of 1.49 are added. In a third embodiment, CES with both a RI of 1.49 and 1.59 both added.

In another embodiment, for electromagnetic energy relays, glass and plastic materials are intermixed based upon their respective RI properties.

In an additional embodiment, the cured mixture is formed in a mold and after curing is cut and polished. In another embodiment, the materials leveraged will re-liquefy with heat and are cured in a first shape and then pulled into a second shape to include, but not limited to, tapers or bends.

It should be appreciated that there exist a number of well-known conventional methods used to weld polymeric materials together. Many of these techniques are described in ISO 472 ("Plastics-Vocabulary", International Organization for Standardization, Switzerland 1999) which is herein incorporated by reference in its entirety, and which describes processes for uniting softened surfaces of material including thermal, mechanical (e.g. vibration welding, ultrasonic welding, etc.), electromagnetic, and chemical (solvent) welding methods.

Figure 7A:
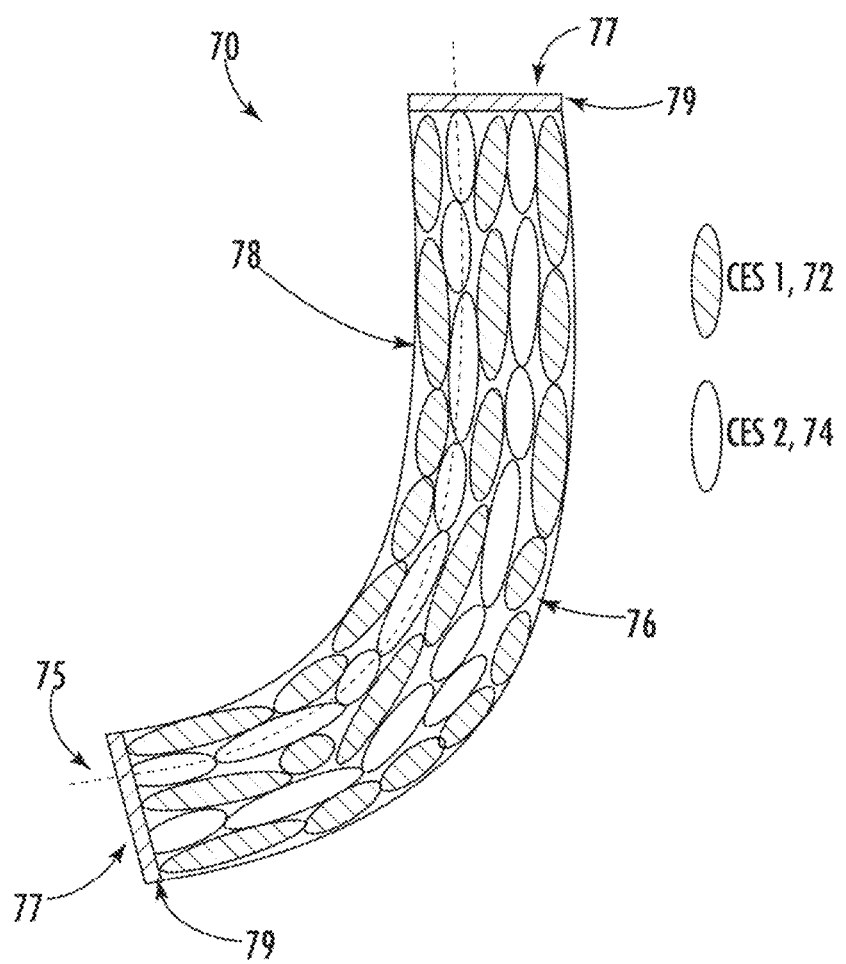
FIG. 7A illustrates a cutaway view of a flexible energy relay which achieves Transverse Anderson Localization by intermixing two component materials within an oil or liquid, in accordance with one embodiment of the present disclosure.

FIG. 7A illustrates a cutaway view of a flexible relay 70 exhibiting the Transverse Anderson Localization approach using CES material type 1 (72) and CES material type 2 (74) with intermixing oil or liquid 76 and with the possible use of end cap relays 79 to relay the energy waves from a first surface 77 to a second surface 77 on either end of the relay within a flexible tubing enclosure 78 in accordance with one embodiment of the present disclosure. The CES material type 1 (72) and CES material type 2 (74) both have the engineered property of being elongated—in this embodiment, the shape is elliptical, but any other elongated or engineered shape such as cylindrical or stranded is also possible. The elongated shape allows for channels of minimum engineered property variation 75.

For an embodiment for visible electromagnetic energy relays, relay 70 may have the bonding agent replaced with a refractive index matching oil 76 with a refractive index that matches CES material type 2 (74) and placed into the flexible tubing enclosure 78 to maintain flexibility of the mixture of CES material type 1 and CES material 2, and the end caps 79 would be solid optical relays to ensure that an image can be relayed from one surface of an end cap to the other. The elongated shape of the CES materials allows channels of minimum refractive index variation 75.

Multiple instances of relay 70 can be interlaced into a single surface in order to form a relay combiner in solid or flexible form.

In one embodiment, for visible electromagnetic energy relays, several instances of relay 70 may each be connected on one end to a display device showing only one of many specific tiles of an image, with the other end of the optical relay placed in a regular mosaic, arranged in such a way to display the full image with no noticeable seams. Due to the properties of the CES materials, it is additionally possible to fuse the multiple optical relays within the mosaic together.

Figure 7B:
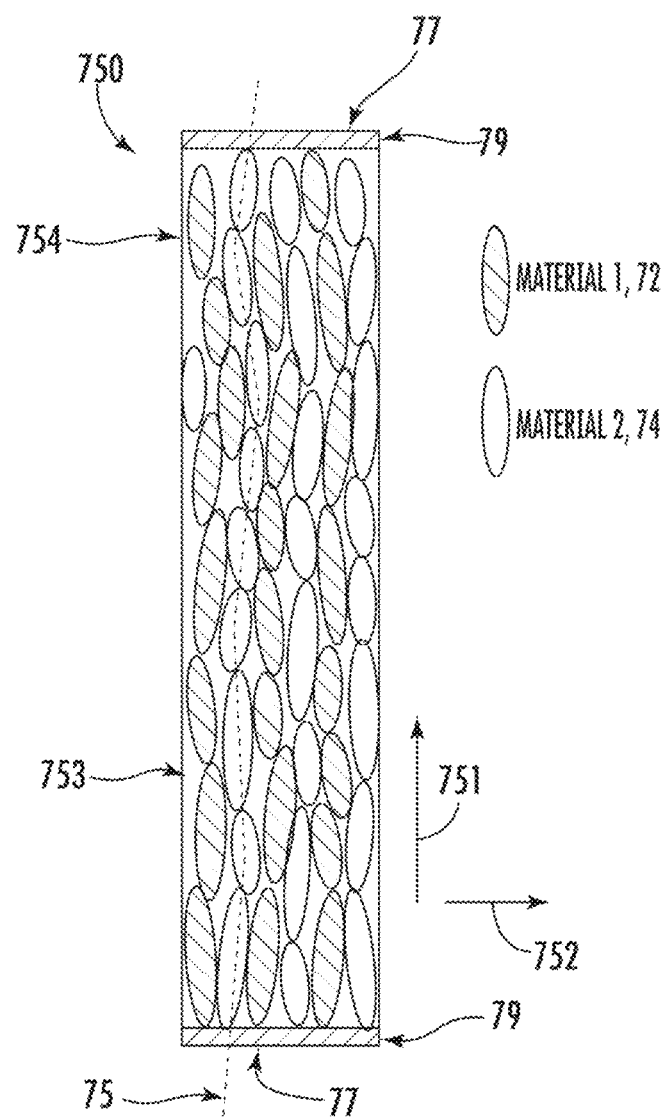
FIG. 7B illustrates a schematic cutaway view of a rigid energy relay which achieves Transverse Anderson Localization by intermixing two component materials within a bonding agent, and in doing so, achieves a path of minimum variation in one direction for one material property, in accordance with one embodiment of the present disclosure.

FIG. 7B illustrates a cutaway view of a rigid implementation 750 of a CES Transverse Anderson Localization energy relay. CES material type 1 (72) and CES material type 2 (74) are intermixed with bonding agent 753 which matches the index of refraction of material 2 (74). It is possible to use optional relay end caps 79 to relay the energy wave from the first surface 77 to a second surface 77 within the enclosure 754. The CES material type 1 (72) and CES material type 2 (74) both have the engineered property of being elongated—in this embodiment, the shape is elliptical, but any other elongated or engineered shape such as cylindrical or stranded is also possible. Also shown in FIG. 7B is a path of minimum engineered property variation 75 along the longitudinal direction 751, which assists the energy wave propagation in this direction 751 from one end cap surface 77 to the other end cap surface 77.

The initial configuration and alignment of the CESs can be done with mechanical placement, or by exploiting the EP of the materials, including but not limited to: electric charge, which when applied to a colloid of CESs in a liquid can result in colloidal crystal formation; magnetic moments which can help order CESs containing trace amounts of ferromagnetic materials, or relative weight of the CESs used, which with gravity helps to create layers within the bonding liquid prior to curing.

In one embodiment, for electromagnetic energy relays, the implementation depicted in FIG. 7B may have the bonding agent 753 matching the index of refraction of CES material type 2 (74), the optional end caps 79 may be solid optical relays to ensure that an image can be relayed from one surface of an end cap to the other, and the EP with minimal longitudinal variation may be refractive index, creating channels 75 which would assist the propagation of localized electromagnetic waves.

Figure 8:
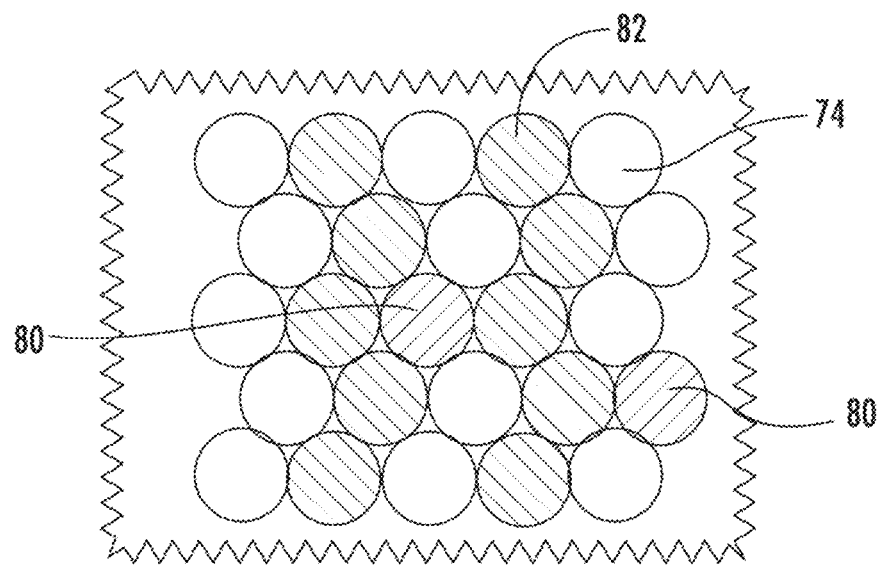
FIG. 8 illustrates a schematic cutaway view in the transverse plane the inclusion of a dimensional extra mural absorption ("DEMA") material in the longitudinal direction designed to absorb energy, in accordance with one embodiment of the present disclosure.

In an embodiment for visible electromagnetic energy relays, FIG. 8 illustrates a cutaway view in the transverse plane the inclusion of a DEMA (dimensional extra mural absorption) CES, 80, along with CES material types 74, 82 in the longitudinal direction of one exemplary material at a given percentage of the overall mixture of the material, which controls stray light, in accordance with one embodiment of the present disclosure for visible electromagnetic energy relays.

The additional CES materials that do not transmit light are added to the mixture(s) to absorb random stray light, similar to EMA in traditional optical fiber technologies, except that the distribution of the absorbing materials may be random in all three dimensions, as opposed to being invariant in the longitudinal dimension. Herein this material is called DEMA, 80. Leveraging this approach in the third dimension provides far more control than previous methods of implementation. Using DEMA, the stray light control is much more fully randomized than any other implementation, including those that include a stranded EMA that ultimately reduces overall light transmission by the fraction of the area of the surface of all the optical relay components it occupies. In contrast, DEMA is intermixed throughout the relay material, absorbing stray light without the same reduction of light transmission. The DEMA can be provided in any ratio of the overall mixture. In one embodiment, the DEMA is 1% of the overall mixture of the material. In a second embodiment, the DEMA is 10% of the overall mixture of the material.

In an additional embodiment, the two or more materials are treated with heat and/or pressure to perform the bonding process and this may or may not be completed with a mold or other similar forming process known in the art. This may or may not be applied within a vacuum or a vibration stage or the like to eliminate air bubbles during the melt process. For example, CES with material type polystyrene (PS) and polymethylmethacrylate (PMMA) may be intermixed and then placed into an appropriate mold that is placed into a uniform heat distribution environment capable of reaching the melting point of both materials and cycled to and from the respective temperature without causing damage/fractures due to exceeding the maximum heat elevation or declination per hour as dictated by the material properties.

For processes that require intermixing materials with additional liquid bonding agents, in consideration of the variable specific densities of each material, a process of constant rotation at a rate that prevents separation of the materials may be required.

Differentiating Anderson and Ordered Energy Relay Materials

Figures 9, 10:
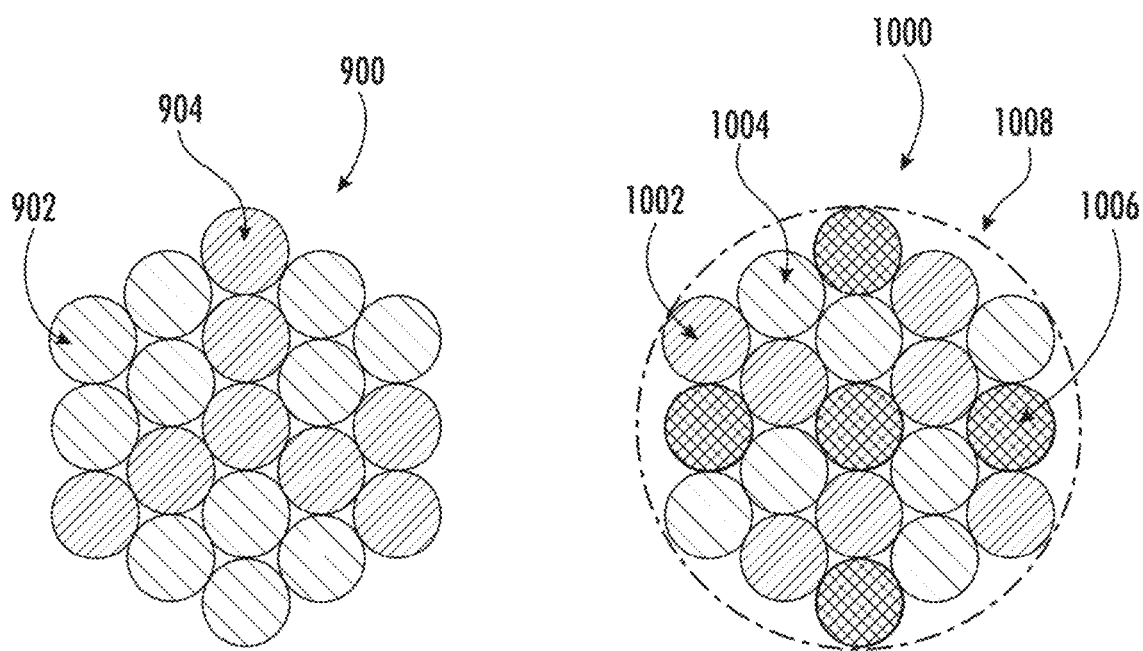
FIG. 9 illustrates a schematic cutaway view in the transverse plane of a portion of an energy relay comprising a random distribution of two component materials.
FIG. 10 illustrates a schematic cutaway view in the transverse plane of a module of an energy relay comprising a non-random pattern of three component materials which define a single module.

FIG. 9 illustrates a cutaway view in the transverse plane of a portion 900 of a pre-fused energy relay comprising a randomized distribution of particles comprising two component materials, component engineered structure ("CES") 902 and CES 904. In an embodiment, particles comprising either CES 902 or CES 904 may possess different material properties, such as different refractive indices, and may induce an Anderson Localization effect in energy transported therethrough, localizing energy in the transverse plane of the material. In an embodiment, particles comprising either CES 902 or CES 904 may extend into and out of the plane of the illustration in a longitudinal direction, thereby allowing energy propagation along the longitudinal direction with decreased scattering effects compared to traditional optical fiber energy relays due to the localization of energy in the transverse plane of the material.

FIG. 10 illustrates a cutaway view in the transverse plane of module 1000 of a pre-fused energy relay comprising a non-random pattern of particles, each particle comprising one of three component materials, CES 1002, CES 1004, or CES 1006. Particles comprising one of CES's 1002, 1004, or 1006 may possess different material properties, such as different refractive indices, which may induce an energy localization effect in the transverse plane of the module. The pattern of particles comprising one of CES's 1002, 1004, or 1006 may be contained within a module boundary 1008, which defines the particular pattern that particles comprising one of CES's 1002, 1004, or 1006 are arranged in. Similar to FIG. 9, particles comprising one of CES's 1002, 1004, or 1006 may extend in a longitudinal direction into and out of the plane of the illustration to allow energy propagation along the longitudinal direction with decreased scattering effects compared to traditional optical fiber energy relays due to the localization of energy in the transverse plane of the material.

Particles comprising one of CES's 902 or 904 from FIG. 9 and particles comprising one of CES's 1002, 1004, or 1006 from FIG. 10 may be long, thin rods of respective material which extend in a longitudinal direction normal to the plane of the illustration and are arranged in the particular patterns shown in FIG. 9 and FIG. 10 respectively. Although small gaps may exist between individual particles of CES due to the circular cross-sectional shape of the particles shown in FIG. 9 and FIG. 10, these gaps would effectively be eliminated upon fusing, as the CES materials would gain some fluidity during the fusing process and "melt" together to fill in any gaps. While the cross-sectional shapes illustrated in FIG. 9 and FIG. 10 are circular, this should not be considered limiting of the scope of this disclosure, and one skilled in the art should recognize that any shape or geometry of pre-fused material may be utilized in accordance with the principles disclosed herein. For example, in an embodiment, the individual particles of CES have a hexagonal rather than circular cross section, which may allow for smaller gaps between particles prior to fusing.

Figure 11:
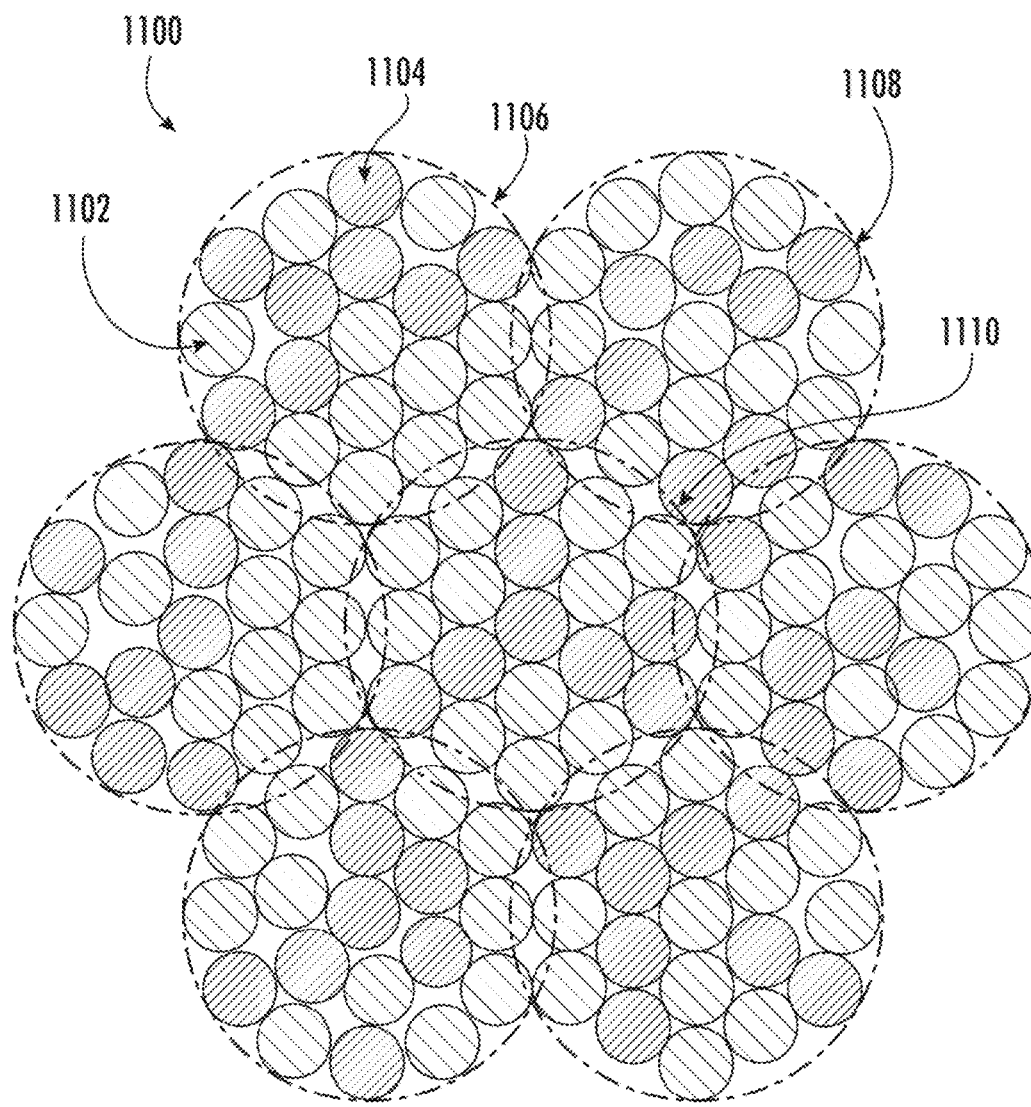
FIG. 11 illustrates a schematic cutaway view in the transverse plane of a portion of a pre-fused energy relay comprising a random distribution of two component materials.

FIG. 11 illustrates a cutaway view in the transverse plane of a portion 1100 of a pre-fused energy relay comprising a random distribution of particles comprising component materials CES 1102 and CES 1104. The portion 1100 may have a plurality of sub-portions, such as sub-portions 1106 and 1108 each comprising a randomized distribution of particles comprising CES 1102 and 1104. The random distribution of particles comprising CES 1102 and CES 1104 may, after fusing of the relay, induce a Transverse Anderson Localization effect in energy relayed in a longitudinal direction extending out of the plane of the illustration through portion 1100.

Figure 13:
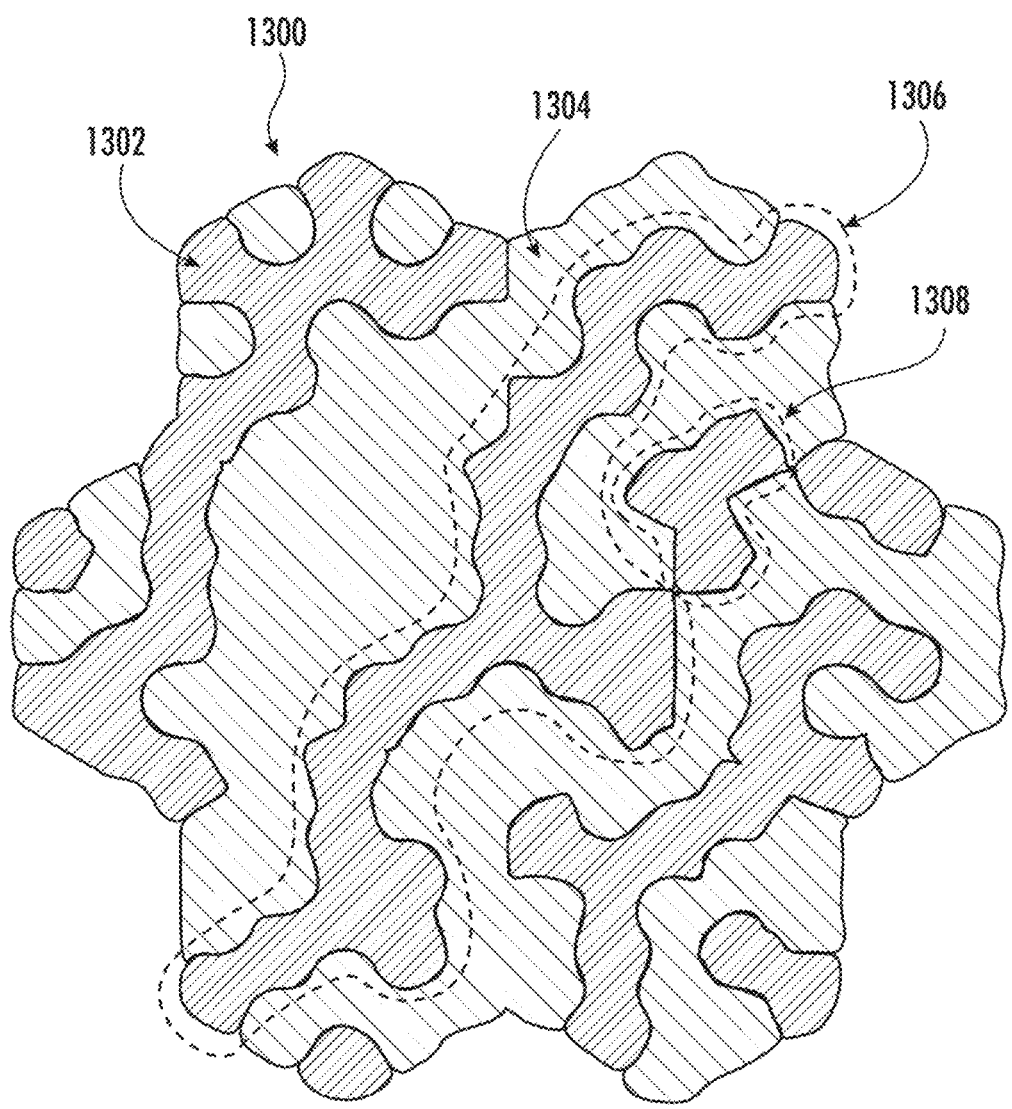
FIG. 13 illustrates a schematic cutaway view in the transverse plane of a portion of a fused energy relay comprising a random distribution of two component materials.

FIG. 13 illustrates a cutaway view in the transverse plane of a portion 1300 of a fused energy relay comprising a random distribution of particles comprising component materials CES 1302 and CES 1304. Portion 1300 may represent a possible fused form of portion 1100 from FIG. 11. In the context of the present disclosure, when adjacent particles of similar CES aggregate together upon fusing, this is referred to as an aggregated particle ("AP"). An example of an AP of CES 1302 can be seen at 1308, which may represent the fused form of several unfused CES 1302 particles (shown in FIG. 11). As illustrated in FIG. 13, the boundaries between each continuous particle of similar CES, as well as the boundaries between modules with similar CES border particles, are eliminated upon fusing, while new boundaries are formed between AP's of different CES.

According to the Anderson Localization principle, a randomized distribution of materials with different energy wave propagation properties distributed in the transverse direction of a material will localize energy within that direction, inhibiting energy scattering and reducing interference which may degrade the transport efficiency of the material. In the context of transporting electromagnetic energy, for example, through increasing the amount of variance in refractive index in the transverse direction by randomly distributing materials with differing refractive indices, it becomes possible to localize the electromagnetic energy in the transverse direction.

However, as discussed previously, due to the nature of randomized distributions, there exists the possibility that undesirable arrangements of materials may inadvertently form, which may limit the realization of energy localization effects within the material. For example, AP 1306 of FIG. 13 could potentially form after fusing the randomized distribution of particles shown in the corresponding location in FIG. 11. When designing a material for transporting electromagnetic energy, for example, a design consideration is the transverse size of pre-fused particles of CES. In order to prevent energy from scattering in the transverse direction, one may select a particle size such that upon fusing, the resultant average AP size is substantially on the order of the wavelength of the electromagnetic energy the material is intended to transport. However, while the average AP size can be designed for, one skilled in the art would recognize that a random distribution of particles will result in a variety of unpredictable sizes of AP, some being smaller than the intended wavelength and some being larger than the intended wavelength.

In FIG. 13, AP 1306 extends across the entire length of portion 1300 and represents an AP of a size much larger than average. This may imply that the size of AP 1306 is also much larger than the wavelength of energy that portion 1300 is intended to transport in the longitudinal direction. Consequently, energy propagation through AP 1306 in the longitudinal direction may experience scattering effects in the transverse plane, reducing the Anderson Localization effect and resulting in interference patterns within energy propagating through AP 1306 and a reduction in the overall energy transport efficiency of portion 1300.

It should be understood that, according to the principles disclosed herein and due to the nature of randomized distributions, a sub-portion within portion 1100, such as sub-portion 1108 for example, may be of arbitrary significance, since there is no defined distribution pattern. However, it should be apparent to one skilled in the art that in a given randomized distribution, there exists the possibility that one may identify distinct sub-portions that comprise the same or substantially similar patterns of distribution. This occurrence may not significantly inhibit the overall induced Transverse Anderson Localization effect, and the scope of the present disclosure should not be seen as limited to exclude such cases.

The non-random, Ordered Energy Localization pattern design considerations disclosed herein represent an alternative to a randomized distribution of component materials, allowing energy relay materials to exhibit energy localization effects in the transverse direction while avoiding the potentially limiting deviant cases inherent to randomized distributions.

It should be noted that across different fields and throughout many disciplines, the concept of "randomness," and indeed the notions of what is and is not random are not always clear. There are several important points to consider in the context of the present disclosure when discussing random and non-random patterns, arrangements, distributions, et cetera, which are discussed below. However, it should be appreciated that the disclosures herein are by no means the only way to conceptualize and/or systematize the concepts of randomness or non-randomness. Many alternate and equally valid conceptualizations exist, and the scope of the present disclosure should not be seen as limited to exclude any approach contemplated by one skilled in the art in the present context.

Complete spatial randomness ("CSR"), which is well-known in the art and is described in Smith, T. E., (2016) Notebook on Spatial Data Analysis [online] (http://www.seas.upenn.edu/~ese502/#notebook), which is herein incorporated by reference, is a concept used to describe a distribution of points within a space (in this case, within a 2D plane) which are located in a completely random fashion. There are two common characteristics used to describe CSR: The spatial Laplace principle, and the assumption of statistical independence.

The spatial Laplace principle, which is an application of the more general Laplace principle to the domain of spatial probability, essentially states that, unless there is information to indicate otherwise, the chance of a particular event, which may be thought of as the chance of a point being located in a particular location, is equally as likely for each location within a space. That is to say, each location within a region has an equal likelihood of containing a point, and therefore, the probability of finding a point is the same across each location within the region. A further implication of this is that the probability of finding a point within a particular sub-region is proportional to the ratio of the area of that sub-region to the area of the entire reference region.

A second characteristic of CSR is the assumption of spatial independence. This principle assumes that the locations of other data points within a region have no influence or effect on the probability of finding a data point at a particular location. In other words, the data points are assumed to be independent of one another, and the state of the "surrounding areas", so to speak, do not affect the probability of finding a data point at a location within a reference region.

The concept of CSR is useful as a contrasting example of a non-random pattern of materials, such as some embodiments of CES materials described herein. An Anderson material is described elsewhere in this disclosure as being a random distribution of energy propagation materials in a transverse plane of an energy relay. Keeping in mind the CSR characteristics described above, it is possible to apply these concepts to some of the embodiments of the Anderson materials described herein in order to determine whether the "randomness" of those Anderson material distributions complies with CSR. Assuming embodiments of an energy relay comprising first and second materials, since a CES of either the first or second material may occupy roughly the same area in the transverse plane of the embodiments (meaning they are roughly the same size in the transverse dimension), and further since the first and second CES may be assumed to be provided in equal amounts in the embodiments, we can assume that for any particular location along the transverse plane of the energy relay embodiments, there is an equally likely chance of there being either a first CES or a second CES, in accordance with spatial Laplace principle as applied in this context. Alternatively, if the relay materials are provided in differing amounts in other energy relay embodiments, or possess a differing transverse size from one another, we would likewise expect that the probability of finding either material be in proportion to the ratio of materials provided or to their relative sizes, in keeping with the spatial Laplace principle.

Next, because both the first and second materials of Anderson energy relay embodiments are arranged in a random manner (either by thorough mechanical mixing, or other means), and further evidenced by the fact that the "arrangement" of the materials may occur simultaneously and arise spontaneously as they are randomized, we can assert that the identities of neighboring CES materials will have substantially no effect on the identity of a particular CES material, and vice versa, for these embodiments. That is, the identities of CES materials within these embodiments are independent of one another. Therefore, the Anderson material embodiments described herein may be said to satisfy the described CSR characteristics. Of course, as discussed above, the nature of external factors and "real-world" confounding factors may affect the compliance of embodiments of Anderson energy relay materials with strict CSR definitions, but one of ordinary skill in the art would appreciate that these Anderson material embodiments substantially fall within reasonable tolerance of such definitions.

By contrast, an analysis of some of the Ordered Energy Localization relay material embodiments as disclosed herein highlights particular departures from their counterpart Anderson material embodiments (and from CSR). Unlike an Anderson material, a CES material identity within an Ordered Energy Localization relay embodiment may be highly correlated with the identities of its neighbors. The very pattern of the arrangement of CES materials within certain Ordered Energy Localization relay embodiments is designed to, among other things, influence how similar materials are arranged spatially relative to one another in order to control the effective size of the APs formed by such materials upon fusing. In other words, one of the goals of some embodiments which arrange materials in an Ordered Energy Localization distribution is to affect the ultimate cross-sectional area (or size), in the transverse dimension, of any region comprising a single material (an AP). This may limit the effects of transverse energy scattering and interference within said regions as energy is relayed along a longitudinal direction. Therefore, some degree of specificity and/or selectivity is exercised when energy relay materials are first "arranged" in an Ordered Energy Localization distribution embodiment, which may disallow for a particular CES identity to be "independent" of the identity of other CES, particularly those materials immediately surrounding it. On the contrary, in certain embodiments materials are specifically chosen according to a non-random pattern, with the identity of any one particular CES being determined based on a continuation of the pattern and in knowing what portion of the pattern (and thus, what materials) are already arranged. It follows that these certain Ordered Energy Localization distribution energy relay embodiments cannot comply with CSR criteria. Thus, the pattern or arrangement of two or more CES or energy relay materials may be described in the present disclosure as "non-random" or "substantially non-random," and one of ordinary skill in the art should appreciate that the general concept or characteristics of CSR as describe above may be considered, among other things, to distinguish non-random or substantially non-random pattern from random pattern. For example, in an embodiment, materials that do not substantially comply with the general concept or characteristics of CSR as described, may be considered an Ordered Energy Localization material distribution. In this disclosure, the term 'ordered' may be recited to describe a distribution of component engineered structure materials for relays that transmits energy through the principle of Ordered Energy Localization. The term 'ordered energy relay', 'ordered relay', 'ordered distribution', 'non-random pattern', etc., describe an energy relay in which energy is transmitted at least partially through this same principle of Ordered Energy Localization described herein.

Of course, the CSR concept is provided herein as an example guideline to consider, and one of ordinary skill in the art may consider other principles known in the art to distinguish non-random patterns from random patterns. For example, it is to be appreciated that, like a human signature, a non-random pattern may be considered as a non-random signal that includes noise. Non-random patterns may be substantially the same even when they are not identical due to the inclusion of noise. A plethora of conventional techniques exist in the art of pattern recognition and comparison that may be used to separate noise and non-random signals and correlate the latter. By way of example, U.S. Pat. No. 7,016,516 to Rhoades, which is incorporated by reference herein, describes a method of identifying randomness (noise, smoothness, snowiness, etc.), and correlating non-random signals to determine whether signatures are authentic. Rhodes notes that computation of a signal's randomness is well understood by artisans in this field, and one example technique is to take the derivative of the signal at each sample point, square these values, and then sum over the entire signal. Rhodes further notes that a variety of other well-known techniques can alternatively be used. Conventional pattern recognition filters and algorithms may be used to identify the same non-random patterns. Examples are provided in U.S. Pat. Nos. 5,465,308 and 7,054,850, all of which are incorporated by reference herein. Other techniques of pattern recognition and comparison will not be repeated here, but it is to be appreciated that one of ordinary skill in the art would easily apply existing techniques to determine whether an energy relay comprises a plurality of repeating modules each comprising at least first and second materials being arranged in a substantially non-random pattern, are in fact comprising the same substantially non-random pattern.

Furthermore, in view of the above-mentioned points regarding randomness and noise, it should be appreciated that an arrangement of materials into a substantially non-random pattern may, due to unintentional factors such as mechanical inaccuracy or manufacturing variability, suffer from a distortion of the intended pattern. An example of such a distortion is illustrated in FIG. 20B, where a boundary 2005 between two different materials is affected by the fusing process such that it has a unique shape not originally part of the non-random arrangement of materials illustrated in FIG. 20A. It would be apparent to one skilled in the art, however, that such distortions to a non-random pattern are largely unavoidable and are intrinsic to the nature of the mechanical arts, and that the non-random arrangement of materials shown in FIG. 20A is still substantially maintained in the fused embodiment shown in FIG. 20B, despite mechanical distortions to the boundaries of said materials. Thus, when considering an arrangement of materials, it is within the capabilities of one such skilled in the art to distinguish a distorted portion of a pattern from an undistorted portion, just as one would identify two signatures as belonging to the same person despite their unique differences.

Figure 12A:
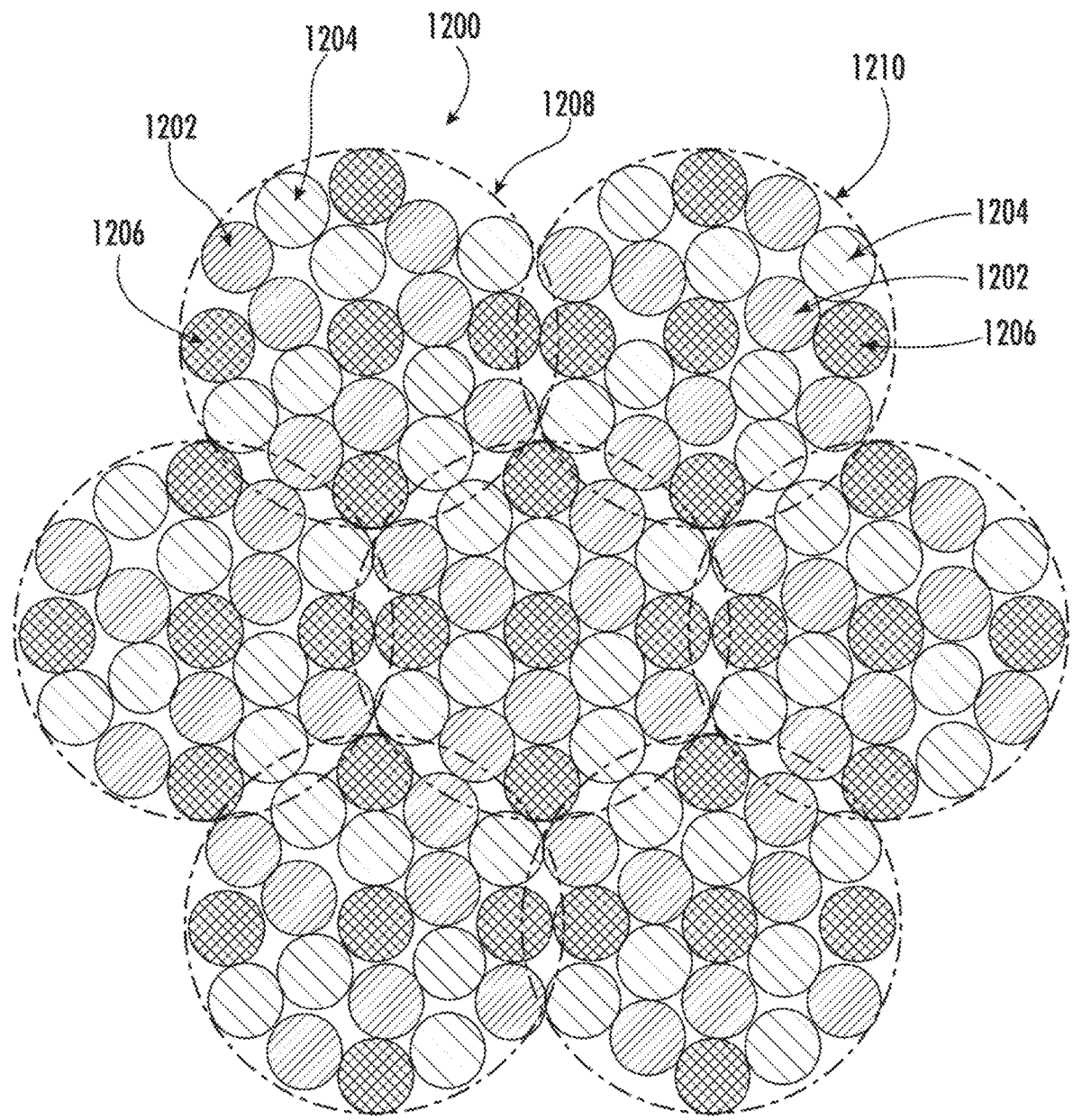
FIG. 12A illustrates a schematic cutaway view in the transverse plane of a portion of a pre-fused energy relay comprising a nonrandom distribution of three component materials which define multiple modules with similar orientations.

FIG. 12A illustrates a cutaway view in the transverse plane of a portion 1200 of a pre-fused energy relay comprising a non-random pattern (a distribution configured to relay energy via Ordered Energy Localization) of three component materials CES 1202, CES 1204, or CES 1206, which define multiple modules with similar orientations. Particles of these three CES materials are arranged in repeating modules, such as module 1208 and module 1210, which share substantially invariant distributions of said particles. While portion 1200 contains six modules as illustrated in FIG. 12A, the number of modules in a given energy relay can be any number and may be chosen based on the desired design parameters. Additionally, the size of the modules, the number of particles per module, the size of the individual particles within a module, the distribution pattern of particles within a module, the number of different types of modules, and the inclusion of extra-modular or interstitial materials may all be design parameters to be given consideration and fall within the scope of the present disclosure.

Similarly, the number of different CES's included within each module need not be three as illustrated in FIG. 12A, but may preferably be any number suited to the desired design parameters. Furthermore, the different characteristic properties possessed by each CES may be variable in order to satisfy the desired design parameters, and differences should not be limited only to refractive index. For example, two different CES's may possess substantially the same refractive index, but may differ in their melting point temperatures.

In order to minimize the scattering of energy transported through the portion 1200 of the energy relay illustrated in FIG. 12A, and to promote transverse energy localization, the non-random pattern of the modules that comprise portion 1200 may satisfy the Ordered Energy Localization distribution characteristics described above. In the context of the present disclosure, contiguous particles may be particles that are substantially adjacent to one another in the transverse plane. The particles may be illustrated to be touching one another, or there may be an empty space illustrated between the adjacent particles. One skilled in the art will appreciate that small gaps between adjacent illustrated particles are either inadvertent artistic artifacts or are meant to illustrate the minute mechanical variations which can arise in real-world arrangement of materials. Furthermore, this disclosure also includes arrangements of CES particles in substantially non-random patterns, but contain exceptions due to manufacturing variations or intentional variation by design.

Figure 12B:
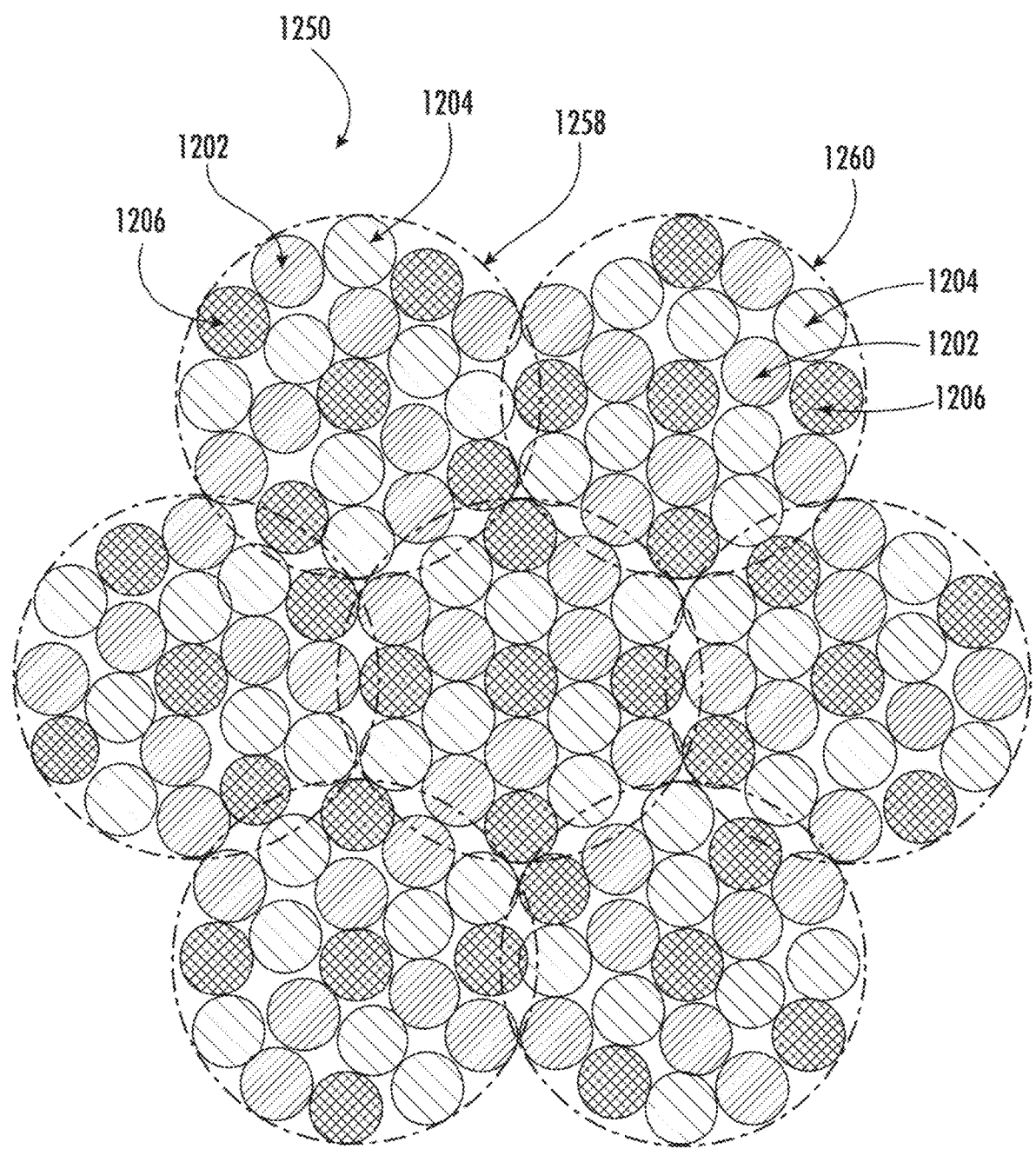
FIG. 12B illustrates a schematic cutaway view in the transverse plane of a portion of a pre-fused energy relay comprising a non-random pattern of three component materials which define multiple modules with varying orientations.

Ordered Energy Localization patterns of CES particles may allow for greater localization of energy, and reduce scattering of energy in a transverse direction through a relay material, and consequently allow for higher efficiency of energy transport through the material relative to other embodiments. FIG. 12B illustrates a cutaway view in the transverse plane of a portion 1250 of a pre-fused energy relay comprising a non-random pattern of particles of three component materials, CES 1202, CES 1204, and CES 1206, wherein the particles define multiple modules with varying orientations. Modules 1258 and 1260 of portion 1250 comprise a non-random pattern of materials similar to that of modules 1208 and 1210 of FIG. 12A. However, the pattern of materials in module 1260 are rotated relative to that of module 1258. Several other modules of portion 1250 also exhibit a rotated pattern of distribution. It is important to note that despite this rotational arrangement, each module within portion 1250 possesses the Ordered Energy Localization distribution described above, since the actual pattern of particle distribution within each module remains the same regardless of how much rotation is imposed upon it.

Figure 14:
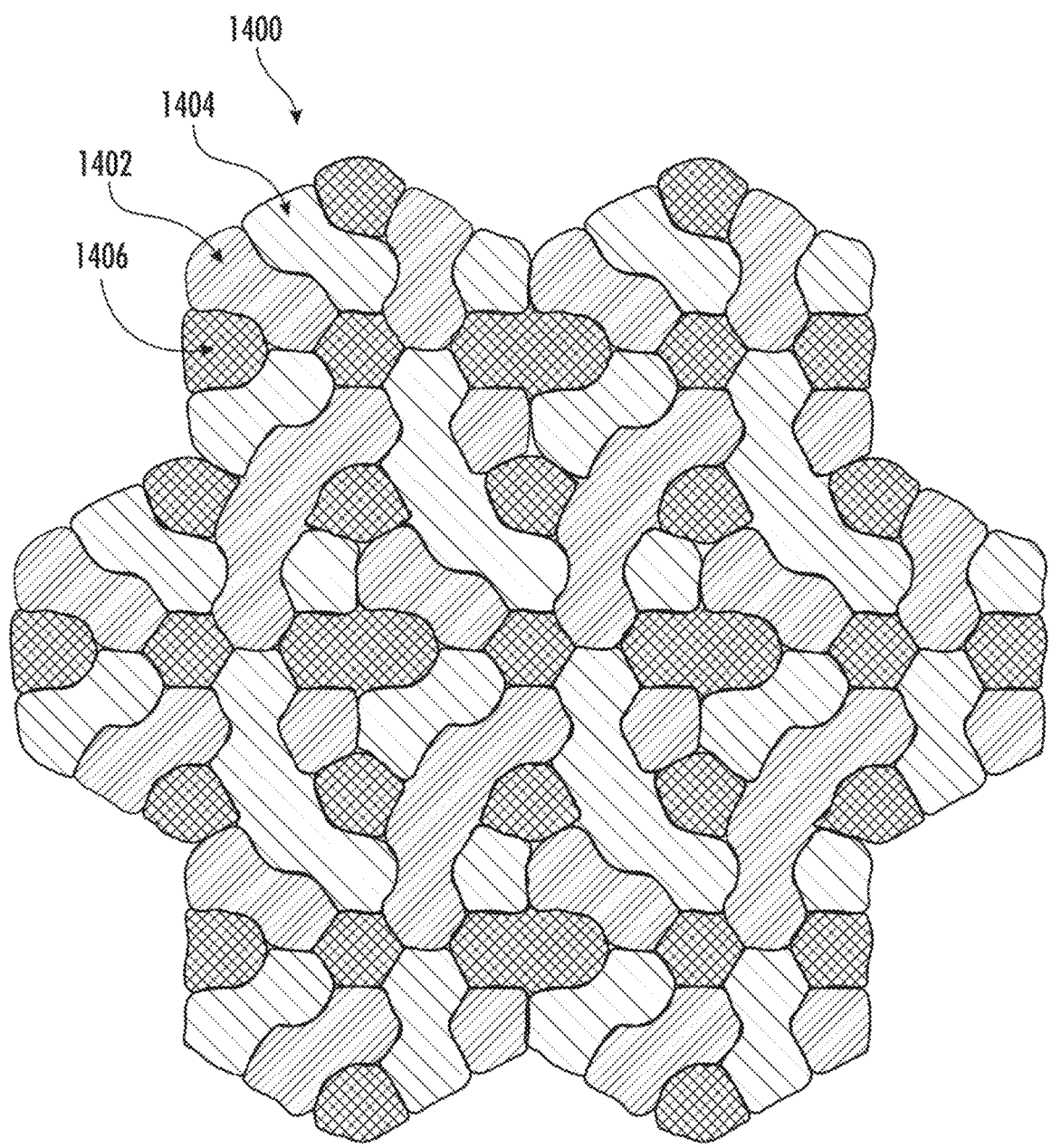
FIG. 14 illustrates a schematic cutaway view in the transverse plane of a portion of a fused energy relay comprising a non-random pattern of three component materials.

FIG. 14 illustrates a cutaway view in the transverse plane of a portion 1400 of a fused energy relay comprising a non-random pattern of particles of three component materials, CES 1402, CES 1404, and CES 1406. Portion 1400 may represent a possible fused form of portion 1200 from FIG. 12A. By arranging CES particles in an Ordered Energy Localization distribution, the relay shown in FIG. 14 may realize more efficient transportation of energy in a longitudinal direction through the relay relative to the randomized distribution shown in FIG. 13. By selecting CES particles with a diameter roughly ½ of the wavelength of energy to be transported through the material and arranging them in a pre-fuse Ordered Energy Localization distribution shown in FIG. 12A, the size of the resultant AP's after fusing seen in FIG. 14 may have a transverse dimension between ½ and 2 times the wavelength of intended energy. By substantially limiting transverse AP dimensions to within this range, energy transported in a longitudinal direction through the material may allow for Ordered Energy Localization and reduce scattering and interference effects. In an embodiment, a transverse dimension of AP's in a relay material may preferably be between ¼ and 8 times the wavelength of energy intended to be transported in a longitudinal direction through the APs.

As seen in FIG. 14, and in contrast with FIG. 13, there is notable consistency of size across all APs, which may result from exerting control over how pre-fused CES particles are arranged. Specifically, controlling the pattern of particle arrangement may reduce or eliminate the formation of larger AP's with larger energy scattering and interference patterns, representing an improvement over randomized distributions of CES particles in energy relays.

Figure 15:
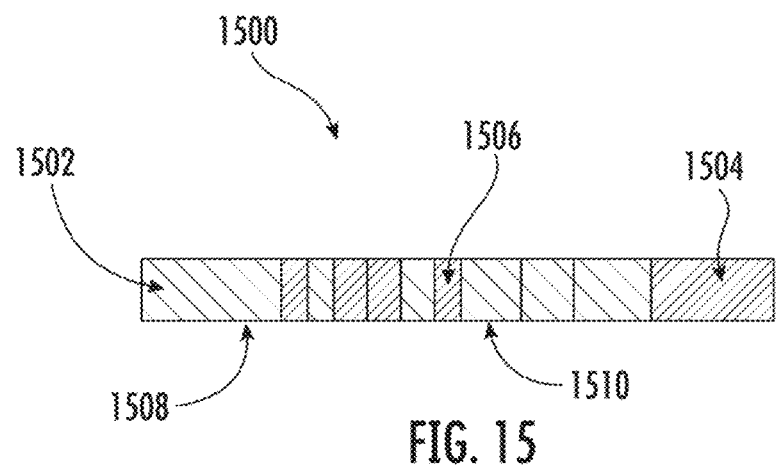
FIG. 15 illustrates a schematic cross-sectional view of a portion of an energy relay comprising a randomized distribution of two different component engineered structure ("CES") materials.

FIG. 15 illustrates a cross-sectional view of a portion 1500 of an energy relay comprising a randomized distribution of two different CES materials, CES 1502 and CES 1504. Portion 1500 is designed to transport energy longitudinally along the vertical axis of the illustration, and comprises a number of AP's distributed along the horizontal axis of the illustration in a transverse direction. AP 1510 may represent an average AP size of all the AP's in portion 1500. As a result of randomizing the distribution of CES particles prior to fusing of portion 1500, the individual AP's that make up portion 1500 may substantially deviate from the average size shown by 1510. For example, AP 1508 is wider than AP 1510 in the transverse direction by a significant amount. Consequently, energy transported through AP's 1510 and 1508 in the longitudinal direction may experience noticeably different localization effects, as well as differing amounts of wave scattering and interference. As a result, upon reaching its relayed destination, any energy transported through portion 1500 may exhibit differing levels of coherence, or varying intensity across the transverse axis relative to its original state when entering portion 1500. Having energy emerge from a relay that is in a significantly different state than when it entered said relay may be undesirable for certain applications such as image light transport.

Additionally, AP 1506 shown in FIG. 15 may be substantially smaller in the transverse direction than average-sized AP 1510. As a result, the transverse width of AP 1506 may be too small for energy of a certain desired energy wavelength domain to effectively propagate through, causing degradation of said energy and negatively affecting the performance of portion 1500 in relaying said energy.

Figure 16:
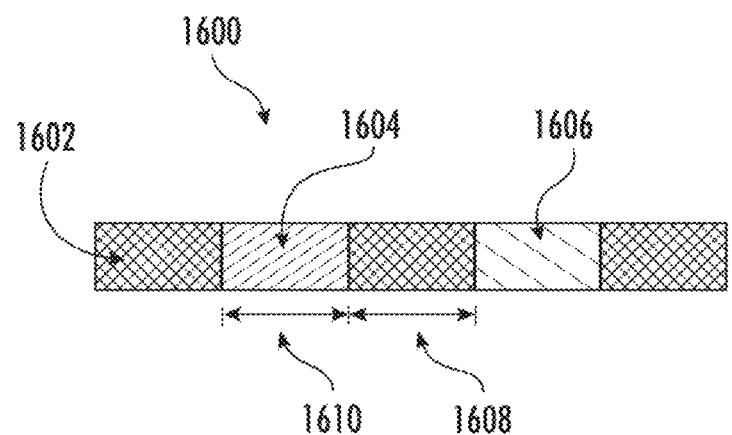
FIG. 16 illustrates a schematic cross-sectional view of a portion of an energy relay comprising a non-random pattern of three different CES materials.

FIG. 16 illustrates a cross-sectional view of a portion 1600 of an energy relay comprising a non-random pattern of three different CES materials, CES 1602, CES 1604, and CES 1606. Portion 1600 is designed to transport energy longitudinally along the vertical axis of the illustration, and comprises a number of AP's distributed along the horizontal axis of the illustration in a transverse direction. AP 1610, comprising CES 1604, and AP 1608, comprising CES 1602, may both have substantially the same size in the transverse direction. All other AP's within portion 1600 may also substantially share a similar AP size in the transverse direction. As a result, energy being transported longitudinally through portion 1600 may experience substantially uniform localization effects across the transverse axis of portion 1600, and suffer reduced scattering and interference effects. By maintaining a consistent AP width in the transverse dimension, energy which enters portion 1600 will be relayed and affected equally regardless of where along the transverse direction it enters portion 1600. This may represent an improvement of energy transport over the randomized distribution demonstrated in FIG. 15 for certain applications such as image light transport.

Figure 17:
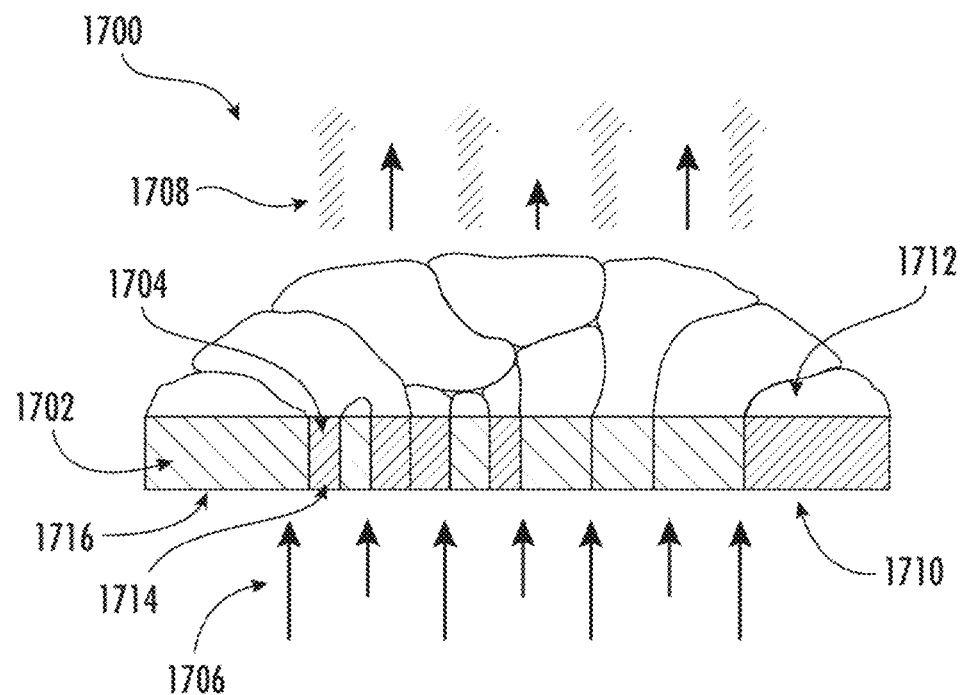
FIG. 17 illustrates a schematic cross-sectional perspective view of a portion of an energy relay comprising a randomized distribution of aggregated particles of two component materials.

FIG. 17 illustrates a cross-sectional perspective view of a portion 1700 of an energy relay comprising a randomized distribution of aggregated particles comprising component materials CES 1702 and 1704. In FIG. 17, input energy 1706 is provided for transport through portion 1700 in a longitudinal direction (y-axis) through the relay, corresponding with the vertical direction in the illustration as indicated by the arrows representing energy 1706. The energy 1706 is accepted into portion 1700 at side 1710 and emerges from portion 1700 at side 1712 as energy 1708. Energy 1708 is illustrated as having varying sizes and pattern of arrows which are intended to illustrate that energy 1708 has undergone non-uniform transformation as it was transported through portion 1700, and different portions of energy 1708 differ from initial input energy 1706 by varying amounts in magnitude and localization in the transverse directions (x-axis) perpendicular to the longitudinal energy direction 1706.

As illustrated in FIG. 17, there may exist an AP, such as AP 1714, that possesses a transverse size that is too small, or otherwise unsuited, for a desired energy wavelength to effectively propagate from side 1710 through to side 1712. Similarly, an AP such as AP 1716 may exist that is too large, or otherwise unsuited, for a desired energy wavelength to effectively propagate from side 1710 through to side 1712. The combined effect of this variation in energy propagation properties across portion 1700, which may be a result of the randomized distribution of CES particles used to form portion 1700, may limit the efficacy and usefulness of portion 1700 as an energy relay material.

Figure 18:
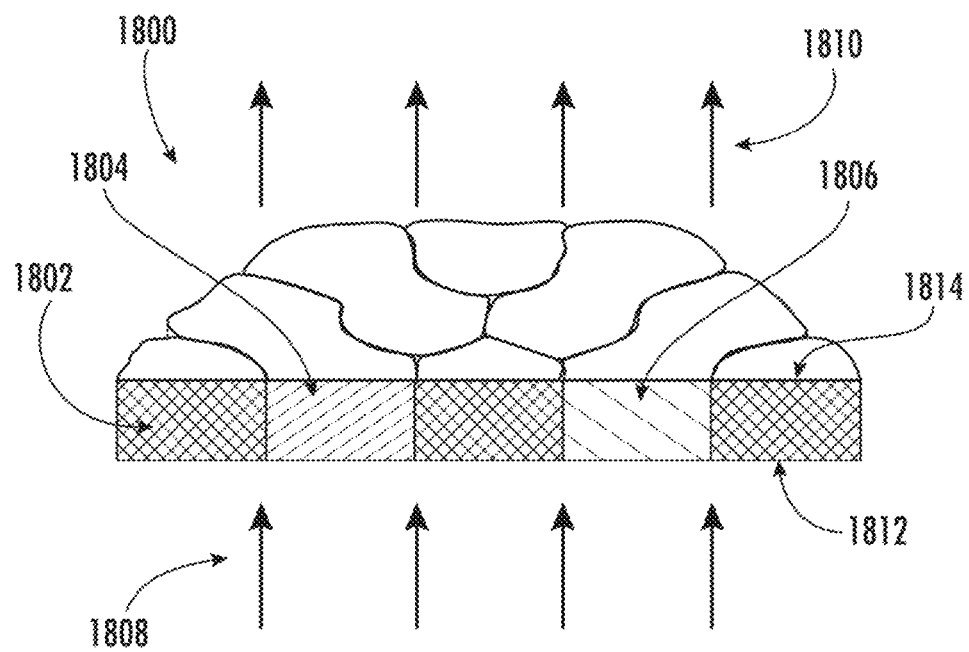
FIG. 18 illustrates a schematic cross-sectional perspective view of a portion of an energy relay comprising a non-random pattern of aggregated particles of three component materials.

FIG. 18 illustrates a cross-sectional perspective view of a portion 1800 of an energy relay comprising a non-random pattern of aggregated particles of three component materials, CES 1802, CES 1804, and CES 1806. In FIG. 18, input energy 1808 is provided for transport through portion 1800 in a longitudinal direction through the relay, corresponding with the vertical direction in the illustration as indicated by the arrows representing energy 1808. The energy 1808 is accepted into portion 1800 at side 1812 and is relayed to and emerges from side 1814 as energy 1810. As illustrated in FIG. 18, output energy 1810 may have substantially uniform properties across the transverse direction of portion 1800. Furthermore, input energy 1808 and output energy 1810 may share substantially invariant properties, such as wavelength, intensity, resolution, or any other wave propagation properties. This may be due to the uniform size and distribution of AP's along the transverse direction of portion 1800, allowing energy at each point along the transverse direction to propagate through portion 1800 in a commonly affected manner, which may help limit any variance across emergent energy 1810, and between input energy 1808 and emergent energy 1810.

Fixturing Methods Addressing Biaxial Stress for Forming Energy Relays

Figure 23A:
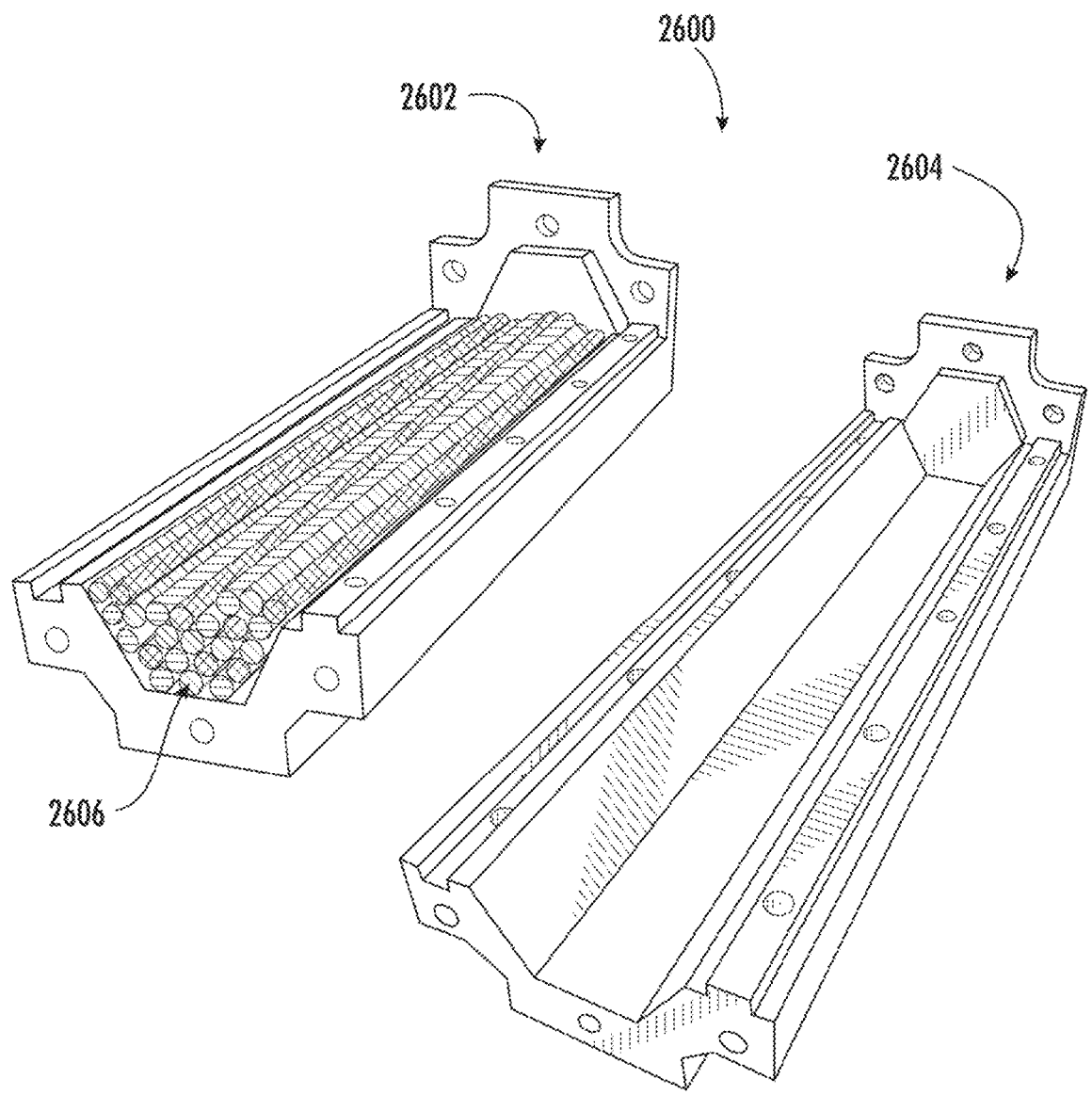
FIG. 23A illustrates an embodiment for fusing energy relay materials by fixing the pre-fused relay materials in a fixture.
Figure 23D:
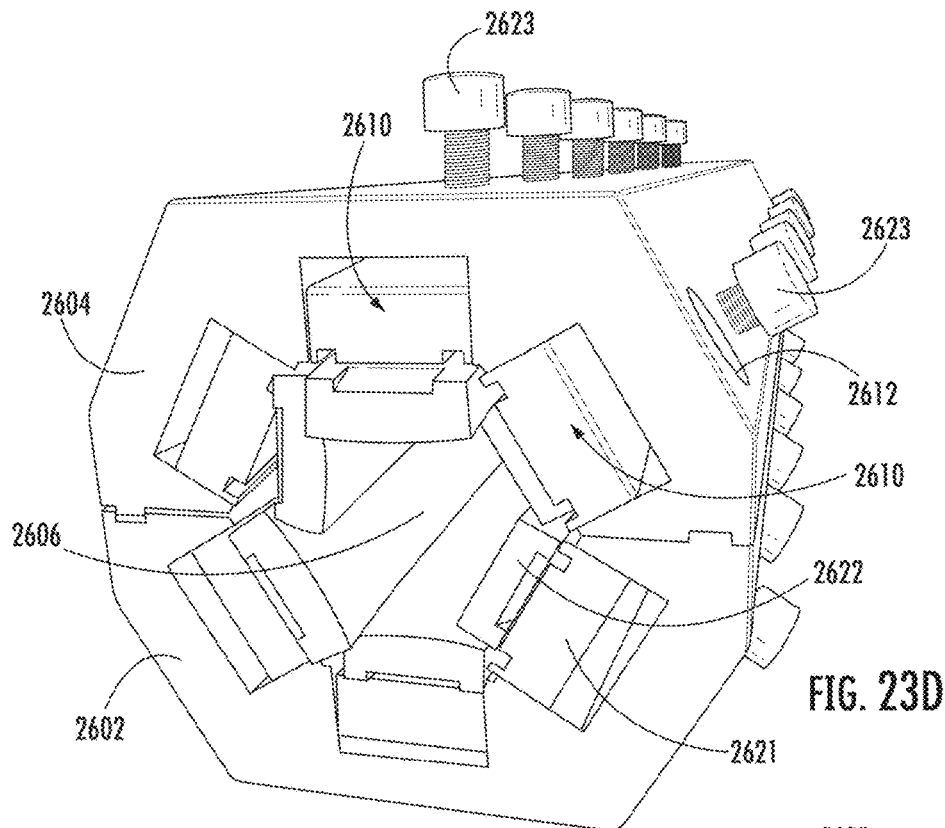
FIG. 23D illustrates a perspective view of an embodiment of an adjustable fixture for fusing energy relay materials.

FIG. 23A illustrates a perspective view of system 2600 for fusing energy relay materials by fixing the pre-fused relay materials 2606 in a fixture comprising two pieces 2602 and 2604. Materials 2606 may be arranged in a random or pattern pattern prior to placing within fixtures 2602 and 2604, after which they are held by the fixtures in the arranged pattern. In embodiments, the pattern of materials 2606 may be formed within the interior space between fixtures 2602 and 2604 after they have been assembled together. In an embodiment, relaxation of materials 2606 may occur before, during, or after fusing the relay materials 2606. While the example shown in FIGS. 23B and 23D show a pattern of materials 2606, the same processing method may be used for a pattern of materials.

FIG. 23B illustrates an embodiment in which fixtures 2602 and 2604 are assembled and contain energy relay materials as part of fusing the energy relay materials. The assembled fixtures 2602 and 2604 containing a pattern of materials 2606 may then be heated by applying heat 2614 for a suitable amount of time at a suitable temperature in order to relax the relay materials. In an embodiment, the amount of time and temperature for applying may be determined based on the relay materials' material properties, including the change in structural stress due to the addition or removal of heat. In an embodiment, relaxing of materials 2606 s may be a pre-fusing process whereby the materials are held at a temperature or within a range of temperatures for an extended period of time in order to release structural stresses, including, for example, those from the annealed relaxation of the stress in biaxial materials, and help the materials form more effective bonds during the fusing process. If energy relay materials are not relaxed before fusing, the material may "relax" after the fusing process has occurred and suffer a deformation or delamination with adjacent materials, or the CES material pattern may otherwise be compromised by shifting in an undesired way. The relaxation method is intended to prevent this by preparing the pattern of relay materials for the fusing process so that the pattern may be maintained to a greater degree after fusing. Additionally, relaxing materials may make for a more effective draw or pull of the material during the process illustrated in FIG. 21. Once the relaxation process is complete, the materials 2606 may remain in fixtures 2602 and 2604 as the system is heated to the fusing temperature by adjusting heat 2614, and materials 2606 are fused together, or the materials may be removed from the fixtures 2602 and 2604 prior to fusing.

Figure 24:
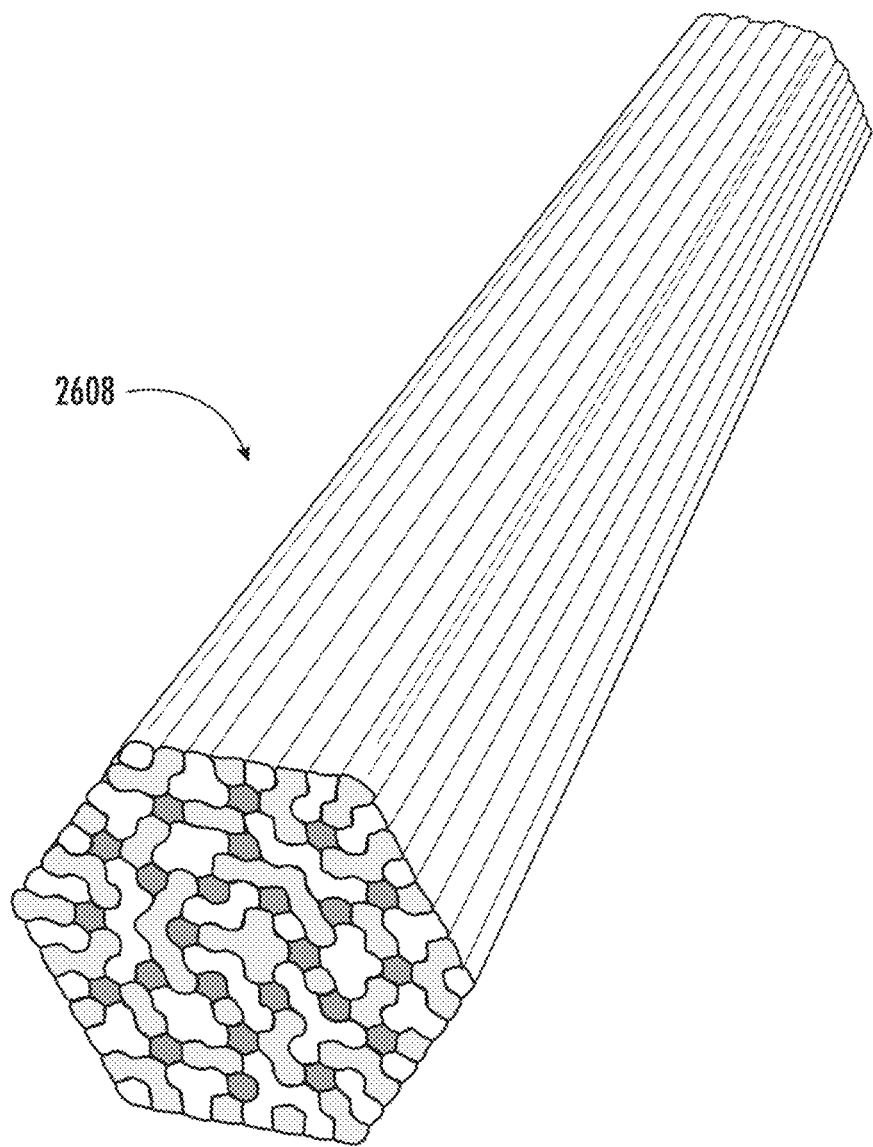
FIG. 24 illustrates a perspective view of a fused block of energy relay materials.
Figure 25:
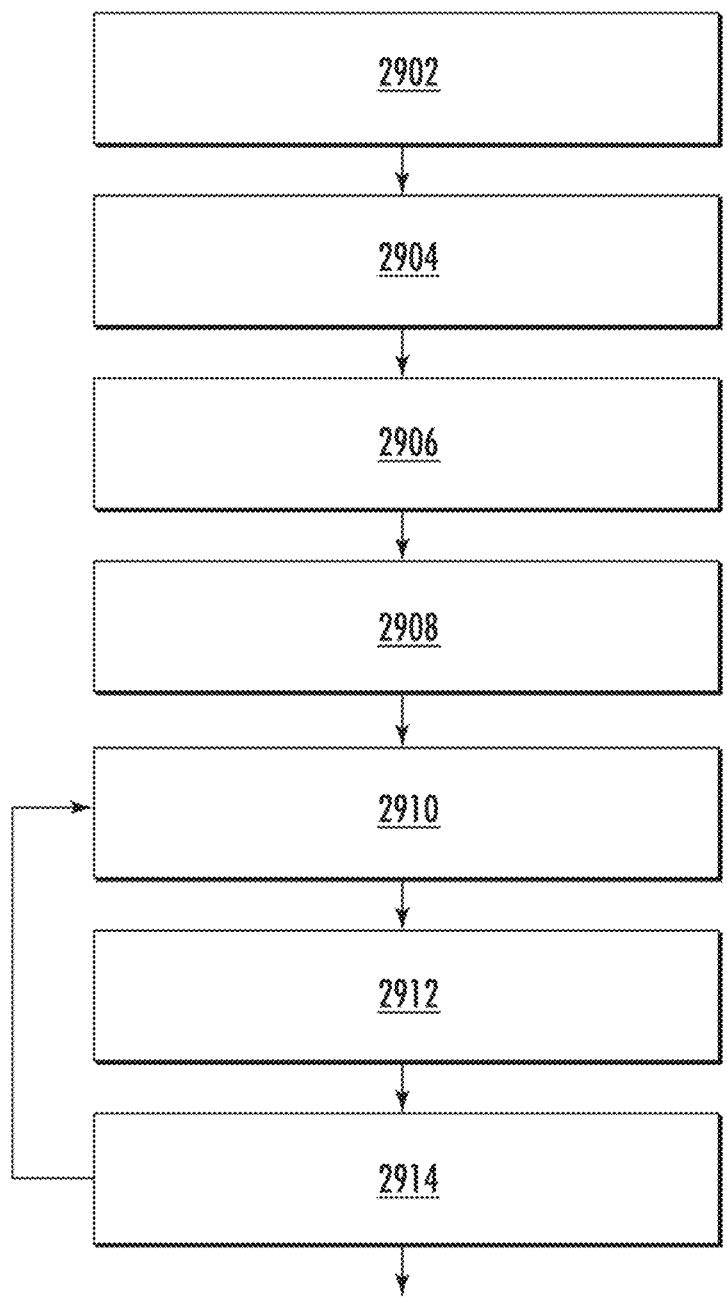
FIG. 25 illustrates a block diagram of a process for manufacturing energy relay materials.

FIG. 23C illustrates the materials shown at 2606 in FIG. 23B having been fused together, to form the fused energy relay material 2608. In the embodiment shown, the relay materials are kept inside the fixtures 2604 and 2602 during the relay fusing process, and then the resulting fused relay 2608 as illustrated in FIG. 24 is removed from the fixture. In embodiments, the energy relay materials may be removed from fixtures 2602 and 2604 prior to fusing.

Additionally, in an embodiment the fixtures 2602 and 2604 may be configured to apply a compressive force 2610 on the energy relay materials. The compressive force 2610 may be directed along the transverse plane of the energy relay materials in order to provide resistance to expansion or deformation along the transverse plane as internal stresses are relaxed in the material. This compressive force 2610 may be adjustable, such that the amount of compressive force may be increased or decreased as desired, in combination with temperature changes applied to the energy relay materials. In embodiments, the compressive force 2610 may further be variable along the longitudinal orientation, such that different portions of the energy relay material may experience different amounts of compressive force simultaneously. This compressive force 2610 may be applied with bolts 2612 that clamp fixture components 2602 and 2604 together, where the bolts 2612 are distributed along the length of the relay. In another embodiment, the interior sides of fixture components 2602 and 2604 may contain movable strips extending the length of the fixture, that may apply force toward the center of the relay.

FIG. 23D illustrates a perspective view of a fixture 2601 for fusing energy relay materials with movable strips on each interior surface of the fixture in order to apply a radially inward compressive force. In the embodiment illustrated in FIG. 23D, the interior sides of fixture components 2602 and 2604 may contain movable strips 2621 extending along a longitudinal direction (e.g., the length) of the fixture 2601 and positioned around a perimeter of the constrained space 2606. The strips 2621 may be configured to move along transverse directions perpendicular to the longitudinal direction to apply compressive force 2610 towards the constrained space 2606 defined by the fixture 2601, oriented towards the center of relay materials, such as materials 2608 from FIG. 23C, which may be constrained within the fixture 2601. In an embodiment, each strip 2621 may be composed primarily of a structurally stiff material such as aluminum, steel, carbon fiber, or a composite material, and may be tightened via multiple bolts 2623 that are threaded through each side of the fixture components 2602 and 2604. In an embodiment, each strip 2621 may have a pliable surface 2622, such as rubber attachment, mounted to the interior side of the strip 2621, where an interior surface of the pliable surface 2622 defines the constrained space 2606. The pliable surface 2622 may assist in distributing the force 2610 applied to each strip 2621 evenly to the energy relay materials constrained in the constrained space 2606. In this embodiment, clamping bolts 2612 are used to keep the components 2602 and 2604 of the fixture 2601 attached together as force 2610 is applied to the strips 2621 via tightening of the bolts 2623.

Figure 23E:
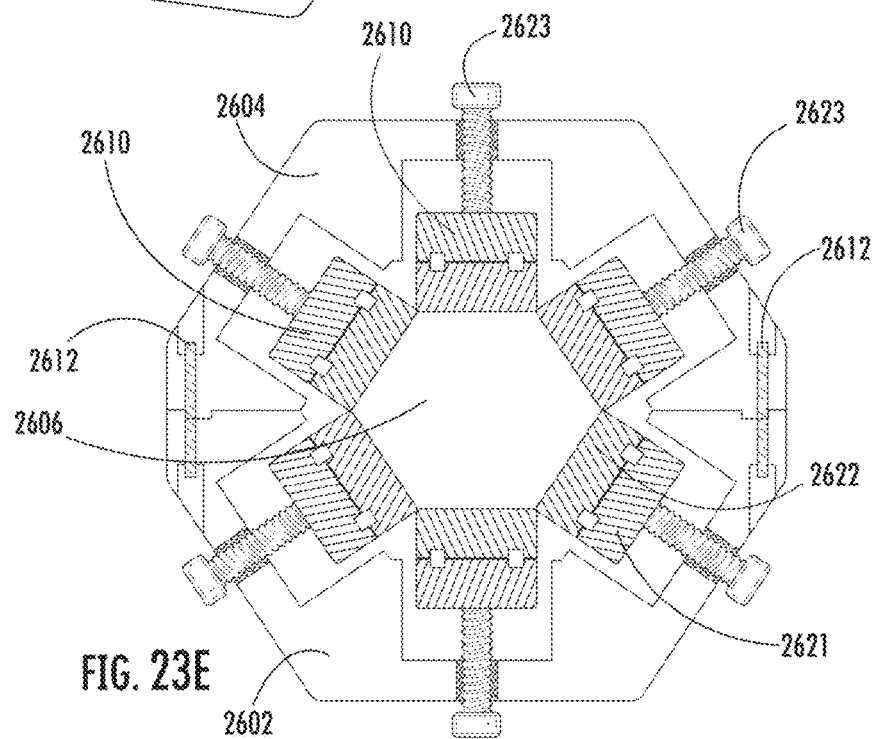
FIG. 23E illustrates a cross-sectional view of the adjustable fixture in FIG. 23D.

FIG. 23E illustrates a cross-sectional view of the fixture 2601 along a transverse plane of the fixture 2601. Bolts 2623 may extend through the fixture from an interior to an exterior side, and may be threaded to secure bolts 2623 in place and allow adjustment of their radial positions. As bolts 2623 are adjusted, the force 2610 applied to the movable strips 2621 is increased or decreased, thereby allowing adjustment of the compressive force 2610 applied to the constrained space 2606, and any energy relay materials which may be constrained therein, such as materials 2608 from FIG. 23C. Fixture 2601 allows for a variation in compressive force both longitudinally from one end of the fixture to another, but also transversely, as individual bolts 2623 may be adjusted independently of one another. Furthermore, bolts 2623 may be adjusted at different times, allowing adjustment of compressive force 2610 temporally as well.

Figure 60:
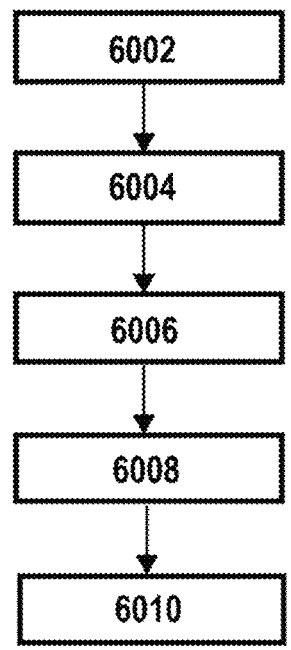
FIG. 60 illustrates an embodiment of a process wherein a number of processing steps are performed in series.
Figure 61:
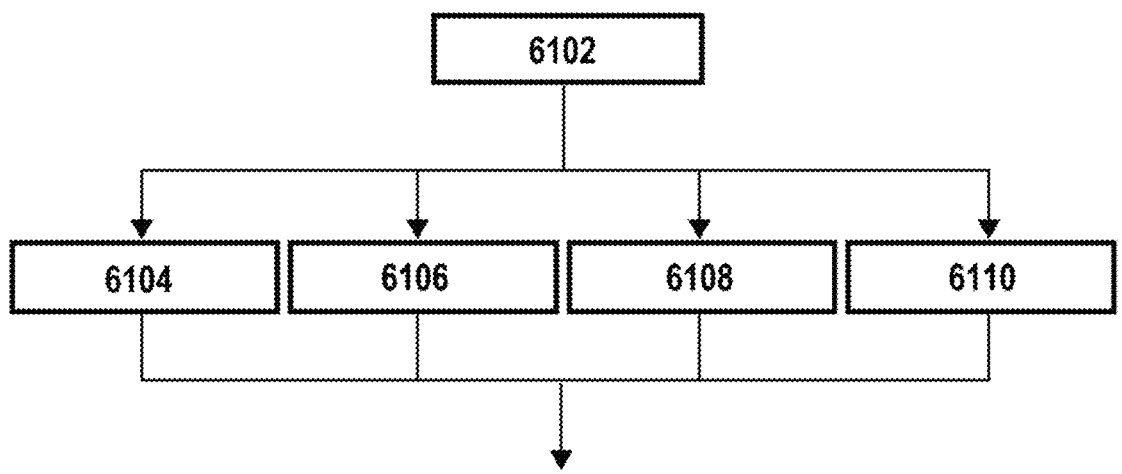
FIG. 61 illustrates an embodiment of a process wherein a number of processing steps are performed in parallel.

FIG. 60 and FIG. 61 illustrate block diagrams of embodiments of the process of processing energy relay materials, which includes fusing and/or relaxing the energy relay materials as described herein. FIG. 60 illustrates an embodiment wherein a number of processing steps are performed in series, while FIG. 61 illustrates an embodiment wherein a number of processing steps are performed in parallel (simultaneously).

In the embodiment shown in FIG. 60, an arrangement of energy relay materials is provided at step 6002. Compression is then applied to the arrangement of energy relay materials in step 6004. Heat is applied to the arrangement of energy relay materials in step 6006. Cooling is then applied to the energy relay materials in step 6008, and then a chemical reaction is performed to the arrangement of energy relay materials in step 6010.

In the embodiment shown in FIG. 61, an arrangement of energy relay materials is provided in step 6102. Then, a number of processing steps are performed in parallel to the arrangement of energy relay materials, the steps comprising applying compression to the energy relay materials at step 6104, applying heat to the energy relay materials at step 6016, allowing the energy relay materials to rest at step 6108, and performing a chemical reaction to the energy relay materials at step 6110.

The compression, heating, cooling, and reacting steps of FIG. 60 and FIG. 61 may be facilitated by embodiments of fixtures presented herein, such as fixture 2601 from FIG. 23D, which allow the materials being processed to be constrained while the various processing steps are performed upon them.

The above processes illustrated in FIG. 60 and FIG. 61 is merely exemplary of the possible permutations of the processing steps described in the present disclosure. One skilled in the art should recognize that there are other possible orders for performing the processing steps described herein. Additionally, a combination of series and parallel ordering of processing steps may be utilized. Furthermore, other processing steps besides those described herein may also be employed in order to process the energy relay materials into a desired form.

In the processing steps exemplified in FIG. 60 and FIG. 61, and described elsewhere in this disclosure, the performance of chemical reaction to energy relay materials may allow the energy relay materials to fuse chemically and may involve use of a catalyst. In one embodiment, the heat applied to the energy relay materials may cause them to reach an appropriate temperature or range of temperatures for a desired amount of time to sufficiently relax and fuse the materials as determined based on the relay materials' material properties, including the change in structural stress due the addition or removal of heat. In an embodiment, the compressive forces applied to the relay material may be adjusted at different temperatures to remove air gaps and ensure the component engineered structure materials fuse together. Then in step 2708, the relaxed, fused energy relay materials are removed from the fixture.

Figure 21:
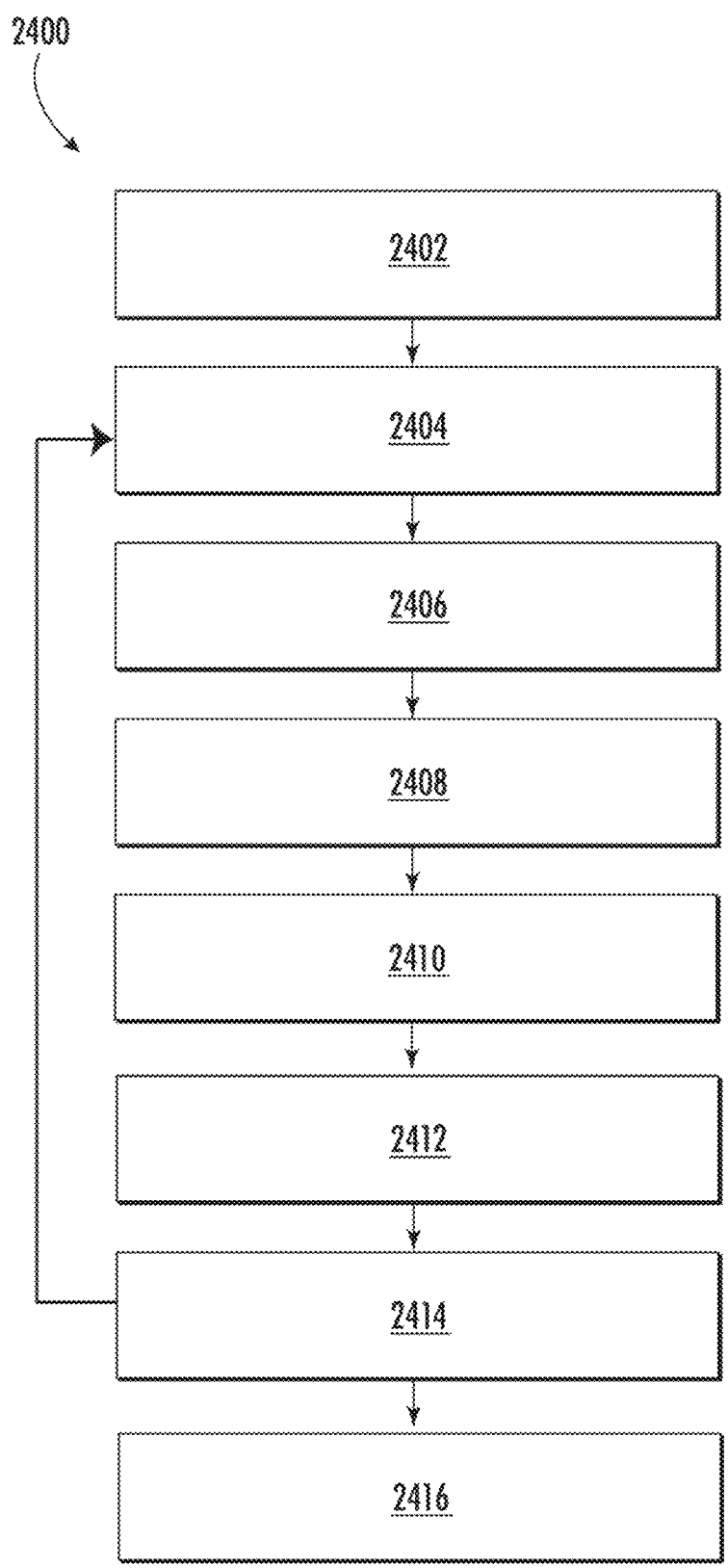
FIG. 21 illustrates a block diagram of a process for heating and pulling relay materials into microstructure materials.
Figure 22:
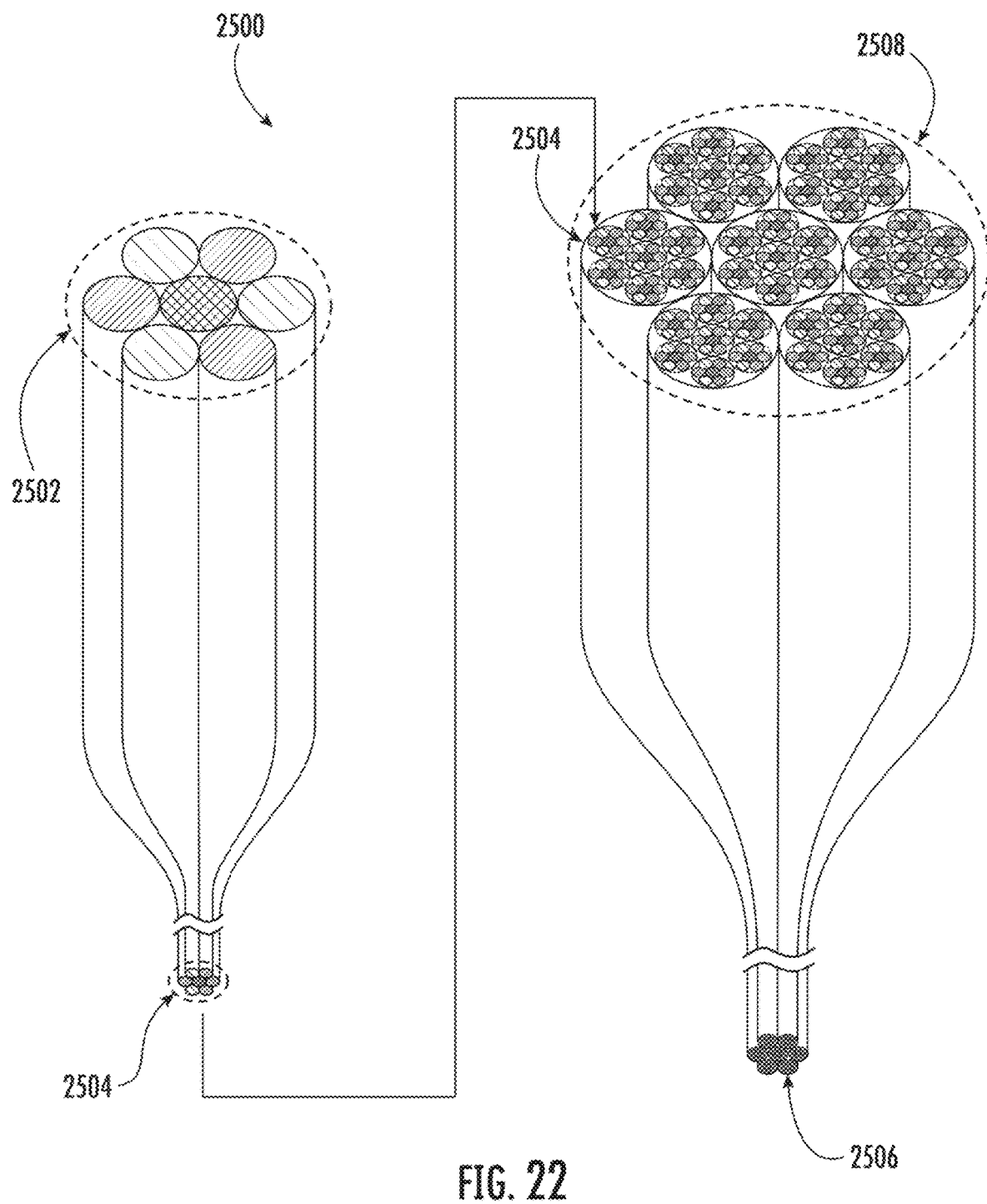
FIG. 22 illustrates an embodiment for forming energy relays with a reduced transverse dimension.

FIG. 24 illustrates a perspective view of a fused block of ordered energy relay materials 2606 after having been relaxed, fused, and released from fixtures 2602 and 2604 of FIG. 23B. The materials 2608 is now a continuous block of energy relay material no longer having discernable individual particles, but rather a continuous arrangement of aggregated particles (AP) of CES material. However, the non-random material distribution that existed before fusing in this example is still preserved and will induce Ordered Energy Localization along the transverse direction of the material. In another embodiment, it is possible to create a fused block of random energy relay materials in the same way. Block 2608 may now undergo additional heating and pulling in order to reduce the transverse dimensions of block 2606, as shown in FIGS. 19B, 20, and 22, with reduced risk of material deformation. As detailed below, FIG. 21 illustrates a block diagram of a combined overall process for manufacturing micro-scale ordered energy relay materials according to the processes and principles described herein.

In an embodiment, some amount of material deformation may exist. Deformation may occur during any of the processes described herein, including during said heating, pulling, fixturing, or other disclosed steps or processes. One skilled in the art should appreciate that while care may be taken to avoid unwanted material deformation, the materials may still experience unintended deformations. While this may introduce some amount of uniqueness to each particular CES, it should be understood that minute deformations of CES materials that occur during processing should not be given consideration when identifying a substantially non-random pattern as disclosed herein, and do not represent a departure from said non-random pattern.

Due to the flexibility of the material chosen to be used for relaying energy according to the present disclosure, one may preferably design an energy relay material using flexible or partially flexible materials capable of bending or deforming without compromising their structure or energy wave propagation properties. With traditional glass optical fibers, the glass rods remain largely inflexible throughout the production process, making manufacturing difficult and expensive. By leveraging more robust materials with greater flexibility, cheaper and more efficient manufacturing avenues may be used.

Methods for Macro-Scale Production of Energy Relay Microstructures

Figure 19A:
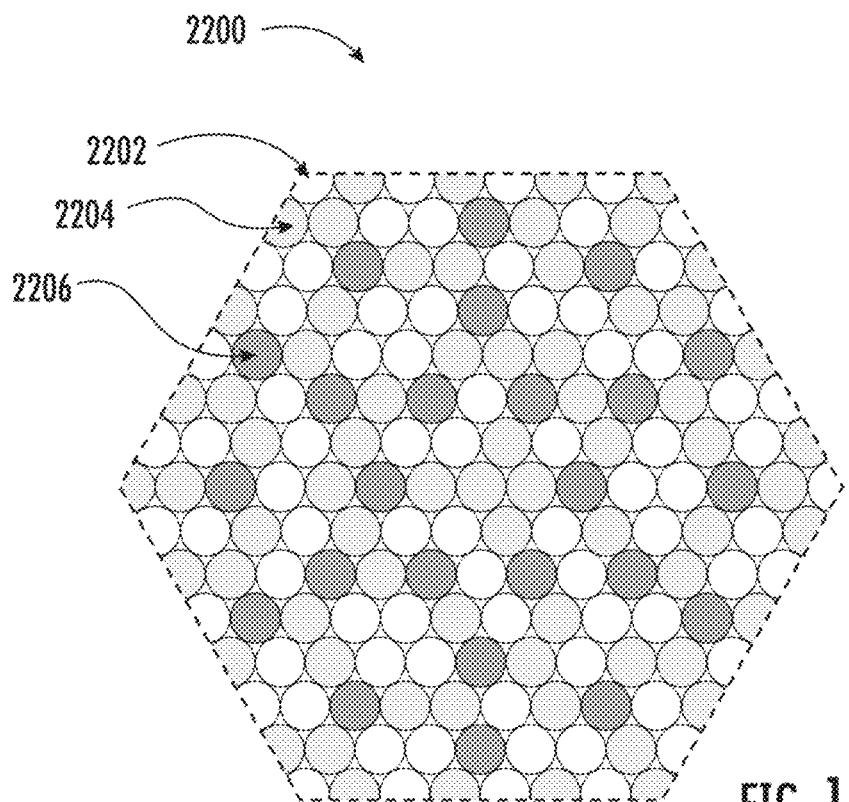
FIG. 19A illustrates a schematic cutaway view in the transverse plane of a portion of a pre-fused energy relay comprising a non-random pattern.
Figure 19B:
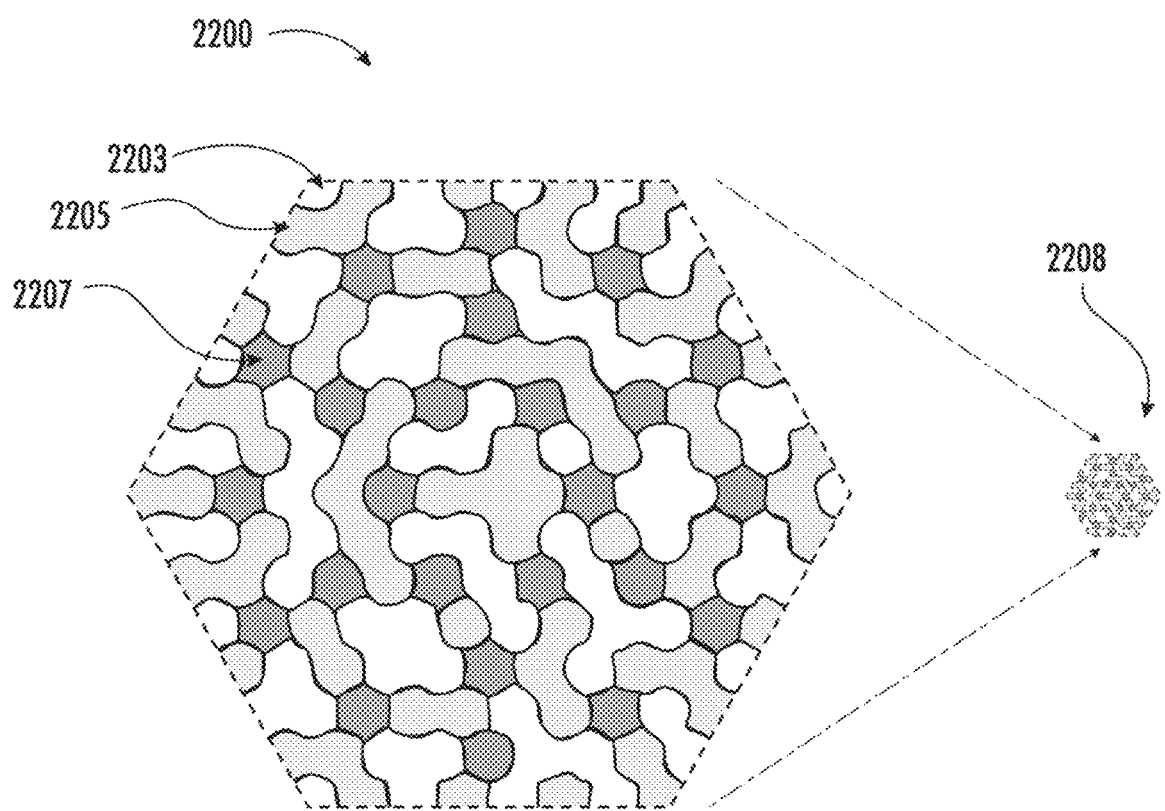
FIG. 19B illustrates a schematic cutaway view in the transverse plane of a formed non-random pattern energy relay after fusing, include original and reduced transverse dimension configurations.

FIG. 19A illustrates cutaway view in the transverse plane of a system for forming energy relay materials. In FIG. 19A, a module 2200 of an energy relay is shown comprising a pattern of particles comprising one of CES 2202, CES 2204, or CES 2206. As illustrated in FIG. 22A, module 2200 may have a certain initial size, which is a result of the size of CES particles which define module 2200, as well as the particular pattern that the particles are arranged in. By applying heat and pulling module 2200 along a longitudinal direction, as previously discussed in the present disclosure, it becomes possible to reduce the size of module 2200 down to a smaller diameter while maintaining the specific pattern of CES materials which define module 2200. The resulting reduced-sized module 2208 shown in FIG. 22B may have substantially the same pattern of materials as module 2200, but may be substantially smaller in a transverse direction, effectively changing the energy wavelength domain of energy which may be effectively transported through module 2208 in a longitudinal direction. The general distribution of CES materials has been preserved in the reduced-sized module 2208, although the fusing process will cause some local variation or deformation in the shape of CES material regions. For example, the single rod of CES 2202 has become CES material 2203, the CES 2204 and its two contiguous neighbors have become fused region 2205 with roughly the same shape, and the single rod of CES 2206 has deformed to a roughly hexagonal-shaped CES 2207.

FIG. 19B illustrates a cutaway view in the transverse plane of a system for forming a pattern of energy relay materials and represents a fused version of the module 2200 shown in FIG. 19A. The principles described in reference to FIG. 19A are also applicable to FIG. 19B. By fusing a material before pulling it to a reduced-size module 2208, there may be less variation imposed as a result of the pulling process, and the reduced-size energy relay may possess a more predictable material distribution. In one embodiment, the fusing process may include heating up the relay material to a temperature that is less than the glass transition temperature of one or more of the component engineered structures that comprise the relay. In a different embodiment, the relay material is heated to a temperature that is close to the glass transition temperature of one or more of the component engineered structures, or the average glass transition temperature of the component engineered structures that comprise the relay. In an embodiment, the fusing process may include using a chemical reaction to fuse the relay materials together, optionally with a catalyst. In an embodiment, the fusing process may include placing the arrangement of component engineered structures into a constrained space, and then applying heat. The constrained space may be provided by a fixture similar to the ones shown in FIG. 23A-23E which are configured to define a constrain space 2606. In an embodiment, the fusing process may include placing the arrangement of component engineered structures into a constrained space, applying a compressive force to the energy relay materials, and then applying heat. This is particularly useful if the component engineered structures are polymers with biaxial tension, where the compressive force prevents the materials from warping or shrinking as they are fused together or annealed. In this way, the fusing step also involves relaxing the material, and may be referred to as a fusing and relaxing step. In an embodiment, the fusing and relaxing process may include a sequence of steps with process parameters, where each step includes one of: using a chemical reaction to fuse the energy relay materials, optionally with a varying level of catalyst; constraining the arrangement and applying a compressive force with a desired force level; applying heat to a desired temperature level, which may be close to the glass transition temperature of one or more of the component engineered structures of the relay; and applying cooling to a desired temperature. The fused and relaxed material may then be released from the constrained space after fusing has completed.

FIG. 20 illustrates a continuation of the process 2300 shown in FIG. 19B. Multiple reduced-sized modules 2208 of an energy relay may be arranged into the grouping as shown in portion 2301. By applying heat and pulling module 2301 along a longitudinal direction, as previously discussed and shown in FIGS. 19A and 19B, it becomes possible to taper the size of composite module 2301 down to smaller microstructure module 2302, while maintaining the specific pattern of CES materials which define module 2301. This process can be repeated again using module 2302 to yield the even small microstructure module 2304. Any desirable number of iterations of this process can be performed in order to achieve a desired microstructure size. Since module 2301 is itself composed of shrunken modules 2208, the original distribution of CES materials which define 2208 has been preserved, but made even smaller in the transverse dimension, in such a way that 2304 also shares the same pattern as portions 2301, as illustrated by a blow-up 2306 of a sub-portion of portion 2304. Outline 2308 represents the original size of portion 2301 compared to the reduced-size portion 2304. This process can then be repeated any number of times to yield random or non-random pattern energy relays of a desired transverse size having started from larger materials. For example, multiple modules 2304 may be arranged in a similar grouping of 2301, and the process repeated. This system makes it possible to form micro-level distribution patterns without having to manipulate individual CES materials on the micro scale, meaning that manufacturing of energy relays can remain in the macro-scale. This may simplify the overall manufacturing process, reducing manufacturing complexity and expense. This size-reduction process can also provide more precise control over the actual transverse dimension and patterning of the CES materials, which enables one to custom tailor a relay to a specific desired energy wavelength domain.

FIG. 21 illustrates a block-diagram of the heating and pulling process of forming energy relay materials. In step 2402, CES materials are first arranged in a desired configuration, which may be random or non-random pattern in the transverse plane. In an embodiment of step 2402, the materials may further be arranged into a constrained space. In step 2406, the energy relay materials are fused together in the constrained space, where fusing may be a sequence of steps, where each step may include any of: applying compressive stress to the arrangement of energy relay materials, applying heat, applying cooling, or using a chemical reaction, possibly with a catalyst. In step 2408, the CES materials are removed from the constrained space. In the next step 2410, the energy relay materials are then heated to the appropriate temperature, which in some embodiments may be the glass transition temperature of one or more of the CES materials. In step 2412, the materials are then pulled into reduced-size microstructure rods, as shown above in FIGS. 19B and 20. The reduced size microstructure rods produced in step 2412 are then arranged into a desired random or non-random pattern again, similar to the bundle 2301 in FIG. 20, in step 2414. The arrangement of microstructure rods may again return to step 2404 to be constrained, fused/relaxed, heated, pulled, and arranged in order to form a second order reduced size microstructure rod, similar to the microstructure 2304 shown in FIG. 20. In other words, if the second-order microstructure rods produced in step 2414 need to undergo further heating and pulling to adjust their energy transport domain, step 2404 may be returned to using the second-order microstructure rods, and the ensuing steps may be repeated a desired number of times to produce energy relay materials of the desired size and configuration to relay energy in the desired energy domain, containing $n^{th}$ order microstructure rods. At the final step of the process 2416, the final arrangement of microstructure rods is fused/relaxed to form an energy relay.

FIG. 22 illustrates an embodiment for forming random or non-random pattern energy relays with a reduced transverse dimension, and represents a visualization of some of the steps of the process described in FIG. 21. First, a distribution of material is provided, such as module 2502, which is constrained, fused/relaxed, and released. It is then heated and pulled to form reduced dimension module 2504. The discontinuity seen between the original module 2502 and the reduced dimension module 2504 is an artistic representation of the above-described process whereby the transverse dimension of the original module 2502 is reduced to that of module 2504, though they are in fact the same material. Once a sufficient number of reduced dimension modules 2504 have been produced, they may be re-assembled in a new random or non-random distribution shown at 2508. This new pattern 2508 comprises a plurality of reduced-size modules 2504, which may then undergo a similar process of being constrained, fused/relaxed, released, heated and pulled to produce the reduced dimension module shown at 2506. The discontinuity seen between the non-random pattern 2508 and the reduced dimension module 2506 is an artistic representation of the above-described process whereby the transverse dimension of the original distribution 2508 is reduced to that of module 2506, though they are in fact the same material. This process may be iterated as many times as desired in order to produce an energy relay of a preferable size, containing a preferable density of energy relay material channels for relaying energy.

An energy relay material, as discussed in detail in the present disclosure, may be configured to transport energy along a longitudinal plane of the energy relay material with a substantially higher energy transport efficiency in the longitudinal plane than in a transverse plane, perpendicular to the longitudinal plane. These energy relay materials may have various initial size, shape or form. To adapt such energy relay materials into an optical system, such as the energy directing systems of the present disclosures, the size, shape or form of the energy relay materials may be modified. Embodiments of the present disclosure for modifying a dimension of an energy relay material may include the steps of providing the energy relay material with an initial dimension in the transverse plane; accommodating the energy relay material in a constrained space; conforming the energy relay material to at least a portion of the constrained space; and removing the conformed energy relay material from the constrained space. The constrained space may include a shape that allows at least a portion of the conformed energy relay material to have a reduced transverse dimension along the longitudinal plane of the energy relay material. The embodiments below provide various exemplary methods and devices to modify a dimension of an energy relay material, thereby modifying the size, shape or form of the energy relay materials.

Ice-Cube Tray Method of Manufacturing Energy Relay Arrays

Figure 41:
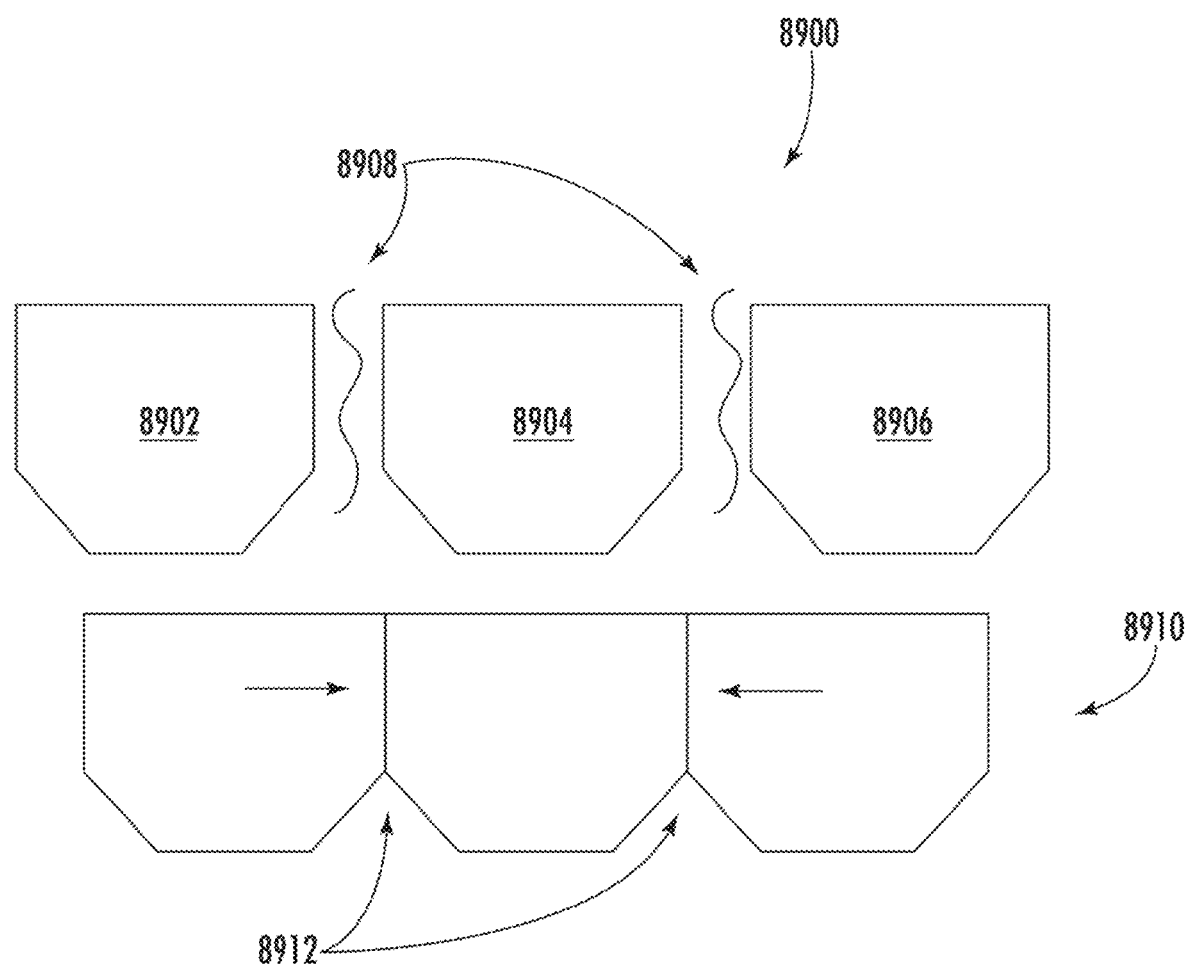
FIG. 41 illustrates a method of fabricating an array of energy relay elements.

FIG. 41 illustrates a method 8900 of fabricating an array of individual tapered energy relay elements. In FIG. 41, individual tapered relay elements 8902, 8904, and 8906 are individually tapered, precisely cut, ground and polished (these steps are not shown), and then are arranged in the configuration shown. The tapering step for each individual tapered relay alone may include heating a block of relay material, stretching it, and cooling it, while precisely controlling the dimensions of the material to achieve a precise magnification. An adhesive 8908 is applied between each relay element, and they are then bonded together as shown at 8912. However, method 8900 may result in gaps or distortions at 8912 about the boundaries of elements 8902, 8904, and 8906. There are also many additional manufacturing risks introduced through method 8900, such as misalignment between individual relay elements during the bonding process, failure of the bond due to material deformation under heat or stress, etc.

Figure 42:
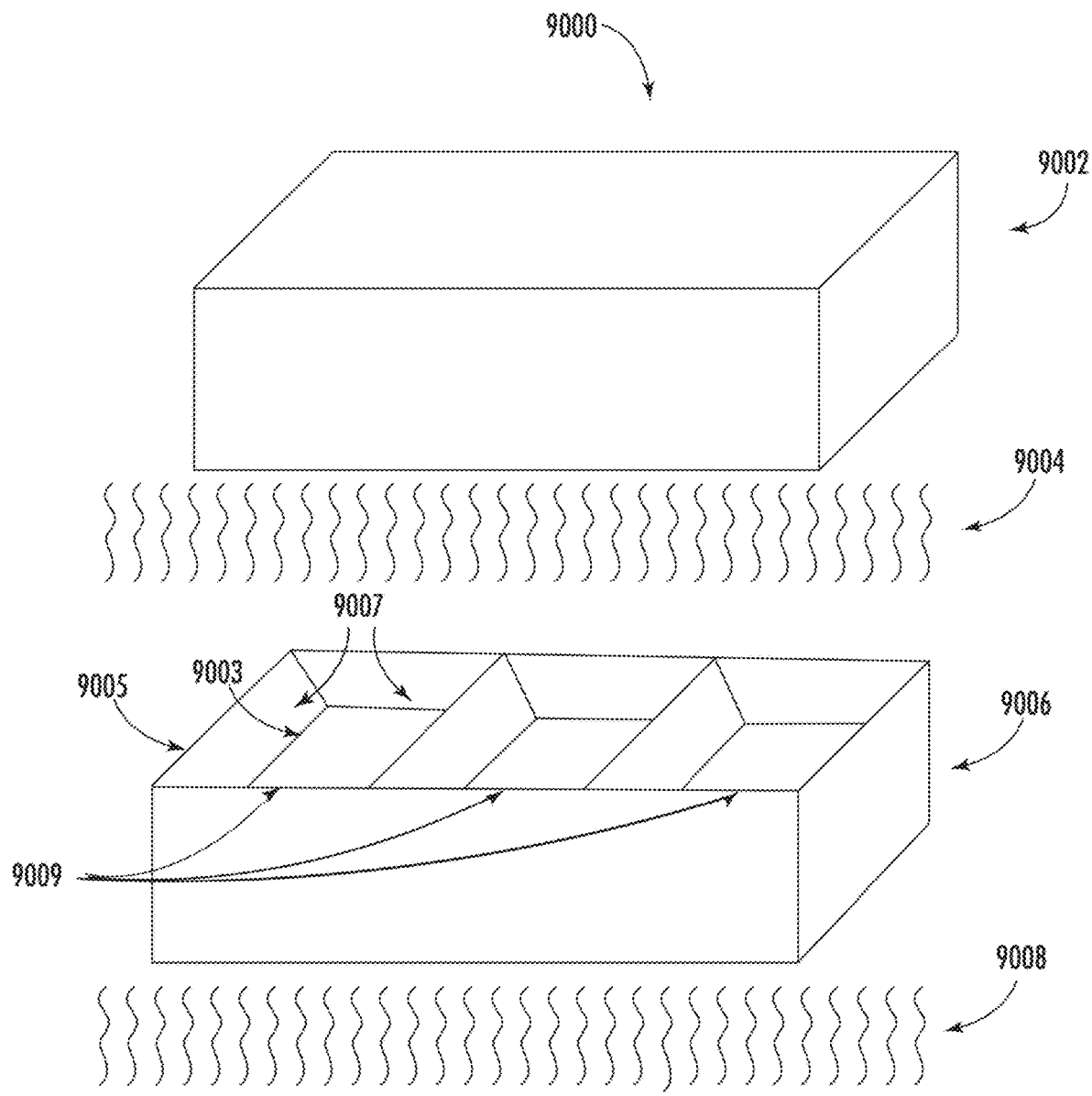
FIGS. 42-44 illustrate a method of fabricating an array of energy relay elements from a single initial block of material.

FIG. 42 illustrates a, a schematic demonstration of a processing step 9000 for fabricating an array of tapered energy relay elements from a single initial block of material 9002. Block 9002 may include an energy relay material, such as an Anderson Localization energy relay material, or an Ordered Energy Localization relay material, or any other type of relay material comprising polymer, glass, or other structures suited for energy relay. The energy relay material may be provided through the processes disclosed herein. Through using processing step 9000, block 9002 may be formed directly into \ magnified or minified (or other constructs disclosed herein) shapes, complete within the mosaic/relay form and without the necessity to fabricate each relay individually.

In FIG. 42, the block 9002 may have been cut into the approximate shape of the final mosaic and heated to a desired temperature with the application of heat 9004, which may be based upon the material properties, and in an embodiment, may get close to the glass transition point of the material. The mold 9006 defines the shape of a constrained space, which may include an inverse shape of one end of a formed energy relay array shape. In an embodiment, an inverse shape may be an inverse minified or magnified end, a tapered-end side of an array of formed tapered energy relays, or any other desired mold shape. In the embodiment of FIG. 42, the mold 9006 comprises an inverse tapered shape that has at least one inverse relay element compartment, the at least one compartment comprising a narrow end 9003 having a first cross-sectional area, a wide end 9005 having a second cross sectional area greater than the first cross-section area, and sloped walls 9007 connecting the narrow end 9003 to the wide end 9005. In an embodiment, the compartment may comprise two pairs of opposing sloped walls connecting edges of the narrow and wide ends. In an embodiment, the narrow and wide ends may be rectangular in shape. The mold 9006 shown in FIG. 42 comprises a plurality of compartments 9009 that contain the desired mold shape. In another embodiment, a mold may comprise only one compartment 9009.

To conform the block 9002 to the constrained space defined by the compartments 9009, the block 9002 and mold 9006 may be heated to a temperature such that the energy relay material in the block 9002 has a formability in both the longitudinal and transverse planes to allow reforming of at least the transverse plane of the energy relay material. The application of heat may be performed in one or more stages, where each stage comprises a stage temperature and a stage duration of time. Applying heat in stages may allow portions of the materials to be formed in stages. In an embodiment, the mold 9006 comprises materials with a melting point that substantially exceeds that of the materials comprising block 9002. In an embodiment, the mold 9006 may comprise metal materials. In an embodiment, mold 9006 may comprise a material that has a high heat capacity or will retain heat well. In method 9000, mold 9006 is brought to the desired temperature with the application of heat at 9008 to match the transition or melting point of block 9002.

In an embodiment, additional heating elements (not shown) may be incorporated into the materials comprising mold 9006, configured to perform the steps of applying heat to the mold 9006 and the energy relay material 9002. In an embodiment, properties about the edge portions of mold 9006 may differ from the main body of mold 9006, such that mold 9006 provides the ability to localize higher or lower levels of heat/pressure treatment in edge regions to block 9002, while leaving other regions substantially undisturbed.

Figure 43:
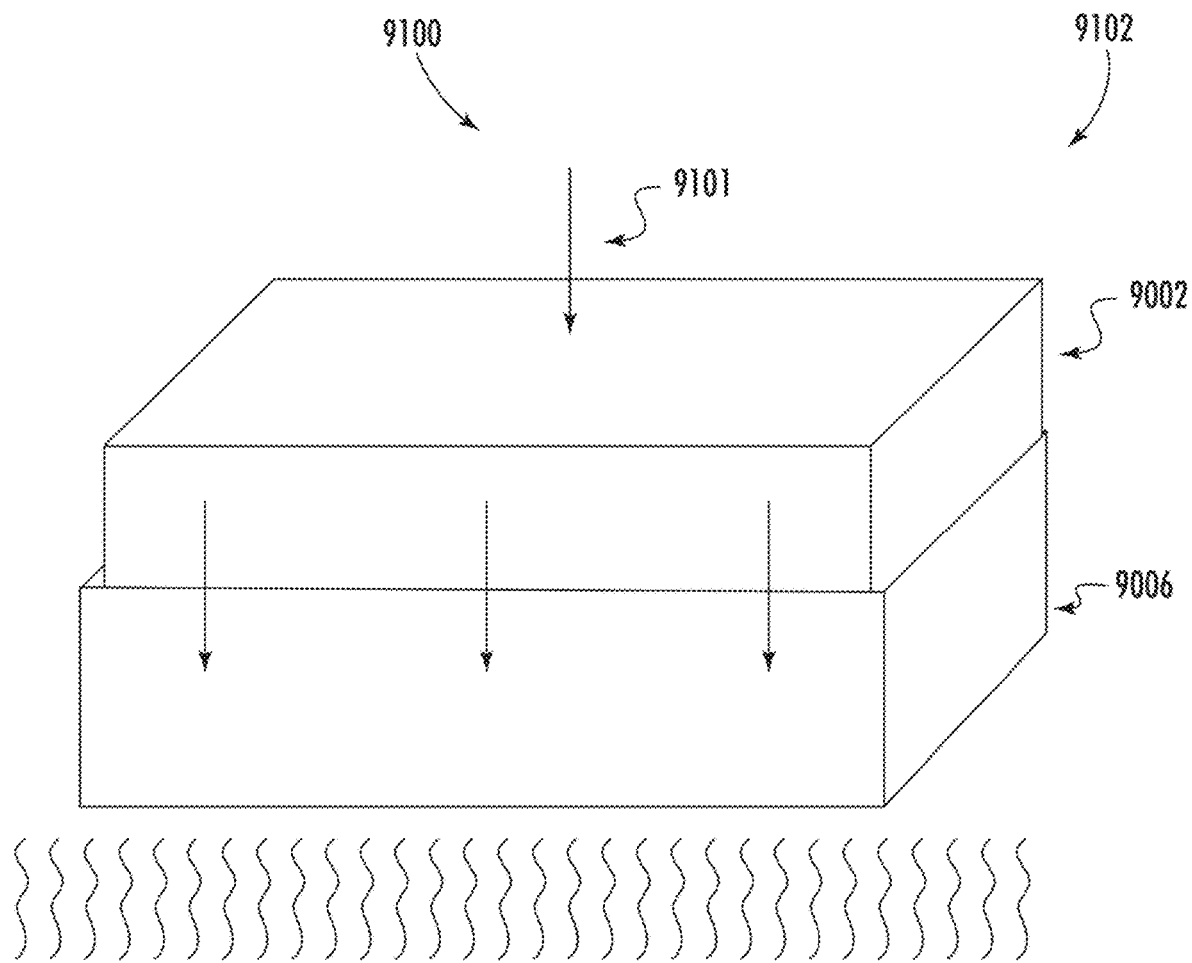

FIG. 43 illustrates a schematic demonstration of a processing step 9100, in which, the block 9002, which has been heated to the previously described desired temperature in FIG. 42, is brought into interface with mold 9006. In an embodiment, the processing step may include applying a force to at least one of the energy relay material 9002 and the mold 9006 to substantially conform at least a portion of the energy relay material 9002 to the shape of the formed tapered energy relay array. In an embodiment, force may be applied to only the mold 9006, and in another embodiment, force may be applied to only the energy relay material 9002, and in yet another embodiment, force may be applied to both the mold 9006 and the energy relay material 9002. In an embodiment as illustrated in FIG. 43, force may be applied in the general direction indicated by arrow 9101, which may be produced by the weight of the block 9002 under gravity, or may be applied from an external source (not shown). Step 9100 may be performed for a desired amount of time and may further be performed as a series of stages comprising a stage forces and stage durations of time. During the time period of processing step 9100, the temperature of block 9002 and mold 9006 may be maintained at a desired temperature, or may be varied with time as desired depending on the material types chosen. In an embodiment, step 9100 may be carried out under reduced atmospheric pressure, or in a vacuum. The rate that block 9002 is brought into interface with mold 9006 may also be carried out slowly, so that the relay elements begin to form without introducing unwanted distortions. Furthermore, controlling the rate of interface may help limit the occurrence of distortions due to uneven distribution of material, or from a non-uniform block 9002 dimensions due to process variations in method 9000. Any distortions of material may be partially or substantially mitigated through careful control of time, temperature, pressure, force, or any other manufacturing parameters known to one skilled in the art.

Figure 44:
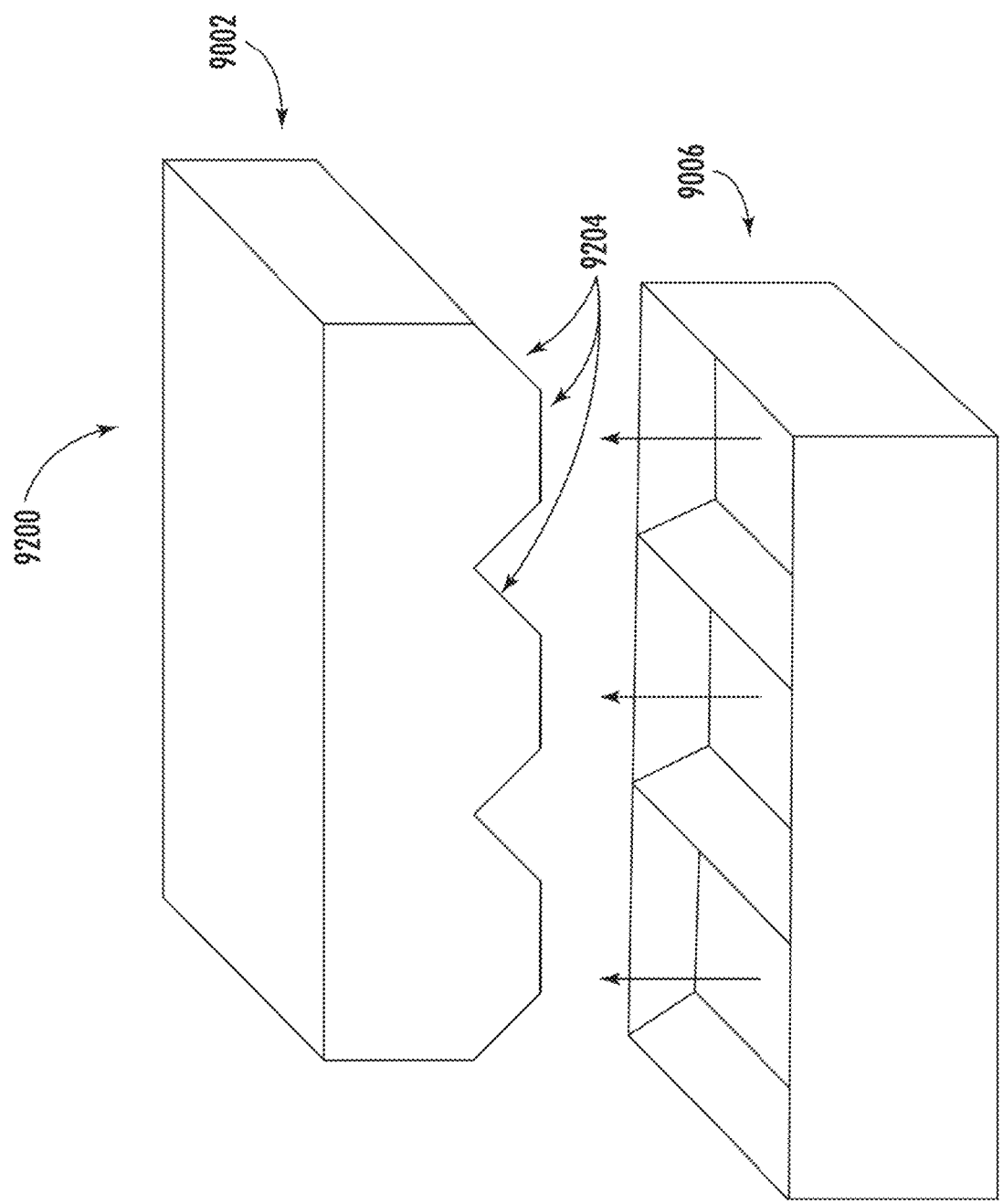

FIG. 44 illustrates a further step 9200 in a method of manufacturing an array of energy relay elements. In FIG. 44, once block 9002 has cooled after appropriate processing in previous steps has completed, block 9002 may be removed from interface with mold 9006. In an embodiment, due to the properties of the mold 9006 materials compared to the properties of block 9002 materials, block 9002 may cleanly lift out of mold 9006, with the surfaces 9204 along said interface being equivalent to polished surfaces. The finish or polish of mold 9006 may be controlled as desired to produce the level of polish realized along surfaces 9204. Additional polishing or finishing of any surface of block 9001 may be performed if desired. In an embodiment, a mold release lubricant may be leveraged to improve step 9200, which in an embodiment may be applied to edges or surfaces of the mold 9006 to promote separating of the mold 9006 and energy relay materials 9002.

Upon examination of molded block 9002 shown in FIG. 44, it should be noted that this system and method may represent an improvement over other methods of manufacturing an energy relay array, at least partially due to the fact that there are no residual seams between tapered portions, and the entire array may be manufactured simultaneously, rather than individually. A portion of the mold opposite the interface between mold 9006 and material 9002 may be unaffected by the conforming process 9000.

Furthermore, resulting arrays of energy relay tapers produced using the methods described above may be further combined adjacent to one another and additionally welded or otherwise joined to form larger arrays of tapered relays.

Molding Method of Manufacturing Energy Relays

Figure 45:
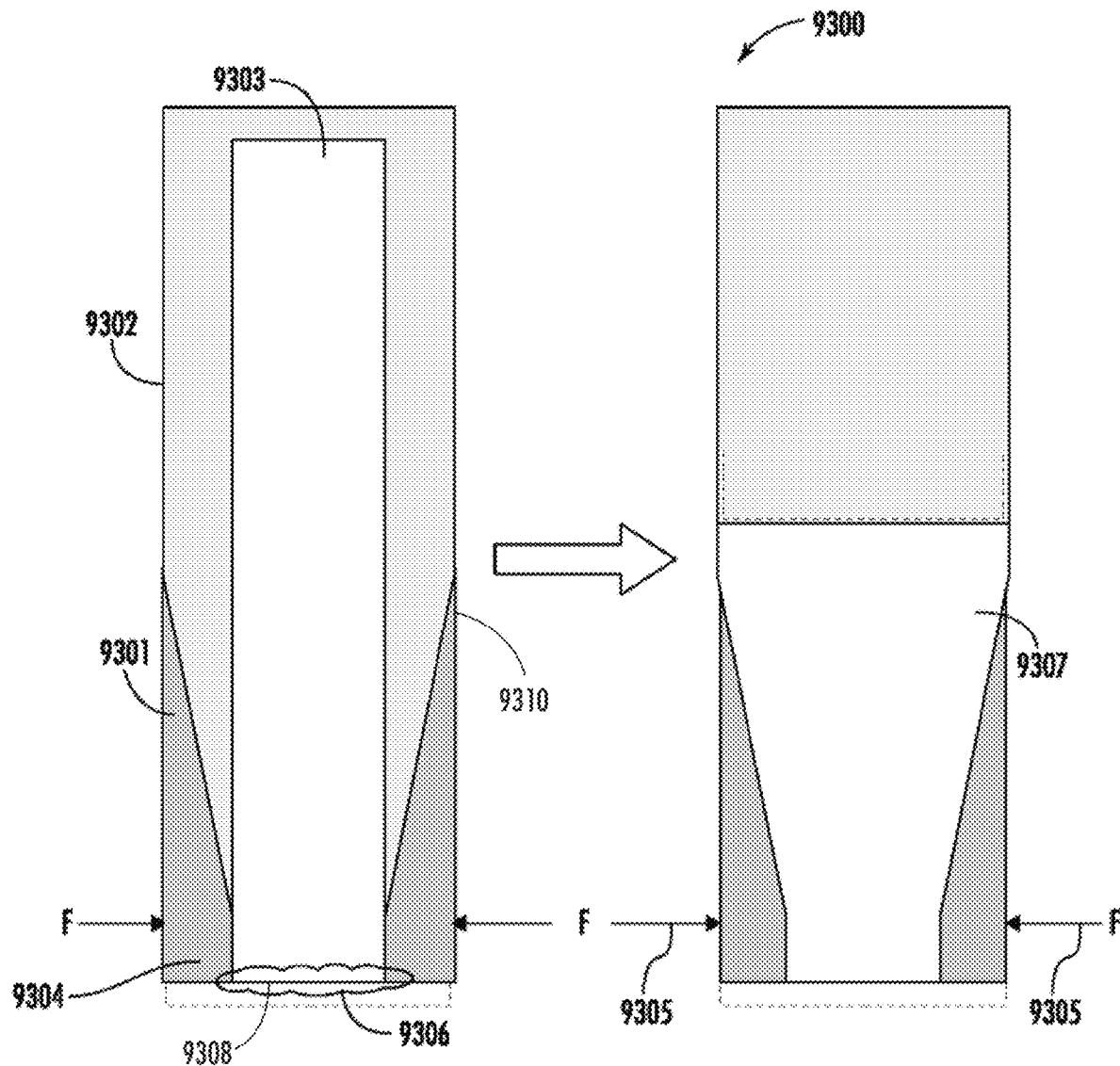
FIGS. 45-46 illustrate a method for forming a tapered relay from a relay material
Figure 46:
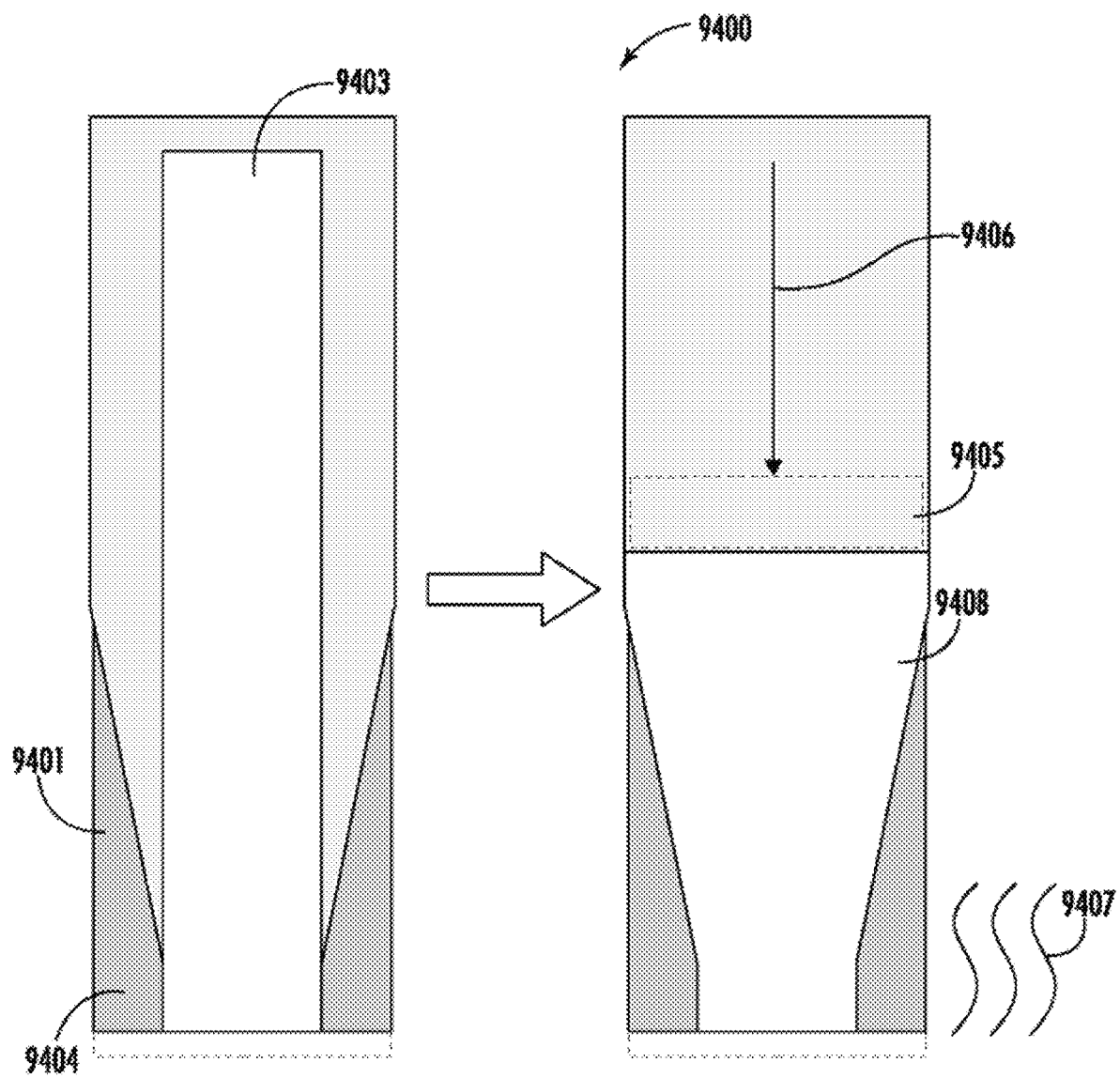

In an embodiment, rather than applying pressure between a block of relay material and a mold, an alternative method for forming a tapered relay involves fixing or mechanically constraining a first side of a relay material and applying heat or pressure whereby the relay material "relaxes" into the mold, producing the desired relay geometry, which in an embodiment may comprise a sloped profile portion transitioning from the first side to a second side. The energy relay materials used in method 9300 may be provided by any of the methods or processes disclosed herein. FIG. 45 shows a method 9300 for forming a tapered relay 9307 from a relay material 9303 that will shrink with the application of heat, and is placed within a mold 9301 that has an inverse shape of the desired tapered energy relay shape, which in this example is the shape of tapered energy relay 9307. In an embodiment, the mold 9301 may define a constrained space having a shape that allows at least a portion of a conformed energy relay material to have a reduced transverse dimension. In an embodiment, mold 9301 may comprise a molding portion extending from a small end of the mold 9304 to a large end 9310 which provided the shape having a reduced transverse dimension. The mold 9301 may comprise polished interior surfaces so the taper 9307 will have the same surface quality as the mold once forming is completed. The cross sectional area of the energy relay 9303 at the beginning of the process has about the same dimensions as the area of the small end of the mold 9304, so the energy relay material 9303 fits into the small end of the mold 9304. In an embodiment, an end portion 9308 of the energy relay material 9303 may be accommodated in a reduced transverse dimension end 9304 of a molding portion of mold 9301. The end portion of the relay material 9308 may be fixed to the reduced transverse dimension end 9304 of the mold 9301 with clamping force 9305, mechanical pressure, or bonding agent/adhesive 9306. In an embodiment, a clamping force 9305 may be applied to the reduced transverse dimension end 9304 of the mold 9301 to create an interference fit between the reduced transverse dimension end 9304 and the end portion 9308 of the energy relay material 9303. In an embodiment, force 9305 may be adjusted at different times, or at points where the energy relay material 9303 is heated to different temperatures. The mold can be made with side walls 9302 that are tall compared to the mold 9006 shown in FIG. 45, so that the tall sides can constrain and guide the material into its final tapered shape 9307 as it shrinks. The absolute orientation of the mold 9301 should be given consideration, since in an embodiment, gravitational acceleration may influence the direction that the relay material 9303 tends to relax once heat is applied. Therefore, in an embodiment, the mold 9301 should be oriented in a longitudinal direction to the energy relay material 9303 along the vector of gravitational acceleration, with the small end 9304 leading, thus ensuring the relaxed material will be directed into the inverse taper shape 9307 once the energy relay material 9303 relaxes. In an alternate embodiment, the mold 9301 may be placed under centrifugal force, such as that generated by a centrifuge, in order to direct the relaxed relay material 9303 into the inverse relay shape 9307. In such an embodiment, the mold 9301 should be accordingly oriented along the vector of acceleration generated by the centrifuge, with the small end 9304 leading. In an embodiment, the relaxation of biaxial tension in the constrained material may generate enough contractual force to conform the material to the mold regardless of other external forces. Once one end of the relay material 9303 is secured heat may be applied to raise the temperature of the energy relay material 9303 such that the energy relay material 9303 has a formability in at least the longitudinal or the transverse plane of the material to allow conforming of at least a transverse dimension of the energy relay material 9303. The application of heat may cause the material to shrink into the mold 9301, thereby conforming at least a portion of the energy relay material 9303 to the shape of the mold 9301. In one embodiment, a polymer relay material 9303 with biaxial alignment is constrained at the small side 9304 of mold 9301, and as it heats up the biaxial tension in the material is released, causing the material to "relax" or "slump" towards the constrained side. In another embodiment, a biaxially tensioned polymer relay material 9303 is constrained at the narrow end 9304 of a mold 9301 that is tapered gradually with a narrow end 9304 and a large end 9310, and the portion of material 9303 near the large end 9310 of the mold 9301 shrinks toward the narrow end 9304 as the polymer 9303 is heated, and eventually becomes a tapered relay 9307 with dimensions that match the interior dimensions of the mold 9301. In another embodiment, the processing steps of applying heat may also include applying pressure with a plunger 9405 as shown in FIG. 46. This taper 9307 relays energy in substantially the same way as the relay material before the tapering process 9300, but with additional spatial magnification as energy is relayed from the narrow end to the large end of the taper 9307.

In another embodiment, heat and pressure are both used to form a tapered relay from a block of relay material. FIG. 46 shows a method 9400 for forming a tapered relay from a relay material 9403 using a mold 9401, and the application of both heat 9407 and pressure 9406. The heat 9407 and pressure 9406 may be applied simultaneously or at different times, and may further comprise multiple stages having different respective stage temperatures or stage pressures and respective stage durations of time. The cross sectional area of the energy relay 9403 at the beginning of the process has about the same dimensions as the area of the small end 9404 of the mold 9401, so the energy relay 9403 fits into the small end 9404 of the mold 9401. The mold contains polished surfaces, and the inverse dimensions of the desired tapered relay shape. A plunger 9405 with a polished surface may be used to push down the material into the mold with force 9406 and evenly distribute it as heat 9407 is applied to the mold 9401 and either directly or indirectly to the relay material 9403. In an embodiment, the force 9406 may be adjusted at different times or at points when the energy relay material 9403 is heated to different temperatures. In an embodiment, the force 9406 is applied to a surface of the energy relay material 9403 that is opposite the end portion corresponding to end portion 9308 of material 9303. The heating and conforming steps may be performed simultaneously, or may be performed in a series of steps. A series of processing steps may be applied while the material 9403 is accommodated in mold 9401, where each processing step consists of one of: adding heat, removing heat, increasing pressure, decreasing pressure, or using a chemical reaction or catalyst, examples of the application of such are illustrated in FIG. 60 and FIG. 61. In an embodiment, after the energy relay material 9303 has been conformed to the tapered relay shape 9307, cooling may be applied to the energy relay material 9303 and the mold 9301 to cool the conformed material 9303 and aid in separation of the conformed taper 9307 from mold 9301. At the end of the processing steps, the energy relay 9403 has been conformed to the final shape of the taper 9408. The taper 9408 relays energy in the same way as relay material 9403, but with spatial magnification as energy is transported from the small end to the large end.

In an embodiment, the tapered energy relay material 9307 may comprise a shape having opposing first and second surfaces in the transverse plane of the materials, the first and second surfaces having different surface areas, where energy transport is accommodated along a plurality of energy propagation paths extending through the first and second surfaces. In an embodiment, energy relayed through the tapered relay 9307 may be spatially minified or magnified as it is relayed therethrough.

Figure 47:
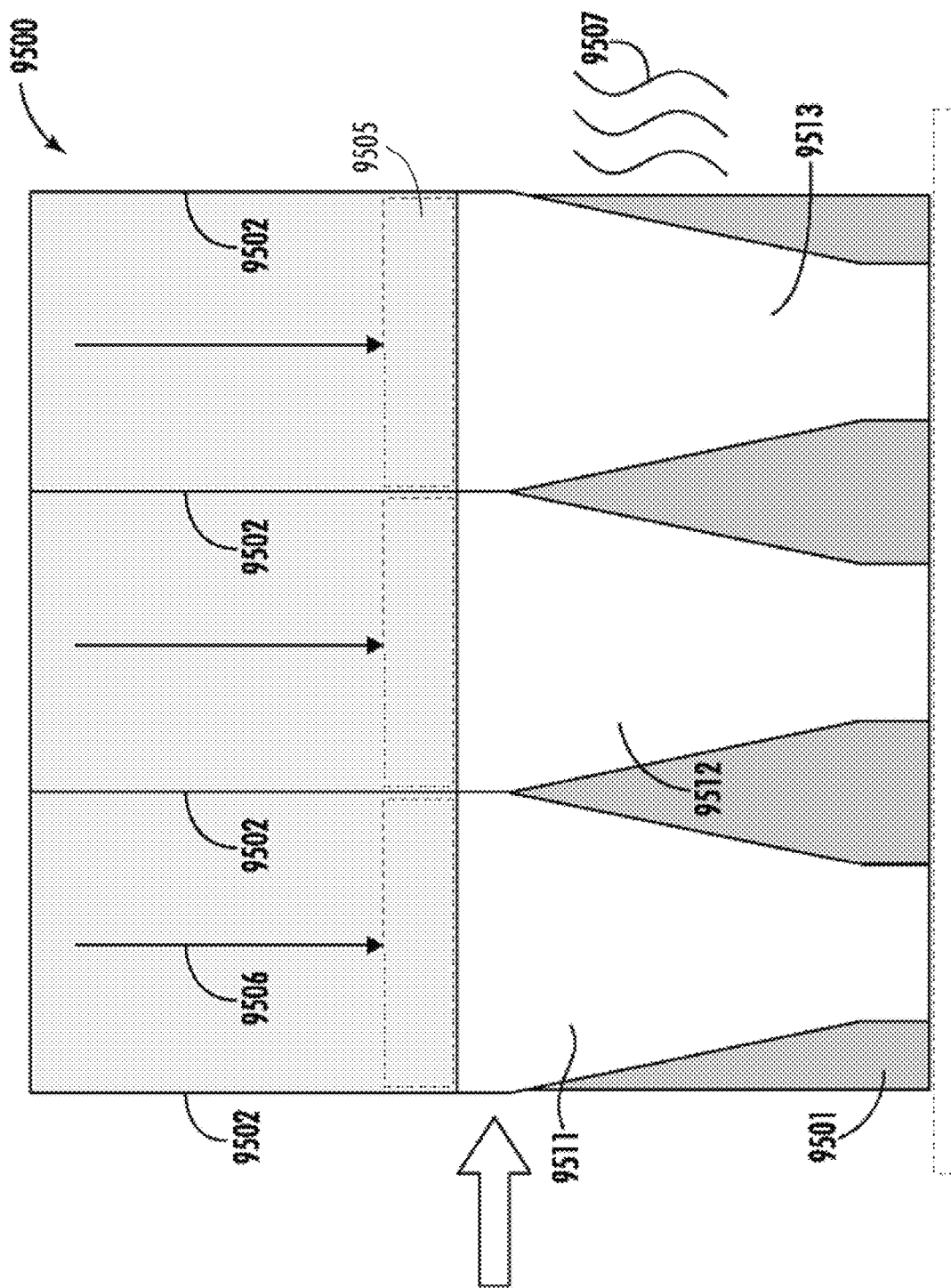
FIGS. 47-49 show a method of forming an array of tapered energy relays, wherein a plurality of molds similar to those shown in FIG. 45 are provided.

An array of fixtures similar to 9301 shown in FIGS. 45 and 9401 shown in FIG. 46 may be used to create an array of tapered energy relays. FIG. 47 shows a method 9500 of forming an array of tapered energy relays, wherein a plurality of molds similar to 9401 shown in FIG. 45 are provided, having a plurality of molding portions extending from a small end to a wide end of the plurality of molds, and, after a series of processing steps including adding heat 9507 and pressure with force 9506, a plurality of tapers 9511, 9512, and 9513 are formed. In method 9500, the mold 9501 contains multiple of the inverse shape of a tapered energy relay, and each individual tapered energy relay shape of the array of molds 9501 is separated by removable baffle walls 9502 at an upper (wide) portion of each molding portion. The array of molds 9501 has polished interior surfaces. In an embodiment, individual plungers 9505 are used to apply force 9506 to the energy relay materials to form them into tapered shapes. In another embodiment, molds 9301 shown in FIG. 45 could be used as well, with a relay material which shrinks when heated, such as a biaxially tensioned relay material, without the need for plungers. And in still another embodiment, plungers are used along with a relay material that shrinks when heated.

Figure 48:
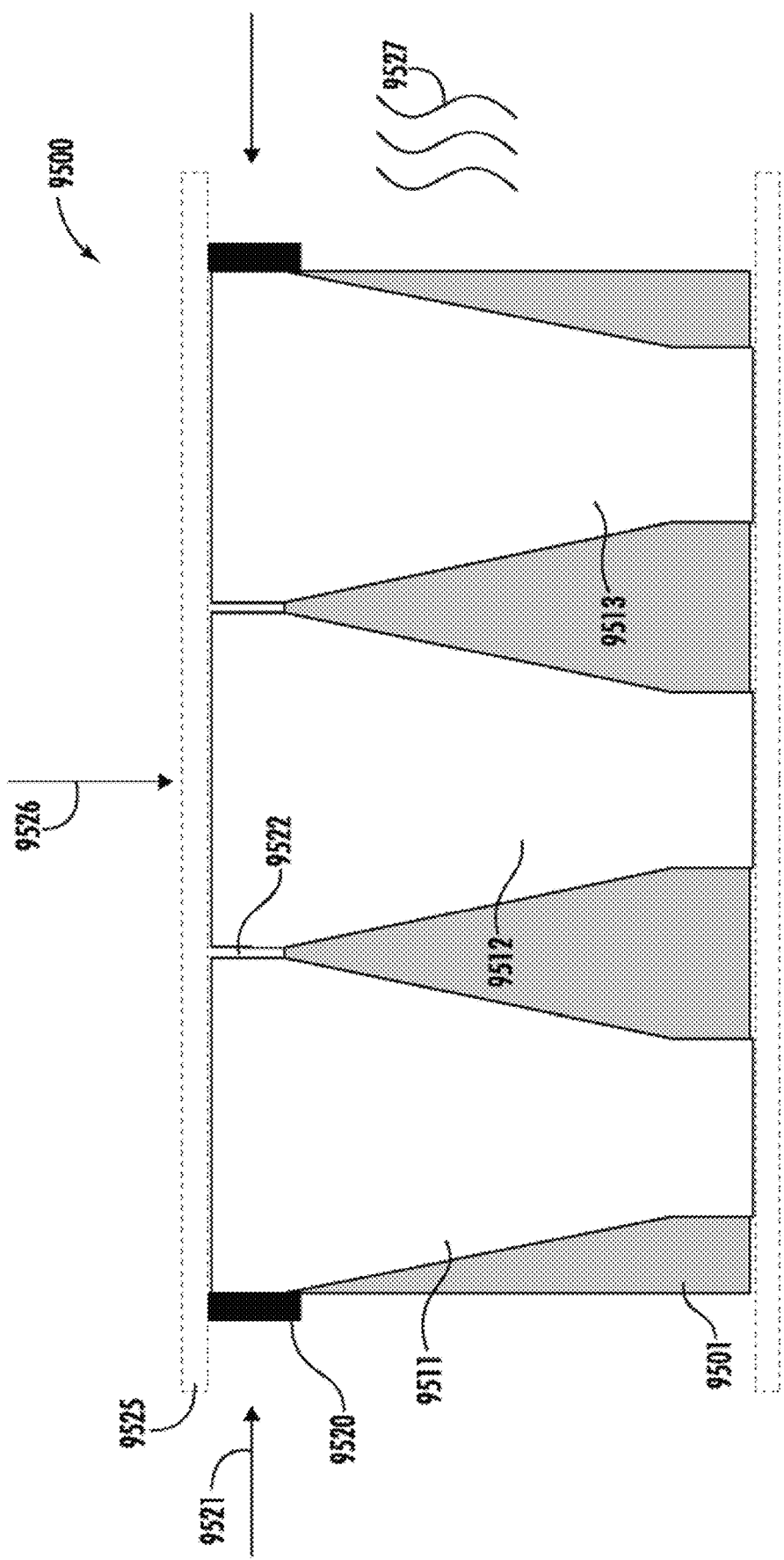

FIG. 48 illustrates a further step of the method 9500, wherein the array of molds 9501 have had the baffle walls 9502 removed, leaving baffle gaps 9522. A large-area plunger 9525 which covers the combined surface of all the large ends of the tapers has been placed on top of the tapers, and a constrained perimeter provided by application of a restraining ring 9520 encircling the array perimeter has been added and secured with force 9521 applied to the upper (wide) portions of the mold 9501. A series of processing steps are applied, with each step consisting of one of: adding pressure 9526, adding heat 9527, removing pressure 9526, removing heat 9527, or using a chemical reaction possibly with a catalyst (not shown). In an embodiment, heat may be applied to raise the temperature of the energy relay material 9511 such that the energy relay material 9511 has a formability in at least the longitudinal or the transverse plane of the material to allow conforming of at least a transverse dimension of the energy relay material 9511. In an embodiment, the plunger 9525 extends across the mold 9501 perpendicularly to the longitudinal planes of the energy relay materials 9511, and applies pressure 9526 to upper portions of energy relay materials 9511 oriented along the longitudinal planes of the energy relay materials 9511, perpendicular to the transverse plane.

Figure 49:
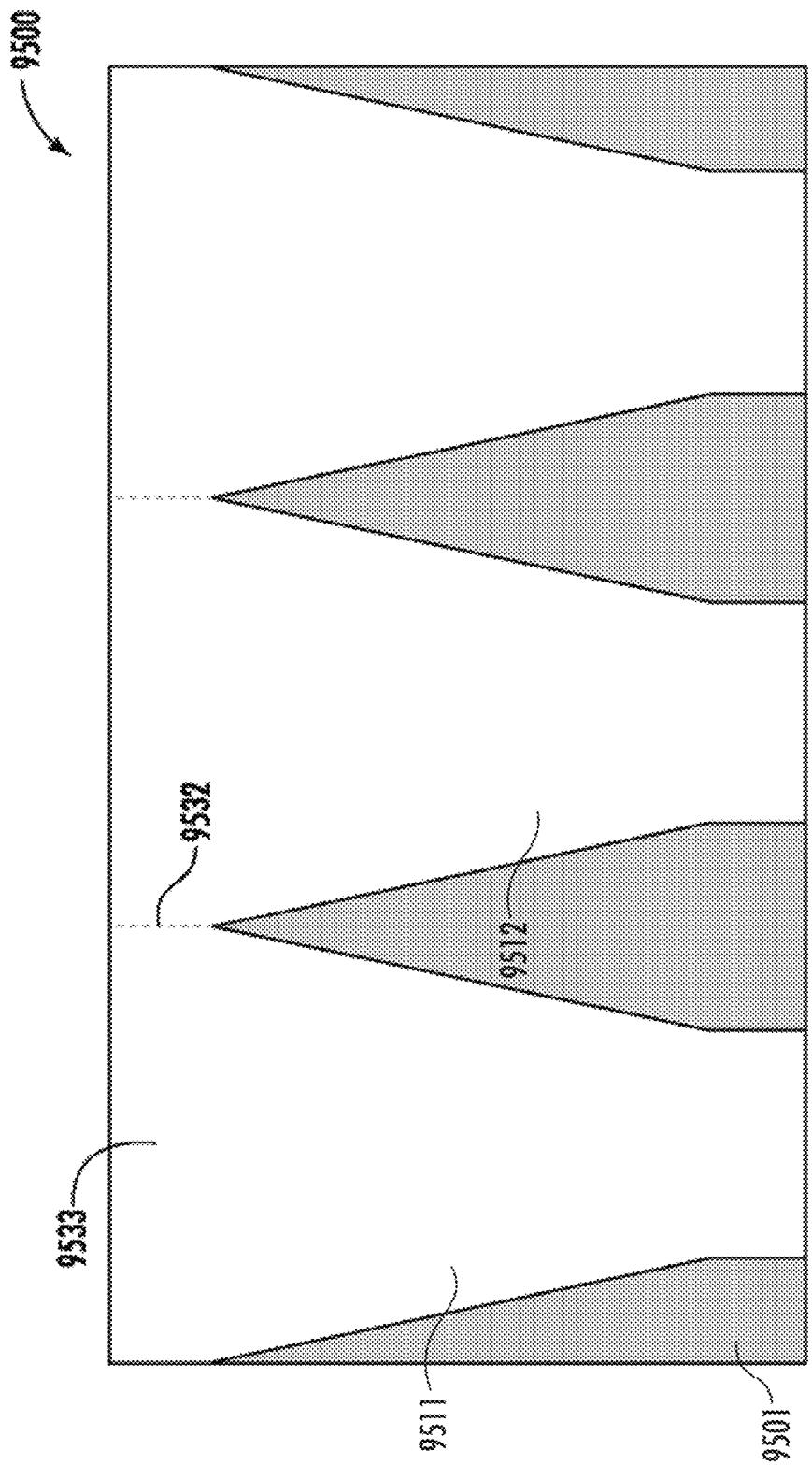

FIG. 49 shows a further step of method 9500, wherein the relay materials 9511 and 9512 have been fused together in the vicinity of the previous baffle gap 9522 at the imaginary boundary 9532 as a result of said processing steps 9526, 9527. The fused tapered energy relay array 9533 can now be removed from the array of molds 9501.

Wedge Method of Manufacturing Tapered Energy Relays

Tapered relays may also be formed from relays by using the technique of compression in one or more dimensions. FIG. 50A—FIG. 52B shows a schematic demonstration of an embodiment of a process 9600 for modifying a dimension of an energy relay material. In an embodiment, forces are applied to wedges that contain a desired taper sloped profile may be used to compress the relay material in one or more dimensions simultaneously with the application of heat in order to generate two taper relays. FIG. 50A illustrates a cross sectional view in an XY plane of a fixture 9601, and FIG. 50B illustrates a cross sectional view in the XZ plane, perpendicular to the XY plane, of the fixture 9601. In an embodiment, the fixture 9601 is configured to define a constrained space therein. In FIG. 50A and FIG. 50B, the relay material 9611 is placed within the constrain space defined by the fixture 9601, which, in an embodiment may include first and second ends 9623, and a middle portion extending therebetween along a longitudinal direction (X), wherein the middle portion of the fixture 9601 comprises at least one aperture 9612, 9613, 9614, or 9615 defined therethrough. In an embodiment, the middle portion of the fixture 9601 includes one pair of opposing apertures 9612/9613 or 9614/9615. In another embodiment, the middle portion of the fixture 9601 includes two pairs of opposing apertures: first pair 9612 and 9613, and second pair 9614 and 9615. In an embodiment, in operation, the relay material 9611 may be conformed to the constrained space defined by the fixture 9601 by imposing at least one wedge 9603 at least partially through the at least one aperture 9612, 9613, 9614, or 9615, whereby the wedge 9603 cooperates with the fixture 9601 to conform a portion of the energy relay material 9611 to a reduced transverse dimension as illustrated. In an embodiment, the pairs of wedges 9602 and 9603 may comprise a portion of an inverse shape of a conformed energy relay shape, and may conform energy relay material 9611 to the conformed energy relay shape when imposed through respective apertures. In an embodiment, the conformed energy relay shape may comprise a narrow end having a first cross-sectional area, and a wide end having a second cross-sectional area greater than the first cross-sectional area, as well as sloped walls connecting edges of the wide and narrow ends. In an embodiment utilizing four wedges and four apertures, each wedge comprises an inverse shape of one of four sides of a conformed energy relay shape.

In an embodiment, as heat 9607 is applied, force 9606 is applied to a pair of tapered wedges 9202 in one dimension (Y), forcing them through apertures 9614 and 9615, while similar force 9606 is also applied to a pair of tapered wedges 9603 in the orthogonal dimension (Z), forcing them through apertures 9612 and 9613. The heat 9607 applied may be configured to cause the relay material 9611 to reach a certain temperature whereby the material 9611 possesses a desired formability in the longitudinal (X) and transverse (Z, Y) directions in order to accommodate the pairs of wedges 9602 and 9603 as they are imposed through their respective apertures, such that a dimension of relay material 9611 may be altered. In an embodiment, heat 9607 may be configured to heat the relay material 9611 to substantially the relay materials 9611's glass transition temperature. In an embodiment, a sequence of processing steps is applied, where each processing step consists of one of: applying heat 9607, applying pressure by increasing force 9606, removing heat 9607, removing pressure by decreasing force 9606, and using a chemical reaction with or without a catalyst.

FIG. 51A and FIG. 51B illustrate a midpoint of the process 9600, showing a top view in the XY plane and a side view in the XZ plane of the midpoint respectively. In FIG. 51A and FIG. 51B, pairs of wedges 9602 and 9603 are continuing to be imposed through respective apertures 9614, 9615, 9613, and 9612, while heat 9607 is applied to maintain the relay material 9611 at the temperature whereby the material 9611 possesses a desired formability in the longitudinal (X) and transverse (Z, Y) directions of the relay material 9611.

FIG. 52A and FIG. 52B show the end of the process 9600, where both pairs of wedges 9602 and 9603 have been pressed into the relay material 9611, compressing it and possibly elongating it in the longitudinal (X) direction. FIG. 53 shows an end-view slice along imaginary line 9622 of the tapered relay 9611 shown in FIG. 52A and FIG. 52B, after all processing steps have been completed, showing that the relay material 9611 has been reduced in the transverse (Y and Z) directions due to the pressure applied to the tapered wedge pairs 9602 and 9603. In one embodiment, extra space 9621 is provided for relay material expansion. In other embodiments, extra space 9621 is absent, and the relay material 9611 is the same size as the interior dimensions of the fixture 9601. First side 9624 and second side 9625 of tapered relay 9611 may be separated after all processing steps are completed by cutting the relay along imaginary cut line 9622 shown in FIG. 52A and FIG. 52B. The resulting tapers contain a sloped portion between the narrow end of the taper and the large end of the taper that has the same shape as the tapering wedges used.

FIG. 54A-FIG. 58B illustrate a process 9700 similar to 9600 shown in FIG. 50A-FIG. 52B, except that the compression occurs in two steps, separately for each orthogonal dimension (Y, Z), rather than occurring simultaneously. In FIG. 54A, tapering wedge pairs 9602 are positioned on opposing sides of the relay 9611, as seen in the side view, oriented along the Y axis of the illustration, with no tapering wedge pairs being used, as seen on the top view, along the Z axis, where the relay material 9611 is constrained by fixture 9601.

In FIGS. 55A and 55B, force 9606 is applied to the pair of Y-oriented tapering wedges 9602 in addition to the application of heat 9607, to relax and compress the relay material 9611.

Figure 56A:
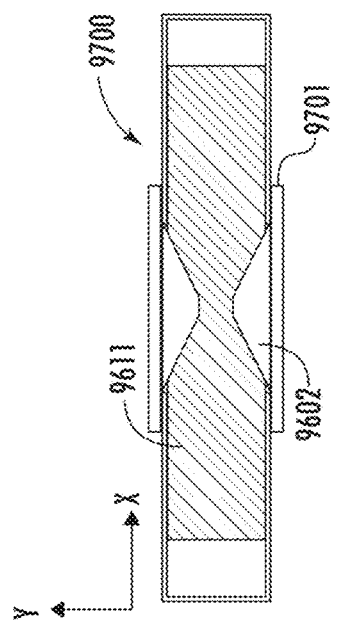
Figure 56B:
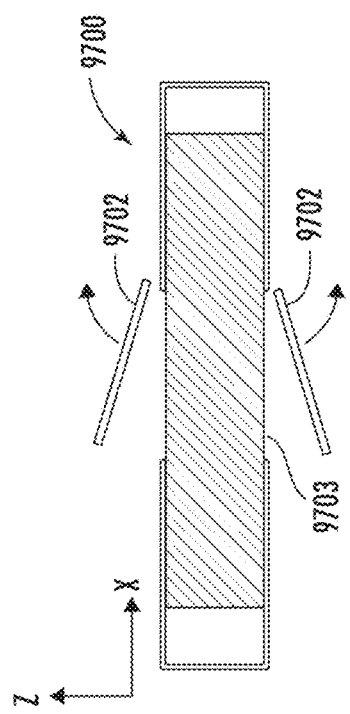
Figure 57A:
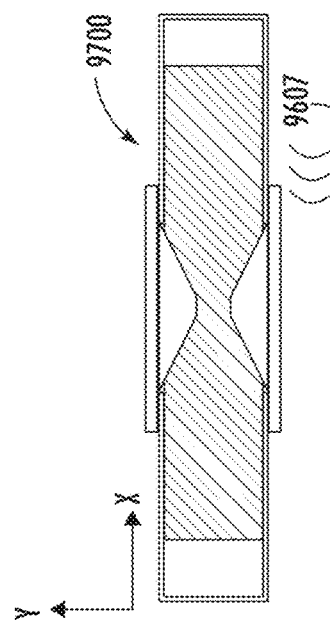
Figure 57B:
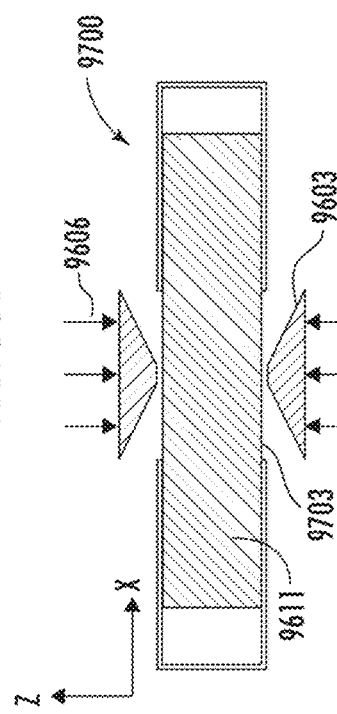

In FIG. 56A, braces 9701 are applied to keep the pair of Y-oriented tapering wedges 9602 from moving, while removable panels 9702 are taken away as shown in the FIG. 56B, illustrating the XZ planar view. In FIG. 57B, the Z-oriented tapering wedges 9603 are positioned in front of each resulting opening 9703 and force 9606 is applied to the pair of wedges 9603, causing them to be imposed through the openings 9703 and to conform portions of the relay material 9611.

Figure 58A:
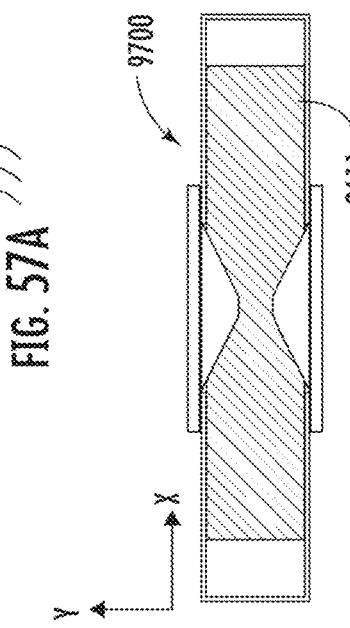
Figure 58B:
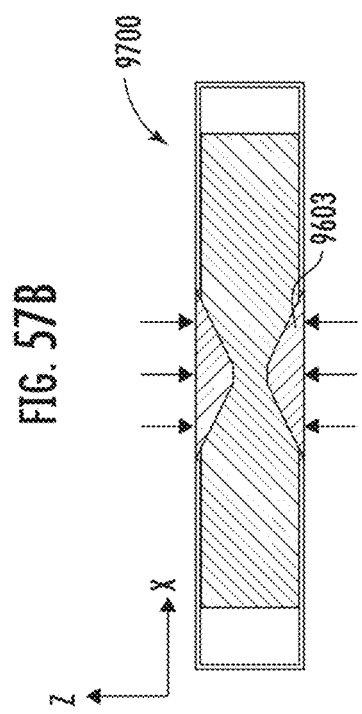

In FIG. 58B, the Z-oriented tapering wedges 9603 have been fully inserted, conforming relay material 9611 to the inverse taper shape of the wedges 9603. As wedge pairs 9602 and 9603 are inserted into the material, a series of processing steps are applied, where each processing step consists of one of: applying heat 9607, applying pressure by increasing force 9606, removing heat 9607, removing pressure by decreasing force 9606, and using a chemical reaction with or without a catalyst. Similarly to the process performed in FIG. 52A and FIG. 52B, the resulting conformed energy relay 9611 shown in FIG. 58A and FIG. 58B may be separated at a midpoint of the narrowest conformed portion of the material 9611, yielding two tapered relays once the tapering wedges 9602 and 9603 have been removed.

Adjustable Wall Method of Manufacturing Tapered Energy Relays

Figure 59A:
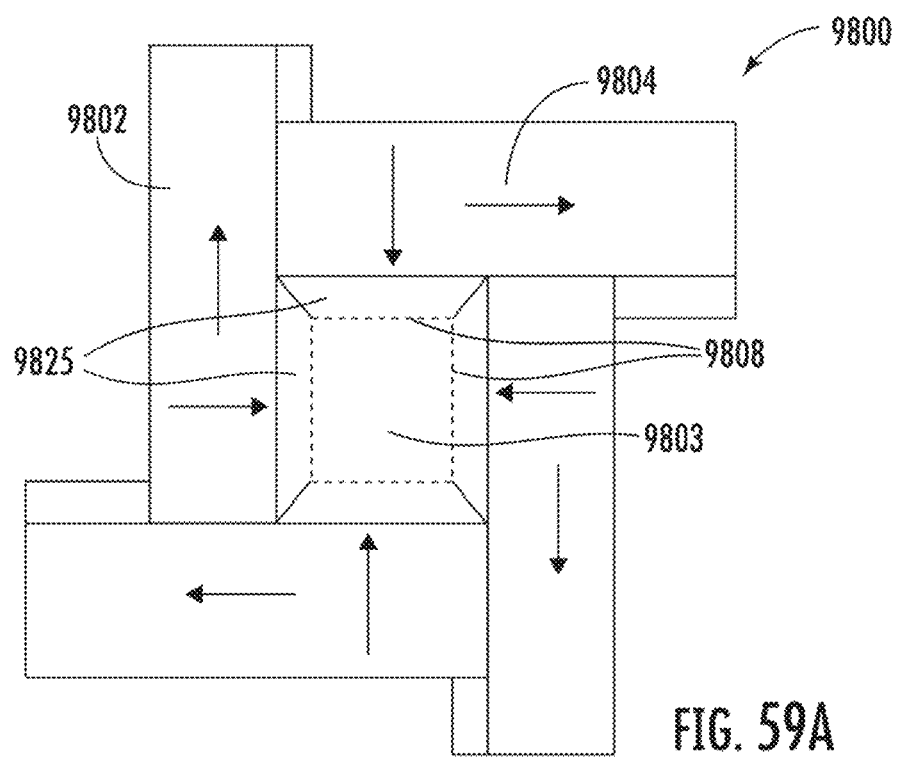
FIG. 59A illustrates the end view of a fixture for taper forming using a compression fixture which is composed of four interlocking sliding walls.

FIG. 59A illustrates the end view of a fixture 9800 for defining a constrained space in which an energy relay taper may be formed. A method for forming the energy relay taper involves using a compression fixture 9800 which is composed of a plurality of interlocking sliding walls 9802, which surround a block of relay material 9803 defined by a perimeter 9808 of a constrained space defined by the plurality of walls 9802. In an embodiment, four adjustable walls 9802 are provided to define the constrained space having perimeter 9808. Each adjustable wall 9802 includes the inverse profile of one side of the tapered energy relay to be formed, containing a sloped portion 9825 and a raised portion 9826 (shown in FIG. 59C). In an embodiment, the inverse profile of the sides of the walls 9802 comprises a protrusion defining at least a portion of the constrained space having perimeter 9803, the protrusions further configured to vary at least a portion of a transverse dimension of the constrained space including perimeter 9808 as the position of the plurality walls 9802 are adjusted relative to one another according to the method shown in FIG. 59A—FIG. 59C. FIG. FIG. 59C shows a side view of the energy relay tapering fixture 9800 with interlocking sliding walls 9802, showing a view of the inverse taper profile of the formed taper machined onto each wall, showing the sloped portion 9825. The raised flat portion 9826 of the taper profile machined on the wall is visible in FIG. 59C. In an embodiment abutting walls 9802 may be oriented perpendicularly to one another. FIG. 59C also demonstrates how each plate abuts and interlocks with its neighbor along two identical sliding portions 9811 (only one is visible in FIG. 59C) in such a way that the walls can move relative to one another while remaining abutted with no gap forming between them. Referring to FIG. 59A, if each plate 9802 moves in two orthogonal directions in the transverse plane of the relay material, along the direction of the arrows 9804, then it is possible for the space between the walls to be constricted without gaps appearing between any of the adjacent walls 9802. An examination of FIG. 59A and FIG. 59C reveals that each wall comprises an end portion and a side portion, the end portion of a first wall configured to abut and slide against the side portion of a second wall on seam 9811 in a first direction, and the side portion of the first wall configured to abut and slide against the end portion of a third wall on another seam 9811 in a second direction. In an embodiment, the protrusions 9826 may allow abutting walls 9802 to slide against one another in coordination with a cutout 9811 on the end portions having an inverse of the shape of the protrusions. The shape of the side portions and end portions of the walls 9802 allows for there being no gaps between adjacent walls 9802 as the above sliding movements are performed. In an embodiment, the protrusions defined by portions 9825, 9826 and cutout 9811 are disposed at the same locations longitudinally for each of the plurality of adjustable walls 9802. FIG. 59D shows the block of relay material 9803 prior to processing with the energy relay tapering fixture 9800. The relay material 9803 is assumed to be rectangular, or approximately rectangular, and is placed in the middle of four identical fixture arms 9802 which form the fixture 9800. The flat raised portions 9826 of the sloped profile of the walls will make contact with the sides of the relay material 9803 at the start of the process, before any deformation has occurred. The relay material 9803 is heated, possibly with the application of heat directly to the relay material, or by heating the entire fixture 9800, or both. Next, force is applied to the walls of the fixture 9802 gradually along the arrows 9804. Using a series of processing steps which includes the application of heat as well as force along each of the arrows 9804, a gradual displacement of each wall 9802 along the direction of each of these arrows occurs, which acts to compress the walls 9802 around the relay material 9803, and deform it. In one embodiment, all four walls 9802 move simultaneously in synchrony with one another. In another embodiment, force is applied incrementally to each plate separately, in a round-robin, or series, fashion. A series of processing steps are applied, where each processing step consists of one of: applying heat to the relay material and/or the fixture, applying pressure along lines of force 9804, removing heat, removing pressure on the relay by decreasing force 9804, and using a chemical reaction with or without a catalyst. In an embodiment, the fixture 9800 may be configured to transfer heat from an external source to relay material 9803 constrained therein, whereby heating the fixture 9800 effectively results in heating the materials 9803. As the walls are moved with force 9804, the most raised portion of the sloped profile 9826 on the walls will make contact with the relay material 9803 first, placing pressure on it, and deforming it. As the walls are moved further, a larger fraction of the taper profile will be imposed upon the relay material 9803, causing it to compress and be deformed. The tapering process described above may be used to produce tapered energy relay materials having a reduced transverse dimension along at least one position along the longitudinal dimension of the relay material. In an embodiment, the conformed tapered energy relay material may comprise a narrow end and an opposing wide end, having a different cross-sectional area than the narrow end, and sloped walls connecting edges of the wide and narrow ends. In an embodiment, the constrained space of the fixture 9800 may comprise a shape consisting of two conformed tapered energy relay shapes oriented opposite one another, the narrow ends adjacent.

Figure 59B:
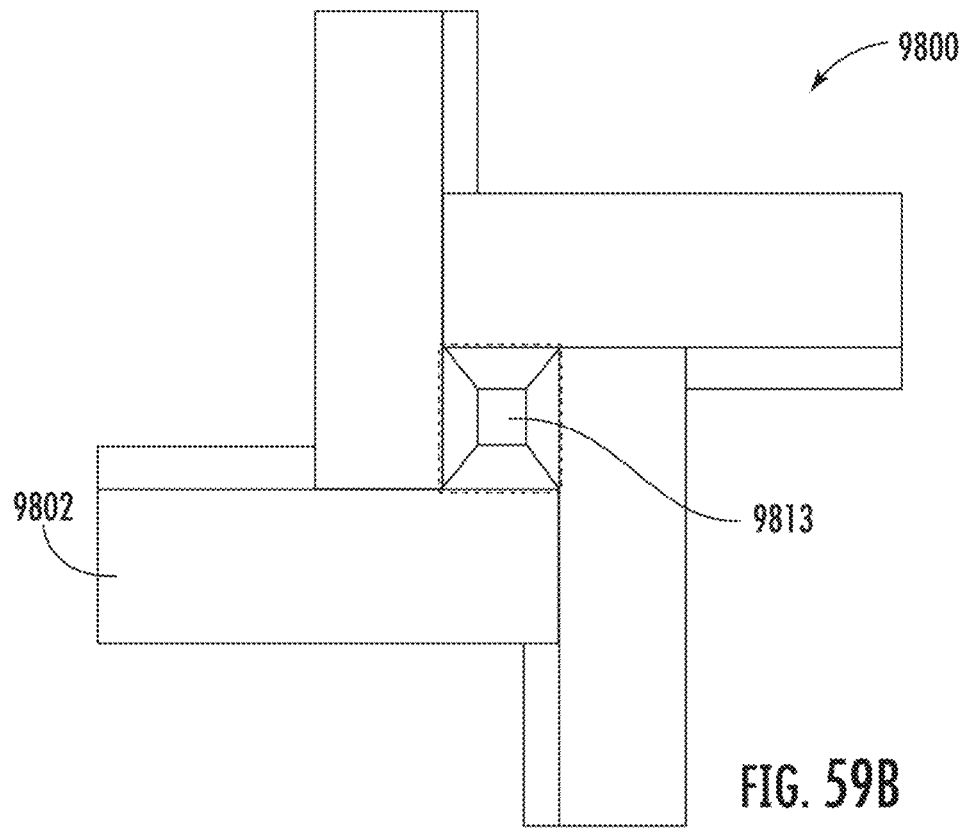
FIG. 59B illustrates the position of the walls after processing has been completed.
Figure 59C:
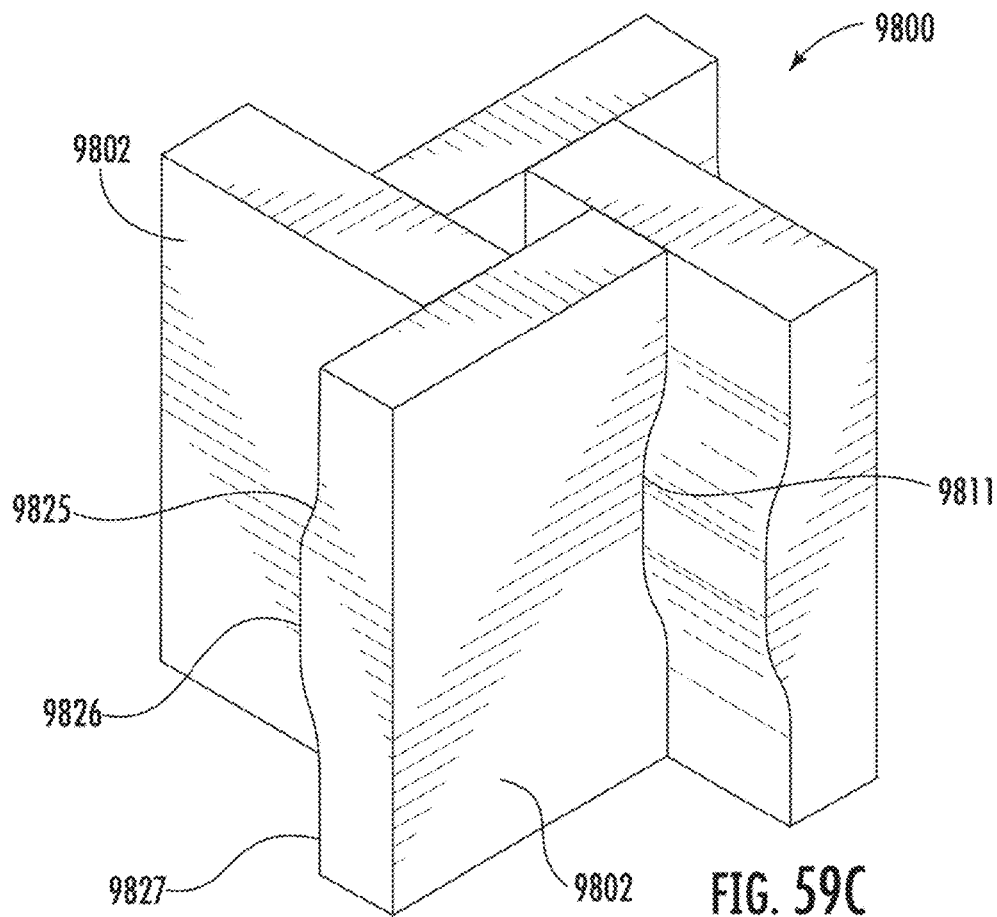
FIG. 59C illustrates a side view of the fixture of FIG. 59A.
Figure 59D:
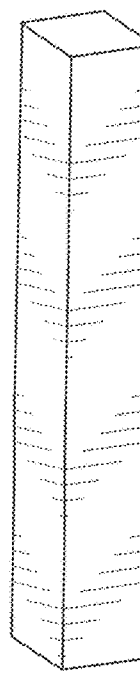
FIGS. 59D and 59E illustrate the tapered relay before and after processing steps have been completed, respectively.
Figure 59E:
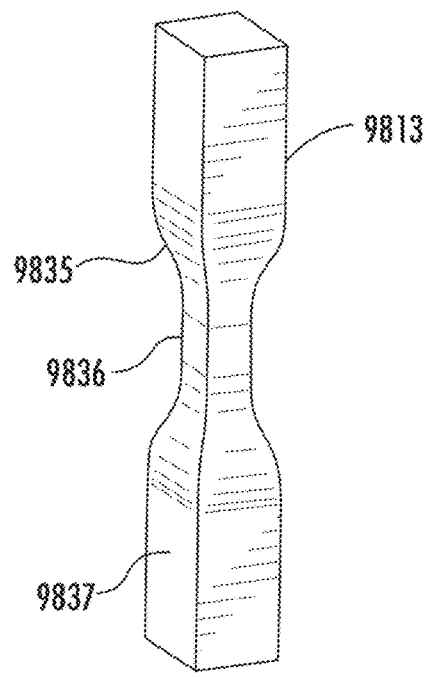

FIG. 59B shows the position of the walls after processing has been completed. The walls 9802 of the fixture have closed around the relay material 9803, constricting it along its longitudinal dimension in varying amounts depending on the profile of the sliding walls 9802, and deforming it into a new shape 9813. FIG. 59E shows the resulting tapered relay 9813 after processing steps have been completed. The tapered relay 9813 contains a sloped portion 9835 matching the sloped profile 9825 on the sliding walls 9802, a taper neck profile 9836 matching the flat raised portion 9826 machined on the sliding walls, and a wide portion of the taper 9837 matching the flat portion of the profile 9827 on the sliding walls. A tapered relay with any desired dimension, taper profile, or aspect ratio can be created with a corresponding fixture similar to 9800.

The resulting tapered relay 9813 may be removed from the fixture 9800, and may be further divided at a midpoint in the taper neck profile region 9836, resulting in two tapered energy relays, having ends with different cross sectional areas allowing for spatial magnification or minification of energy relayed therethrough.

The initial energy relay material 9803 may be provided by any of the methods or processes described herein for producing energy relay materials.

It is possible in embodiments of fixture 9800 to fuse and/or relax arrangements of multiple individual energy relay materials within the constrained space having perimeter 9808 provided by fixture 9800 prior to tapering using the fixture 9800, thereby providing initial fused energy relay material which may be used in the tapering process described above. This may eliminate the need to transfer fused arrangements of energy relay materials from a fusing fixture to the fixture 9800 described above.

In the methods described above and illustrated in FIG. 41-FIG. 59D, it should be appreciated that the energy relay materials that are referred to throughout the processing steps may be any of the materials previously described herein, including but not limited to: materials with randomized distributions of component engineered structures in a transverse plane of the material, materials with a non-random distribution of component engineered structures in a transverse plane of the material, Anderson Localization inducing materials, Ordered Energy Localization inducing materials, optical fiber materials, single polymers or mixtures of different polymers, etc. The materials used in the above-described processes should not be limited to any one set or type of material, but should be inclusive of all energy relay materials, whether known in the art or disclosed herein.

Figure 62:
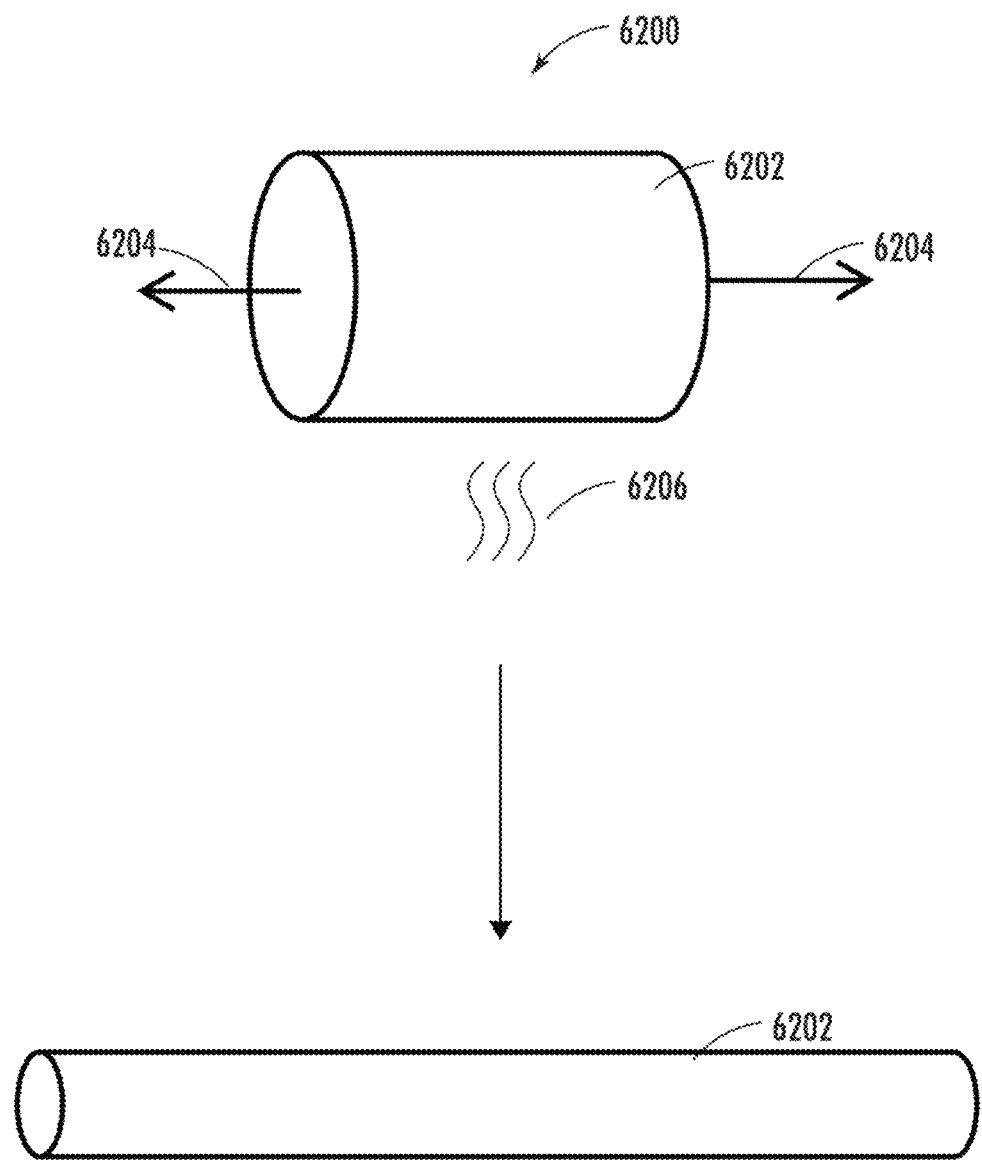
FIG. 62 illustrates an embodiment of a process for providing energy relay materials.

Furthermore, FIG. 62 illustrates an embodiment of a process 6200 for providing energy relay materials consistent with the present disclosure. In process 6200, a preform of an energy relay material 6202 is provided, which has dimensions not suited for use in the energy relay forming methods detailed herein. Heat 6206 is applied to the preform of energy relay material 6202, heating the material 6202 to a temperature such that the material 6202 has an increased formability in a longitudinal plane (roughly extending from left to right across the plane of the illustration), as well as in a transverse plane perpendicular to the longitudinal plane, of the energy relay material 6202. After the temperature described above is reached, a longitudinally oriented tensile force 6204 is applied to the material 6202, causing an elongation along the longitudinal plane and a reduction along the transverse plane, until the energy relay material 6202 has a desired longitudinal and transverse dimension suitable for use in further methods described herein.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention (s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a value herein that is modified by a word of approximation such as "about" or "substantially" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A fixture for defining a constrained space configured to accommodate one or more energy relay materials therein, the fixture comprising:
   a plurality of abutting adjustable walls extending along a longitudinal direction and defining a constrained space therebetween, each wall comprising an end portion and a side portion, and
   wherein the adjustable walls are operable to vary a transverse dimension of at least a portion of the constrained space along the longitudinal direction by an adjustment to positions of the adjustable walls relative to one another in a transverse direction, perpendicular to the longitudinal direction; and
   wherein the adjustment comprises abutting and sliding the end portion of a first wall against the side portion of a second wall in a first direction, and abutting and sliding the side portion of the first wall against the end portion of a third wall in a second direction; and
   wherein each of the adjustable walls is configured to slide in synchrony with other adjustable walls to maintain a closed perimeter of the constrained space while defining the transverse dimension thereof.

2. The fixture of claim 1, wherein the adjustable walls are configured to move relative to one another without creating any gaps in the walls of the constrained space.

3. The fixture of claim 1, wherein the constrained space is defined by four walls.

4. The fixture of claim 3, wherein a first and a second wall of the four walls are opposing one another.

5. The fixture of claim 4, wherein a third and fourth wall of the four walls are opposing one another, and perpendicular to the first and second walls.

6. The fixture of claim 1, wherein at least one adjustable wall comprises a guide along which an abutting wall position is adjustable.

7. The fixture of claim 1, wherein at least one adjustable wall is operable to slide along a guide of an adjacent wall while oriented perpendicularly to the adjacent wall.

8. The fixture of claim 1, wherein each wall of the plurality of walls comprises an end portion and a side portion, the end portion of a first wall configured to abut and slide against the side portion of a second wall in a first direction, and the side portion of the first wall configured to abut and slide against the end portion of a third wall in a second direction.

9. The fixture of claim 8, wherein each side portion comprises a protrusion for defining a portion of the constrained space, and each end portion comprises a cutout configured to accommodate the protrusion of an abutting side portion such that there are no gaps between abutting side and end portions.

10. The fixture of claim 8, wherein the first and second directions are perpendicular.

11. The fixture of claim 1, wherein each of the plurality of walls comprises a portion of an inverse energy relay element shape.

12. The fixture of claim 1, wherein a configuration of the plurality of adjustable walls defines an inverse shape of a tapered energy relay.

13. The fixture of claim 1, wherein each of the adjustable walls is configured to slide in synchrony with other adjustable walls to apply equal force along the transverse direction to at least a portion of the one or more energy relay materials in the constrained space.

\* \* \* \* \*